United States Patent
Inoue et al.

(10) Patent No.: US 9,256,059 B2
(45) Date of Patent: Feb. 9, 2016

(54) ZOOM LENS SYSTEM, IMAGING OPTICAL DEVICE, AND DIGITAL APPLIANCE

(71) Applicants: KONICA MINOLTA, INC., Chiyoda-ku (JP); NIKON CORPORATION, Minato-ku (JP)

(72) Inventors: Kana Inoue, Chiyoda-ku (JP); Mamoru Terada, Chiyoda-ku (JP); Haruo Sato, Minato-ku (JP)

(73) Assignees: KONICA MINOLTA, INC., Tokyo (JP); NIKON CORPORATION, Tokyo (JP)

( * ) Notice: Subject to any disclaimer, the term of this patent is extended or adjusted under 35 U.S.C. 154(b) by 0 days.

(21) Appl. No.: 14/414,383

(22) PCT Filed: Jul. 4, 2013

(86) PCT No.: PCT/JP2013/068363
§ 371 (c)(1),
(2) Date: Jan. 12, 2015

(87) PCT Pub. No.: WO2014/010504
PCT Pub. Date: Jan. 16, 2014

(65) Prior Publication Data
US 2015/0212305 A1 Jul. 30, 2015

(30) Foreign Application Priority Data
Jul. 10, 2012 (JP) ................................. 2012-154314

(51) Int. Cl.
G02B 15/14 (2006.01)
G02B 15/177 (2006.01)
G02B 15/16 (2006.01)
G02B 13/04 (2006.01)
H04N 5/232 (2006.01)

(52) U.S. Cl.
CPC .............. *G02B 15/177* (2013.01); *G02B 13/04* (2013.01); *G02B 15/161* (2013.01); *H04N 5/23296* (2013.01)

(58) Field of Classification Search
CPC ............................ G02B 15/161; G02B 15/177
USPC ......................................................... 359/691
See application file for complete search history.

(56) References Cited

U.S. PATENT DOCUMENTS

| | | | | |
|---|---|---|---|---|
| 4,591,235 A * | 5/1986 | Tokumaru | ............ | G02B 15/177 359/680 |
| 6,441,967 B2 | 8/2002 | Furuta | | |
| 2011/0205637 A1 | 8/2011 | Wei | | |

FOREIGN PATENT DOCUMENTS

| | | |
|---|---|---|
| JP | H 09-015498 | 1/1997 |
| JP | 2001-330774 | 11/2001 |
| JP | 2004-198855 | 7/2004 |
| JP | 2005-258113 | 9/2005 |
| JP | 2011-175174 | 9/2011 |

* cited by examiner

Primary Examiner — William Choi
(74) Attorney, Agent, or Firm — Cozen O'Connor

(57) ABSTRACT

A zoom lens system having a negative first lens group and a positive second lens group, from an object side, and achieving zooming by varying a group-to-group distance. The second lens group includes a three-element cemented lens which is a set of three lens elements cemented together including, from the object side, a negative first lens, a positive second lens, and a negative third lens, and the three-element cemented lens fulfills conditional formulas $0.08<(rs2+rs1)/(rs2-rs1)<0.5$, $27<v2-v1<40$, $20<v2-v3<38$ ($rs1$, $rs2$ represent the curvature radius of the sides of cemented surfaces of the three-element cemented lens on the object side and the image side respectively, and v1-3 represent the Abbe numbers of the first to third lenses of the three-element cemented lens).

7 Claims, 37 Drawing Sheets

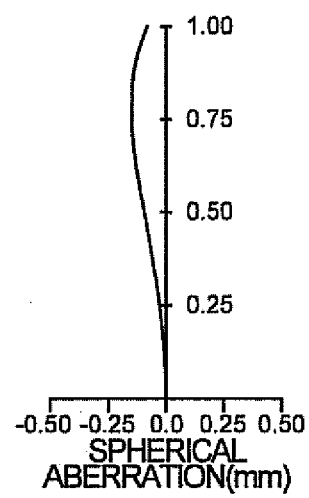
FIG.7A EX1-W
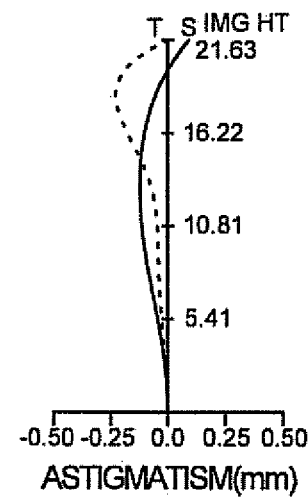
FIG.7B EX1-W
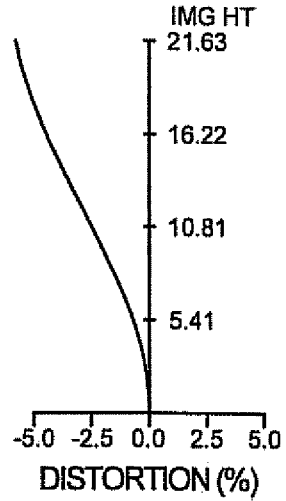
FIG.7C EX1-W
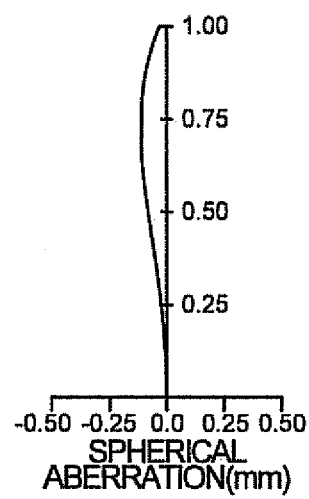
FIG.7D EX1-M
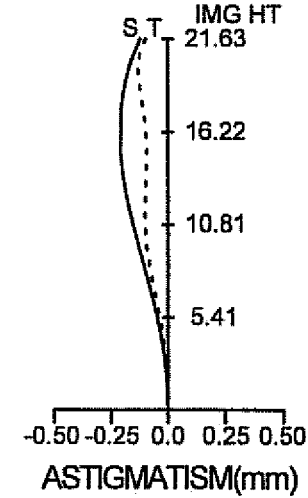
FIG.7E EX1-M
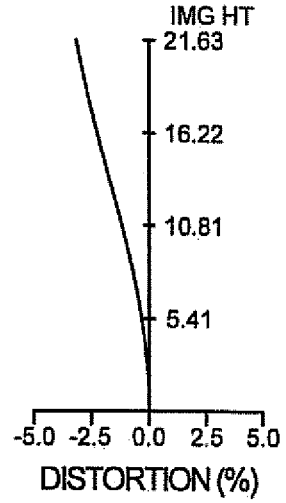
FIG.7F EX1-M
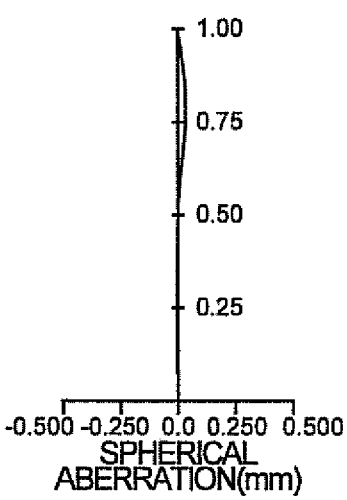
FIG.7G EX1-T
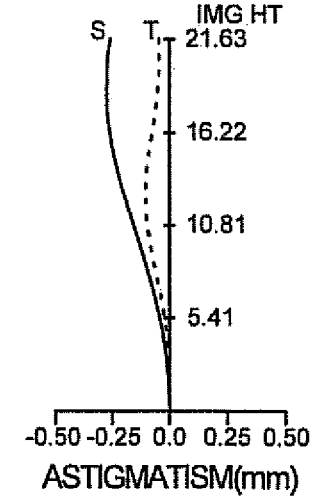
FIG.7H EX1-T
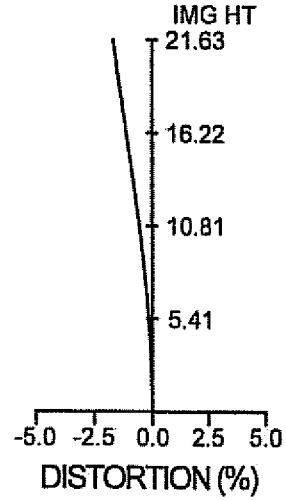
FIG.7I EX1-T

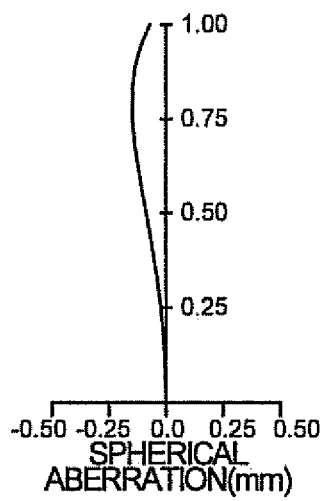
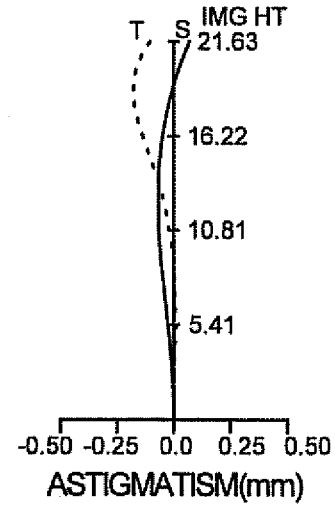
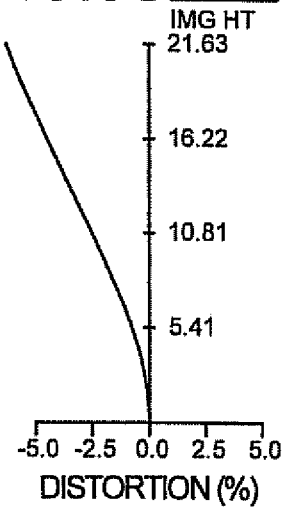
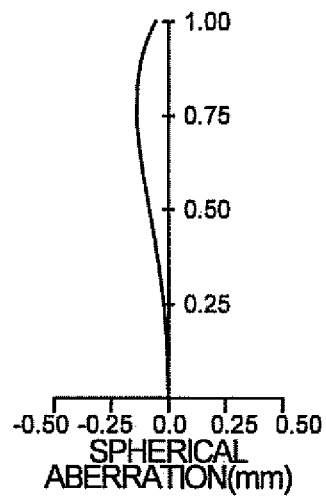
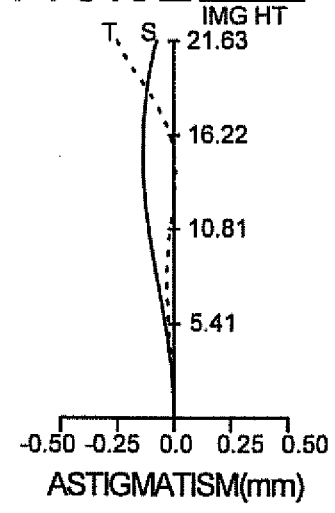
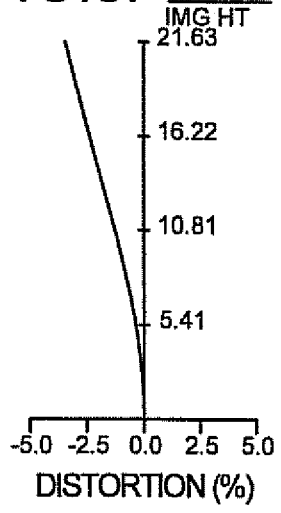
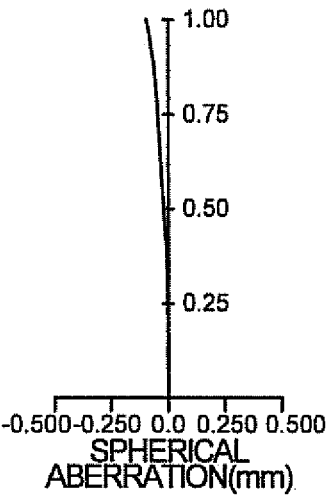
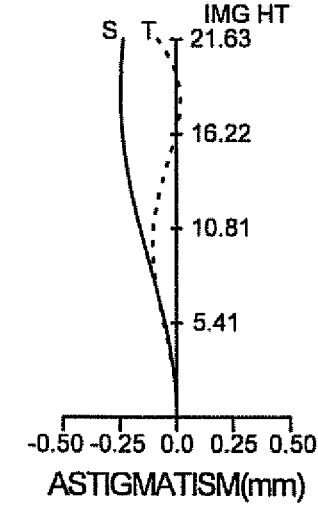
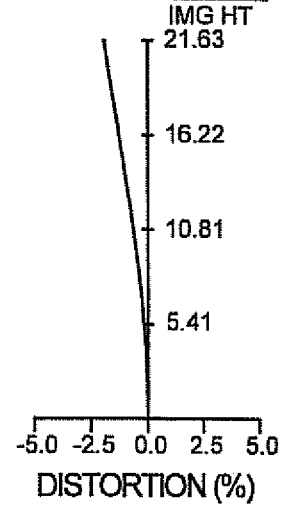

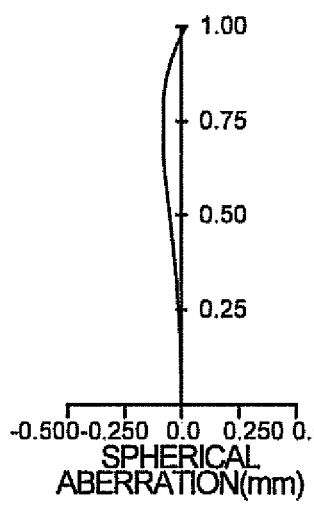
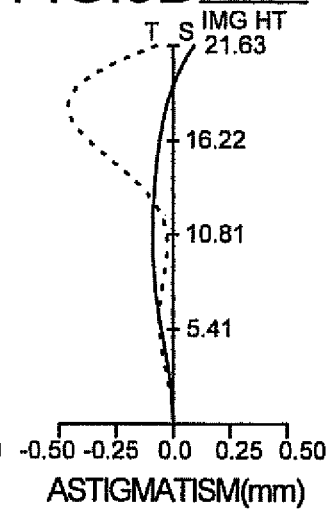
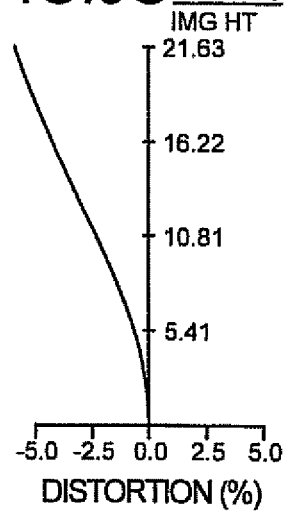
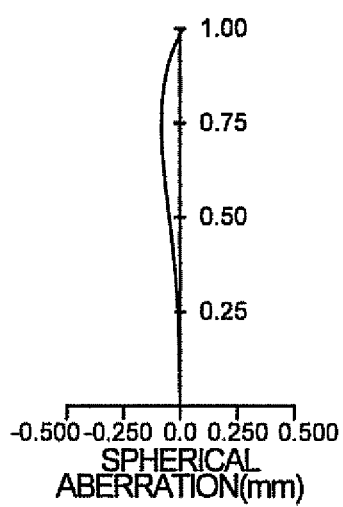
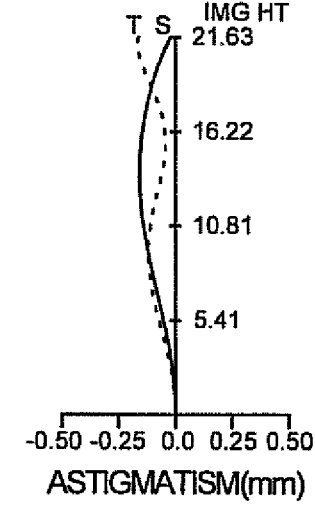
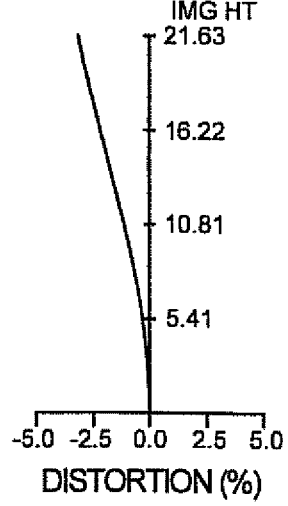
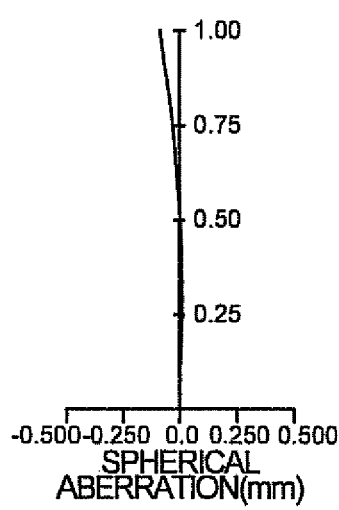
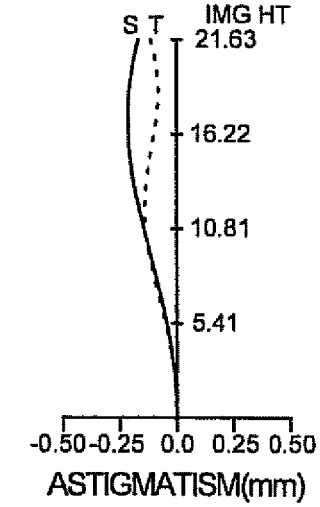
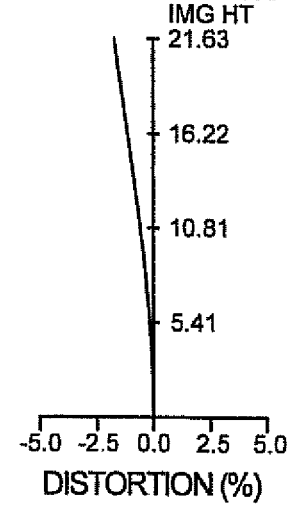

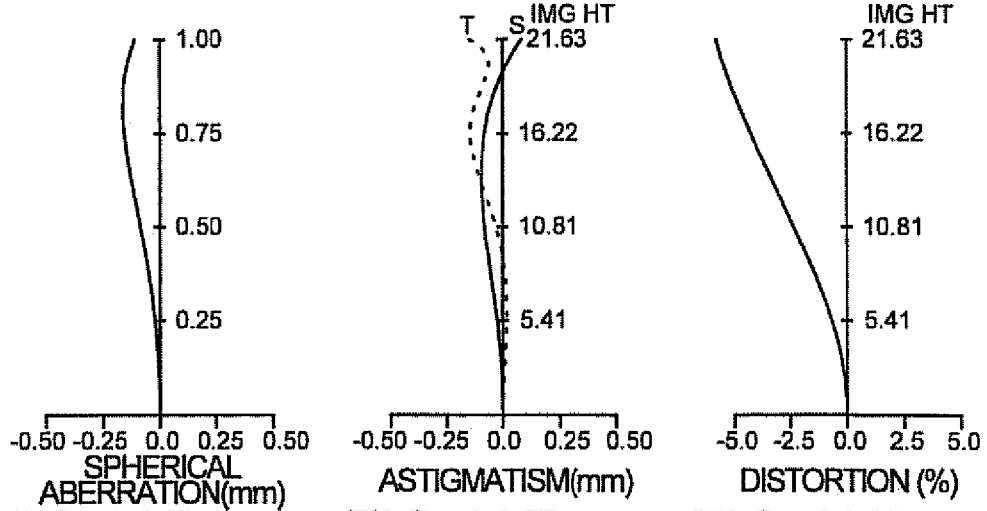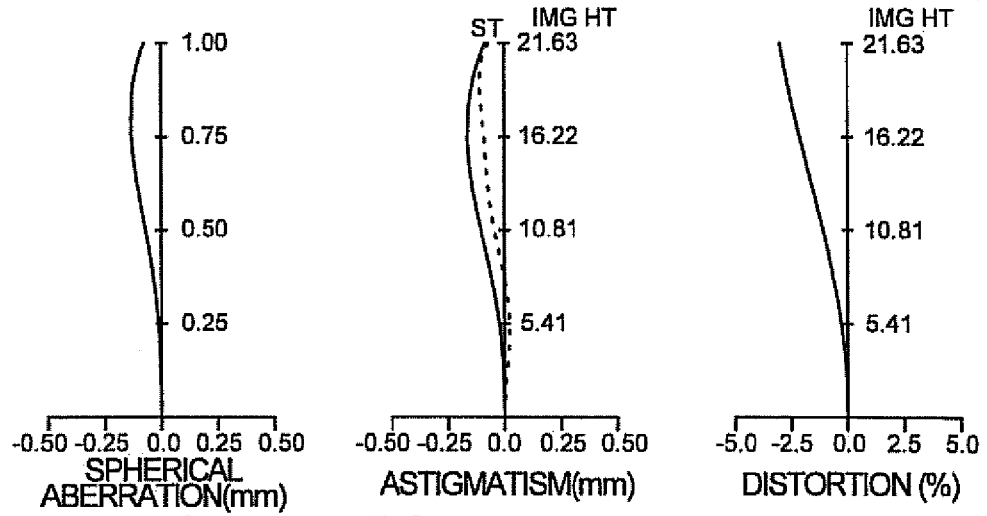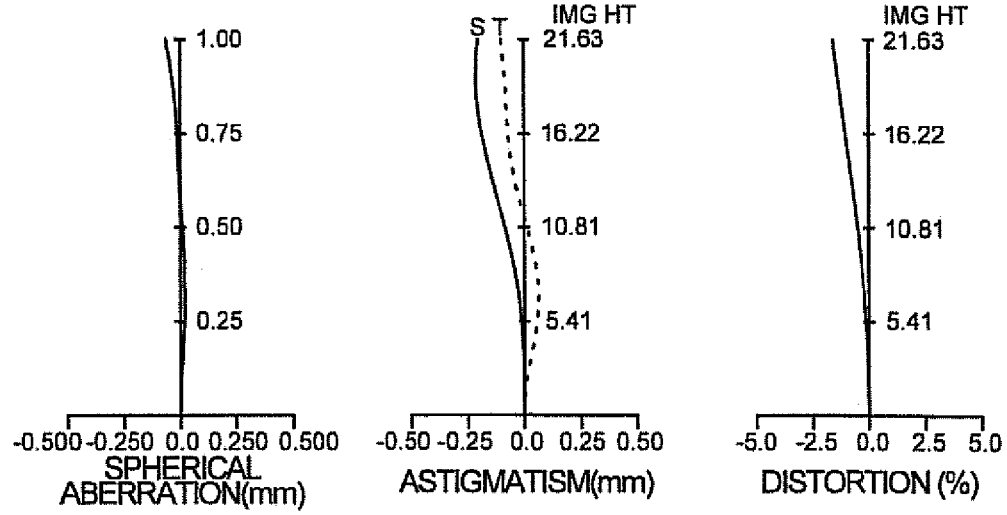

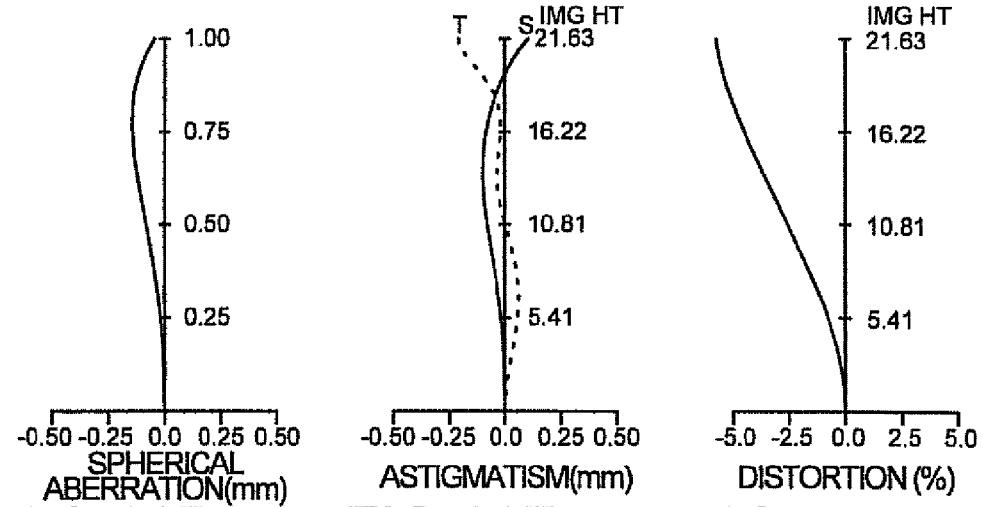
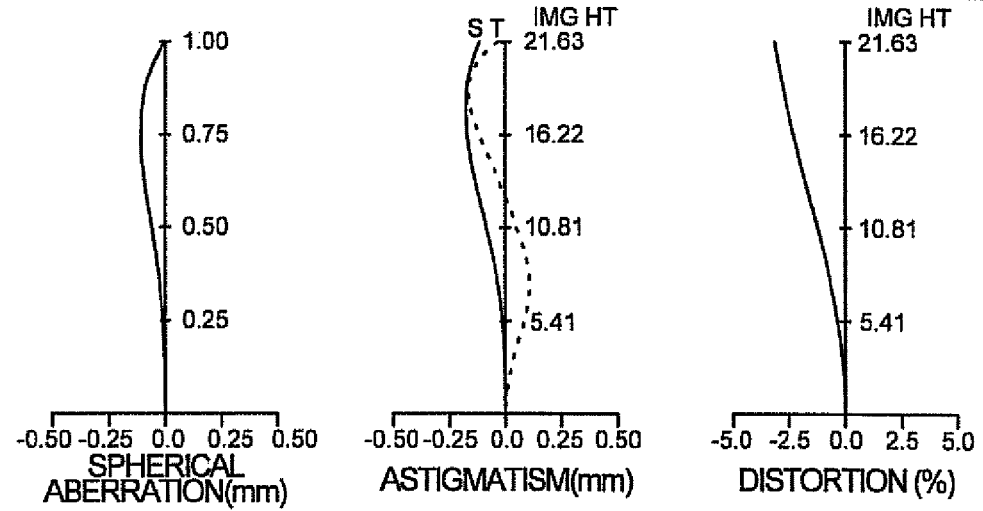
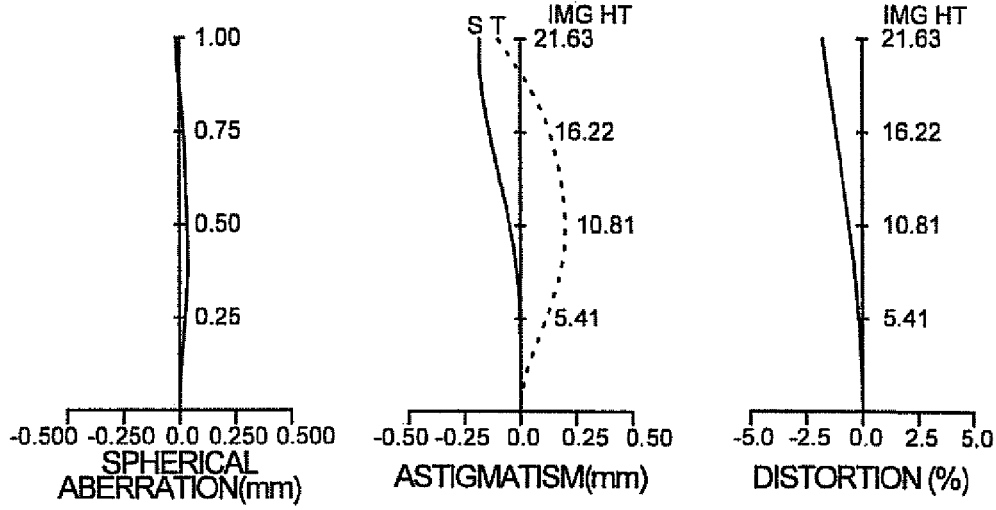

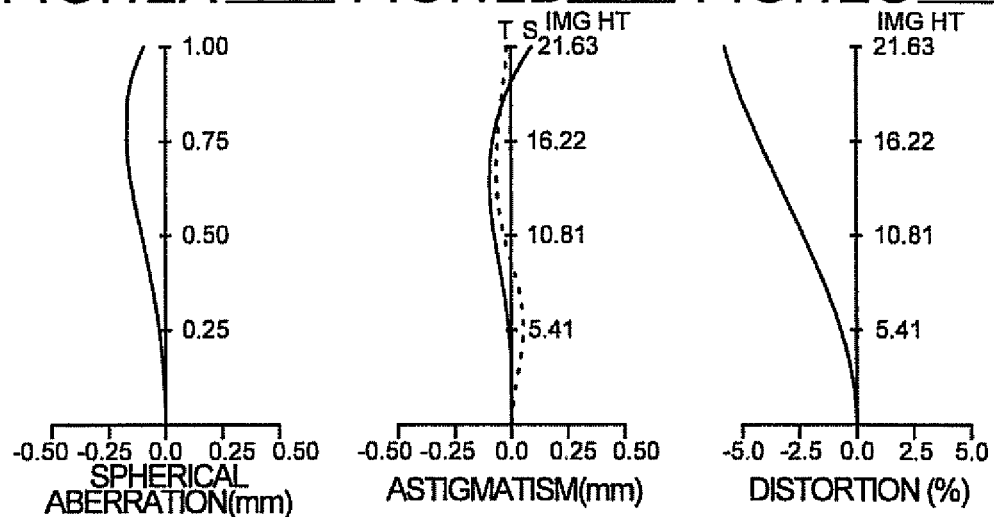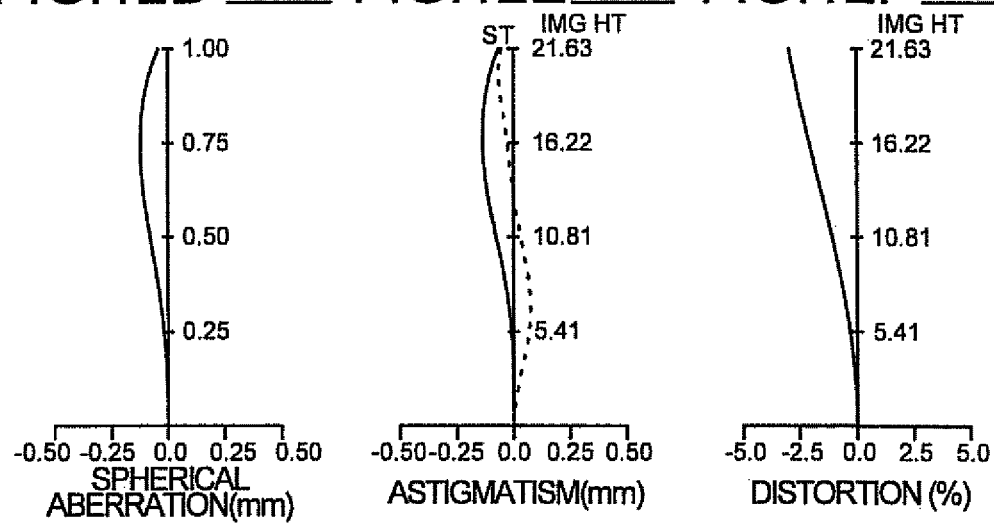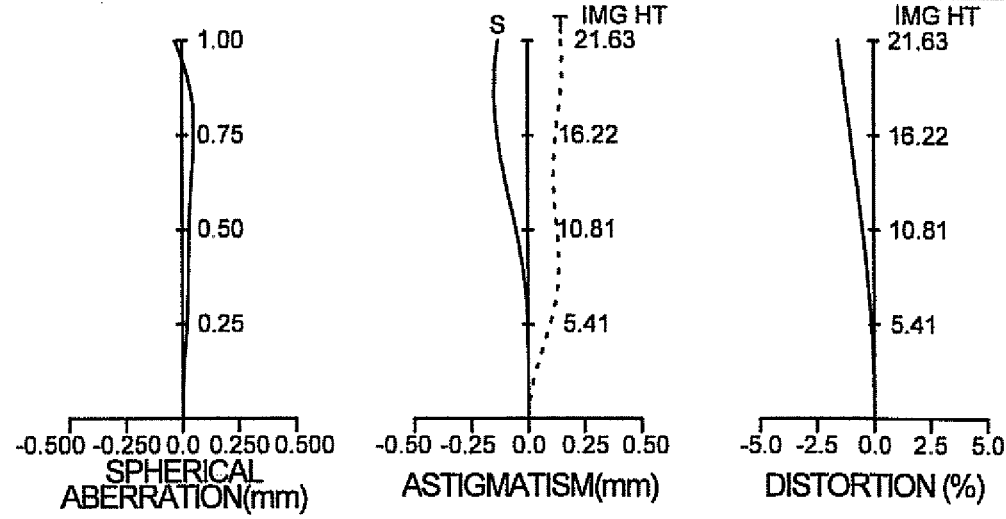

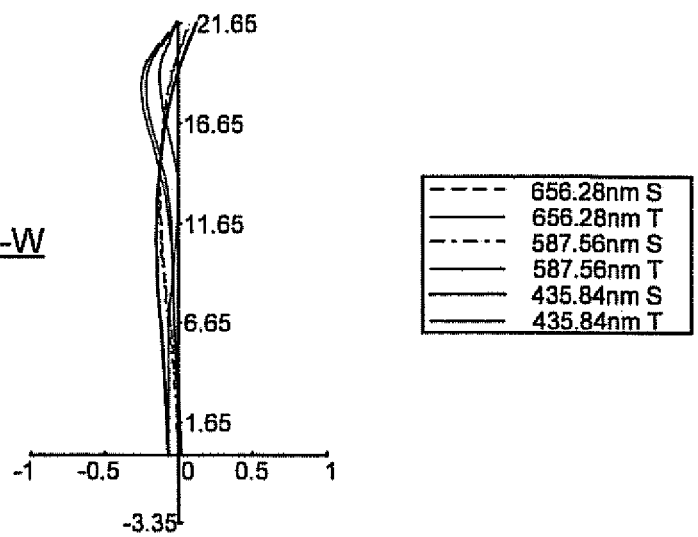
FIG.13A EX1-W
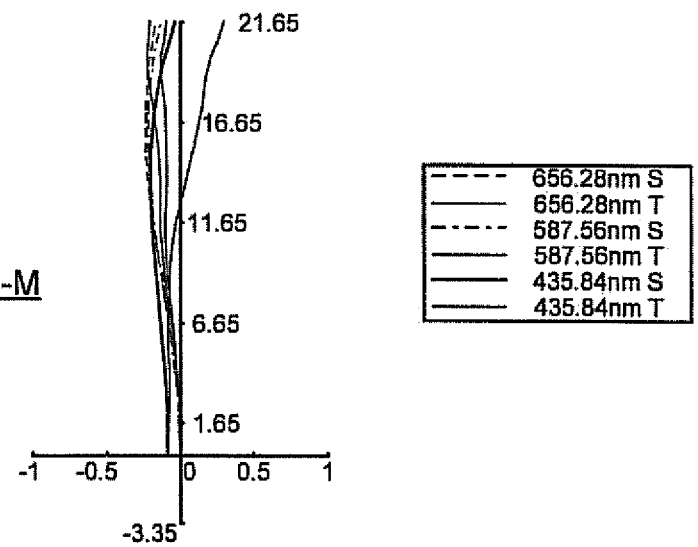
FIG.13B EX1-M
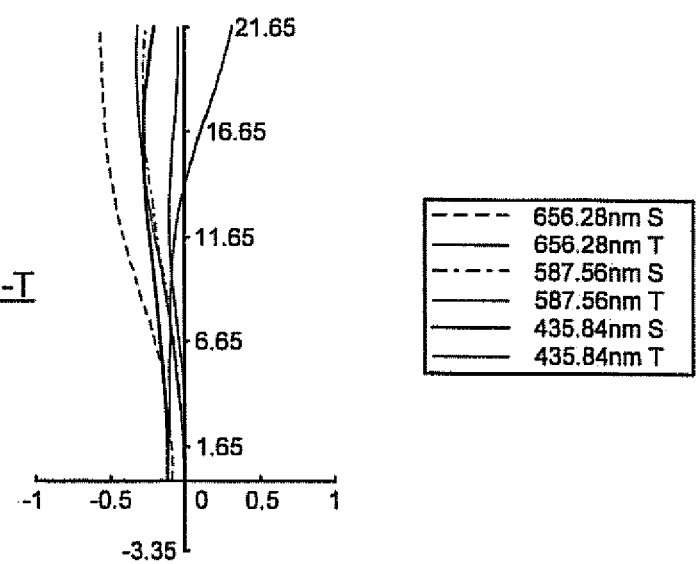
FIG.13C EX1-T

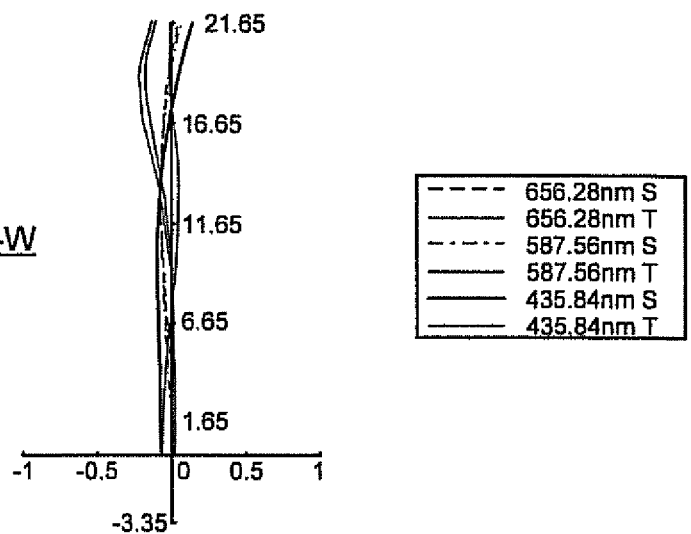
FIG.14A EX2-W
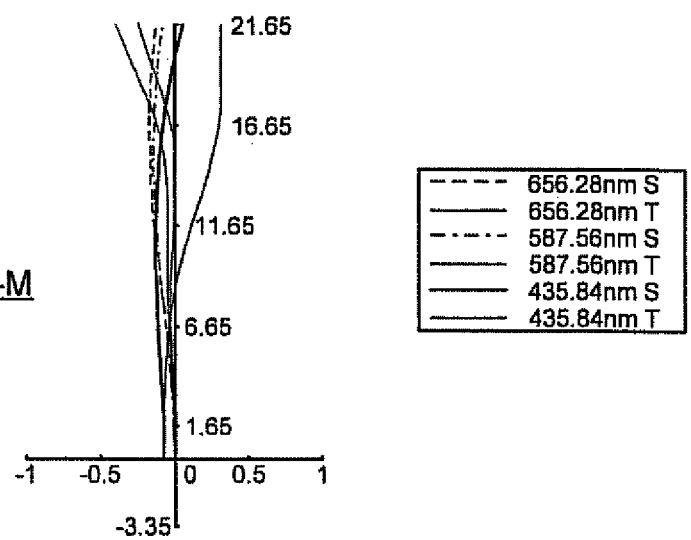
FIG.14B EX2-M
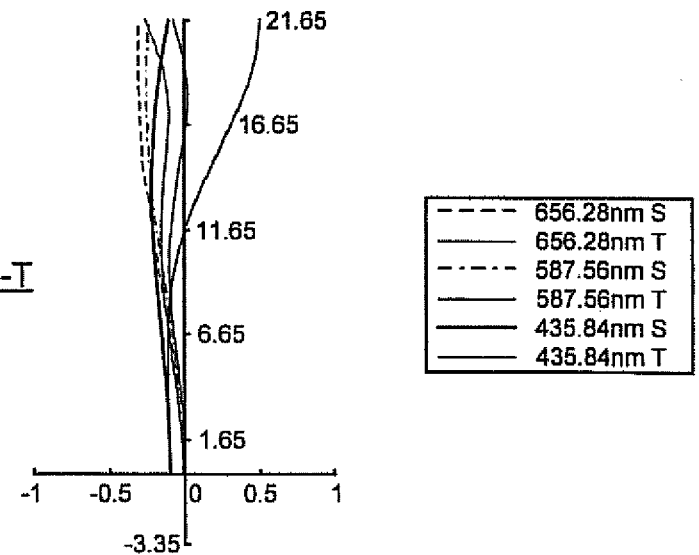
FIG.14C EX2-T

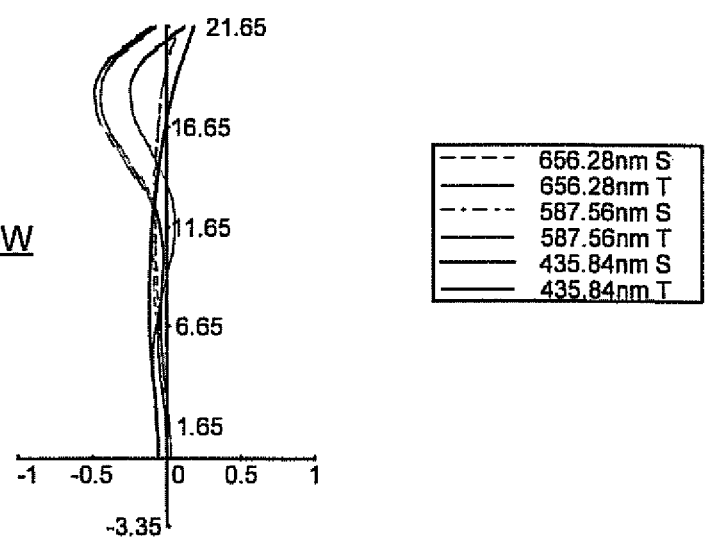
FIG.15A EX3-W
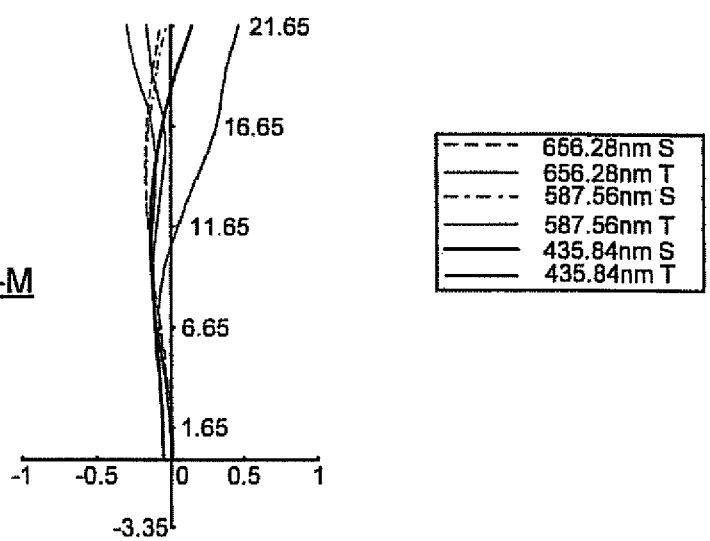
FIG.15B EX3-M
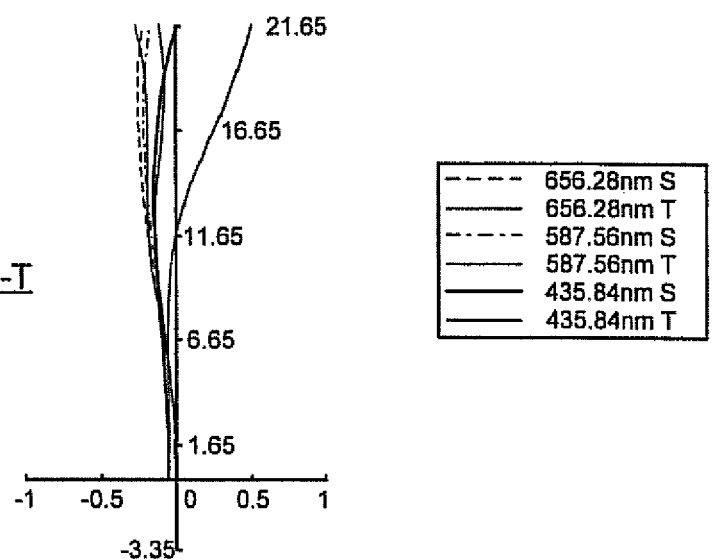
FIG.15C EX3-T

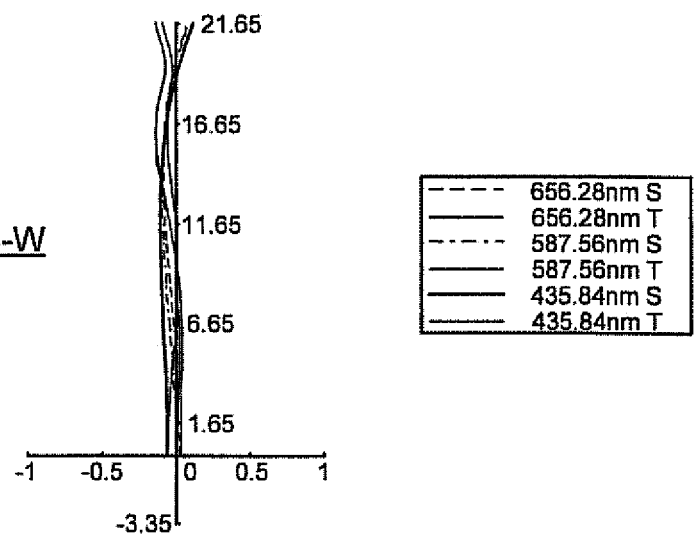
FIG.16A EX4-W
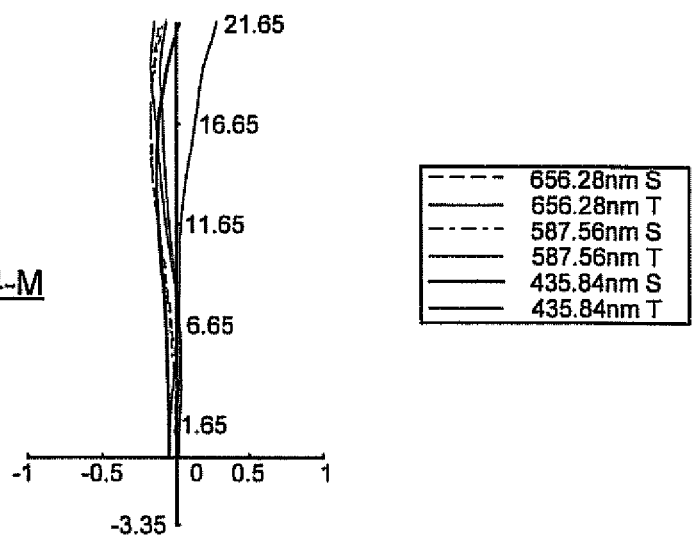
FIG.16B EX4-M
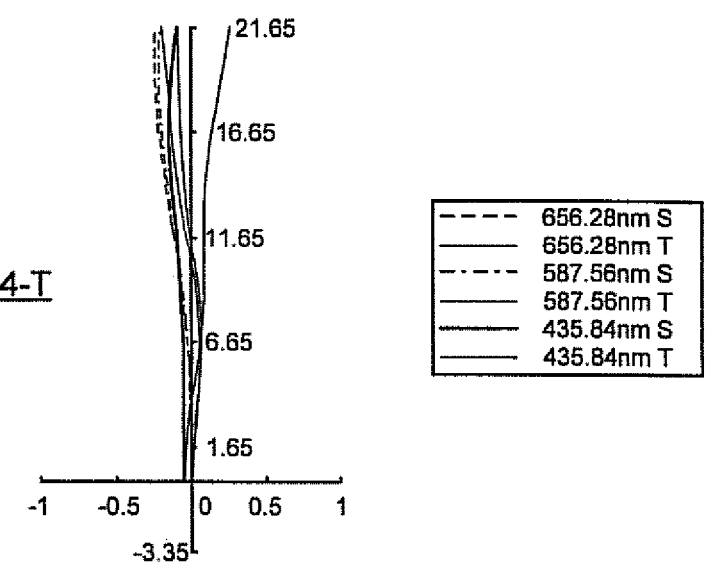
FIG.16C EX4-T

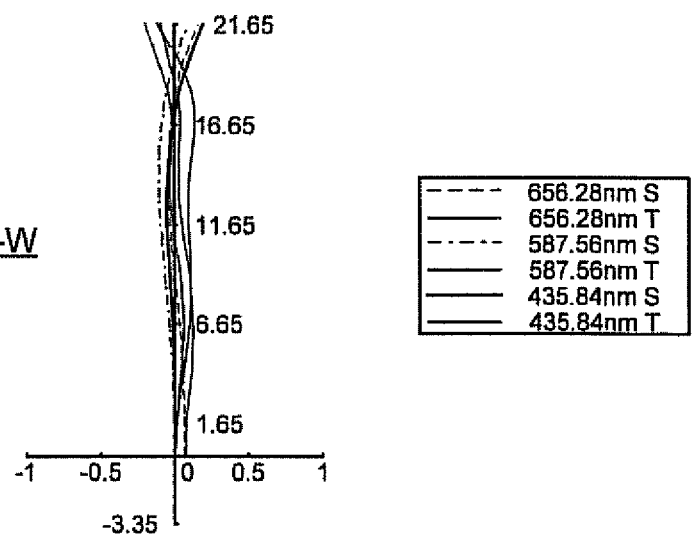
FIG.17A EX5-W
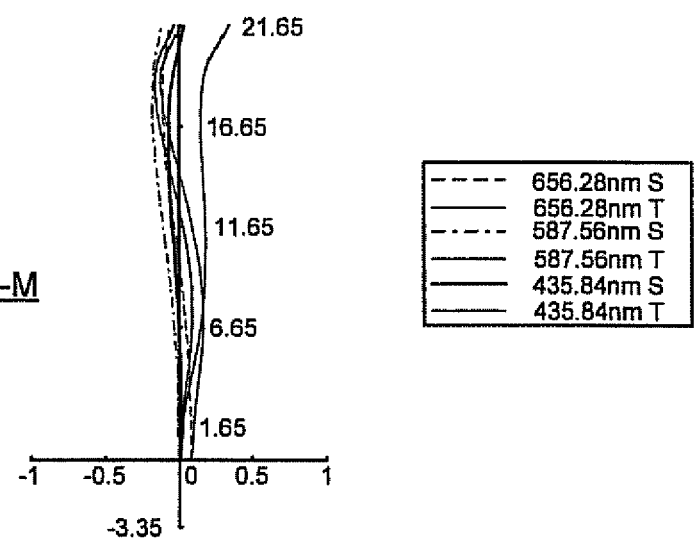
FIG.17B EX5-M
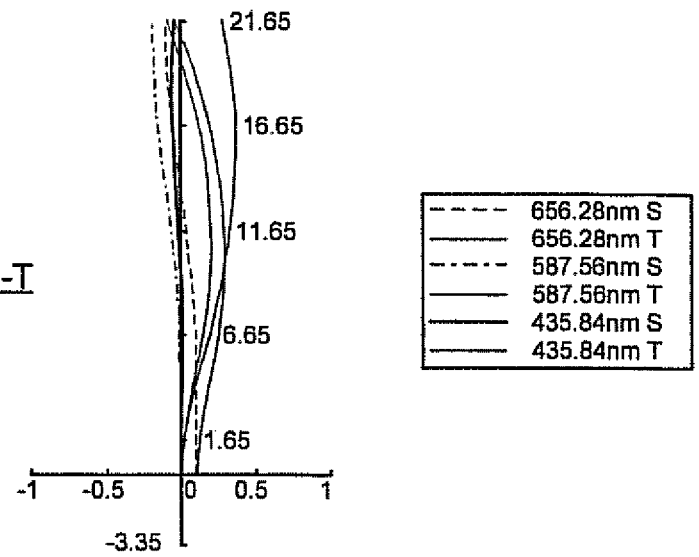
FIG.17C EX5-T

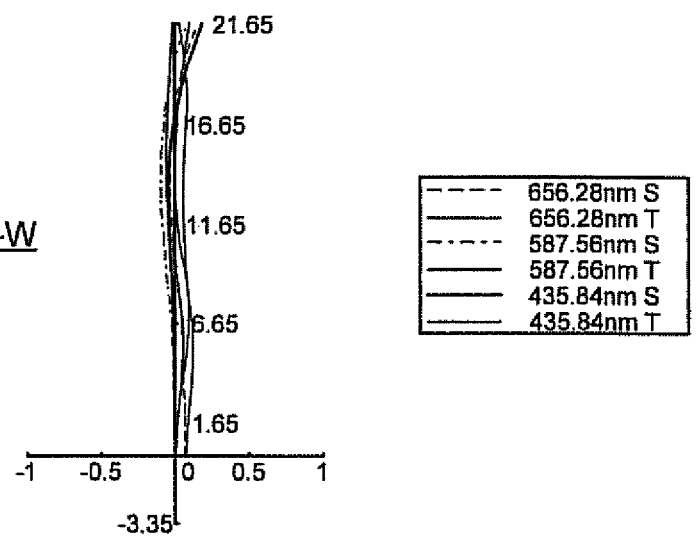
FIG.18A EX6-W
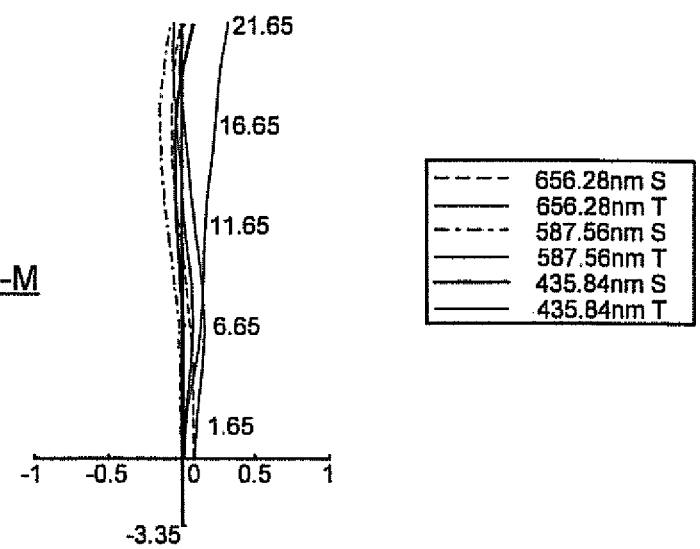
FIG.18B EX6-M
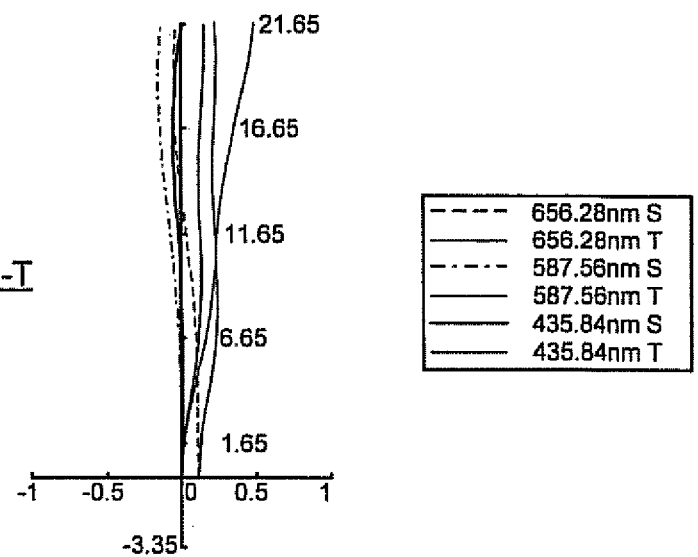
FIG.18C EX6-T

EX1-W
FIG.19A  FIG.19F
FIG.19B  FIG.19G
FIG.19C  FIG.19H
FIG.19D  FIG.19I
FIG.19E  FIG.19J
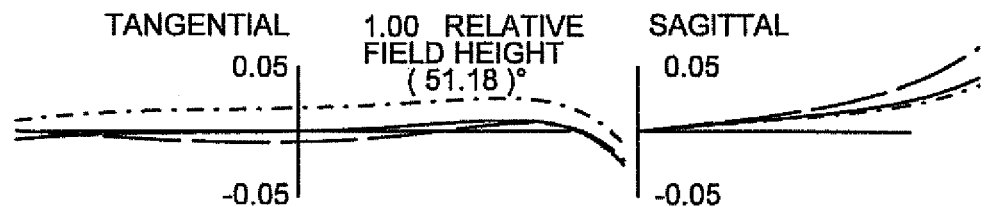
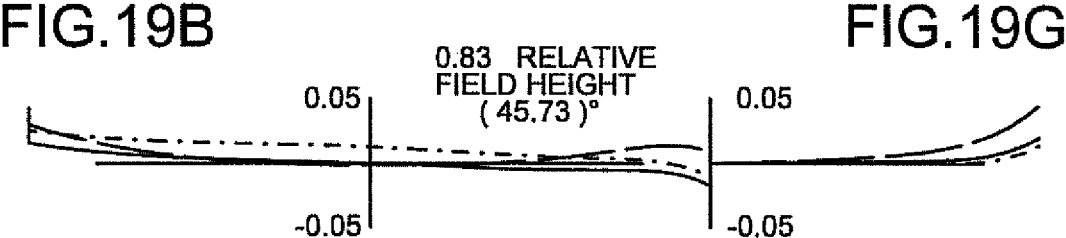
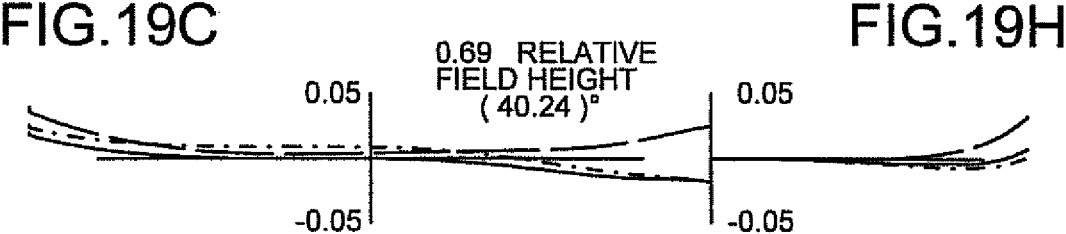
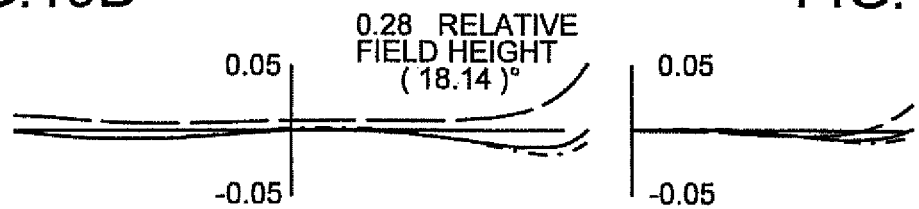
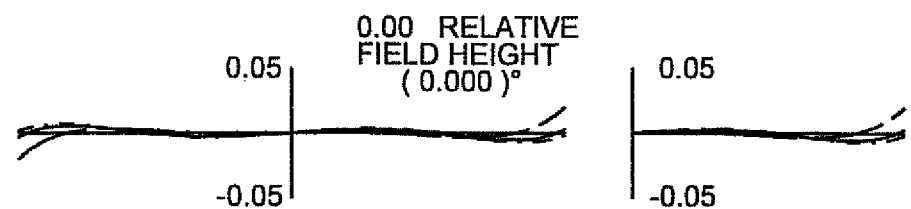

EX1-M

TANGENTIAL  1.00 RELATIVE FIELD HEIGHT (41.70)°

SAGITTAL 0.83 RELATIVE FIELD HEIGHT (36.40)°

0.69 RELATIVE FIELD HEIGHT (31.41)°

0.28 RELATIVE FIELD HEIGHT (13.52)°

0.00 RELATIVE FIELD HEIGHT (0.000)°

EX1-T

EX2-W
FIG.22A / FIG.22F
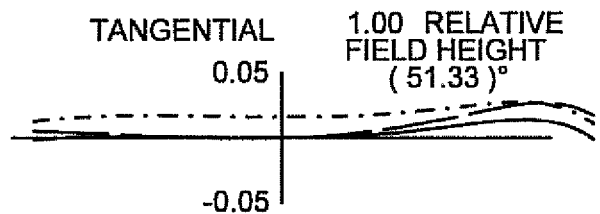 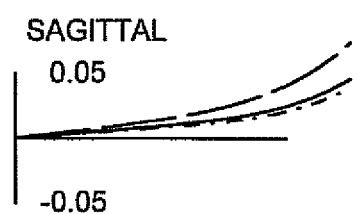
FIG.22B / FIG.22G
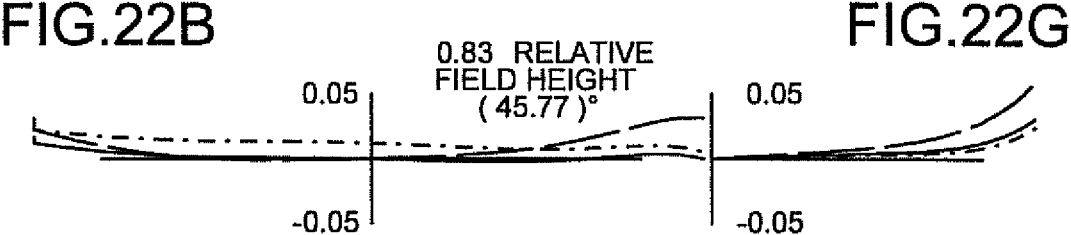
FIG.22C / FIG.22H
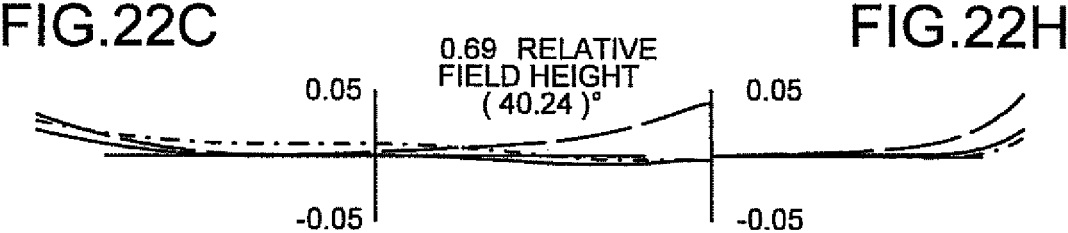
FIG.22D / FIG.22I
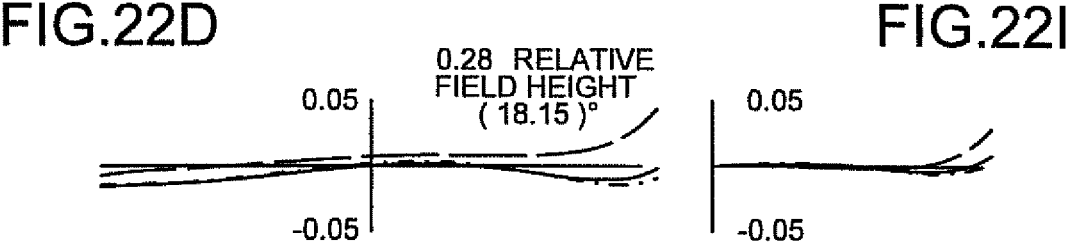
FIG.22E / FIG.22J
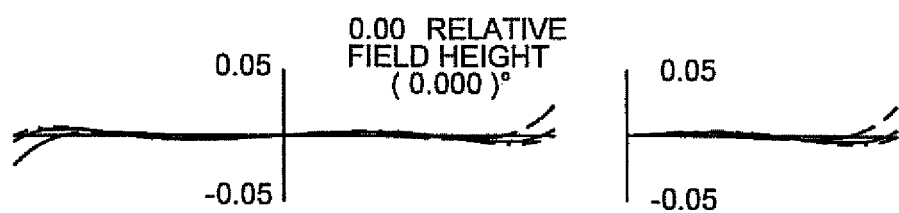

EX2-M

TANGENTIAL   1.00 RELATIVE FIELD HEIGHT (41.79)°

SAGITTAL 0.83 RELATIVE FIELD HEIGHT (36.45)°

0.69 RELATIVE FIELD HEIGHT (31.45)°

0.28 RELATIVE FIELD HEIGHT (13.52)°

0.00 RELATIVE FIELD HEIGHT (0.000)°

EX2-T

EX3-W

TANGENTIAL  1.00 RELATIVE FIELD HEIGHT (51.22)°

SAGITTAL 0.83 RELATIVE FIELD HEIGHT (45.69)°

0.69 RELATIVE FIELD HEIGHT (40.18)°

0.28 RELATIVE FIELD HEIGHT (18.13)°

0.00 RELATIVE FIELD HEIGHT (0.000)°

EX3-M
FIG.26A TANGENTIAL  1.00 RELATIVE FIELD HEIGHT (41.71)°  FIG.26F SAGITTAL
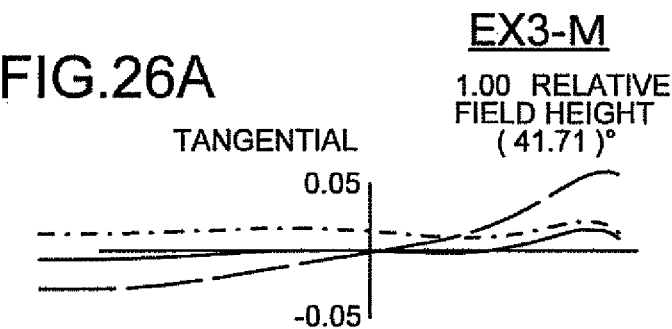
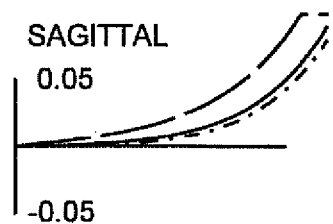
FIG.26B  0.83 RELATIVE FIELD HEIGHT (36.39)°  FIG.26G
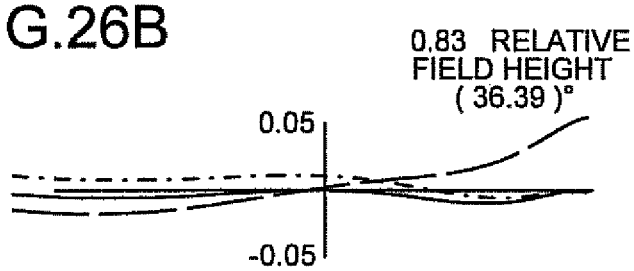
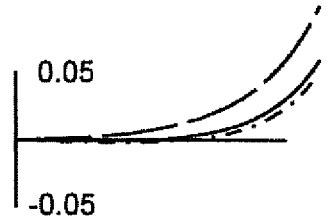
FIG.26C  0.69 RELATIVE FIELD HEIGHT (31.40)°  FIG.26H
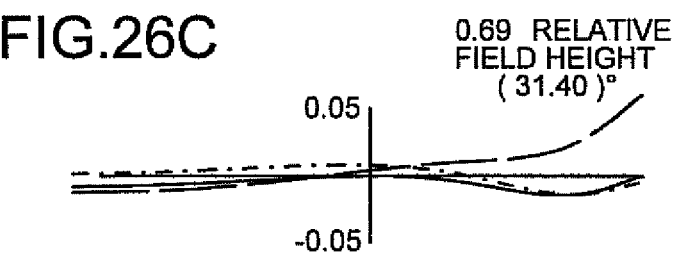
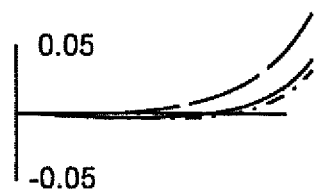
FIG.26D  0.28 RELATIVE FIELD HEIGHT (13.51)°  FIG.26I
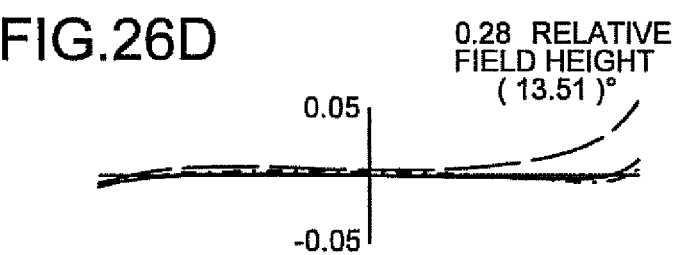
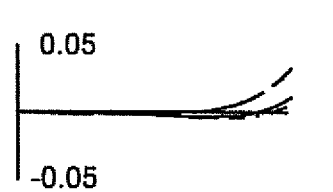
FIG.26E  0.00 RELATIVE FIELD HEIGHT (0.000)°  FIG.26J
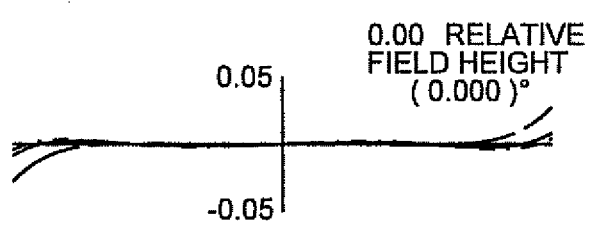
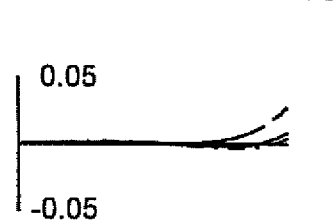

EX3-T

TANGENTIAL
1.00 RELATIVE FIELD HEIGHT (32.89)°

SAGITTAL 0.83 RELATIVE FIELD HEIGHT (28.20)°

0.69 RELATIVE FIELD HEIGHT (24.00)°

0.28 RELATIVE FIELD HEIGHT (10.02)°

0.00 RELATIVE FIELD HEIGHT (0.000)°

EX4-W
FIG.28A FIG.28F
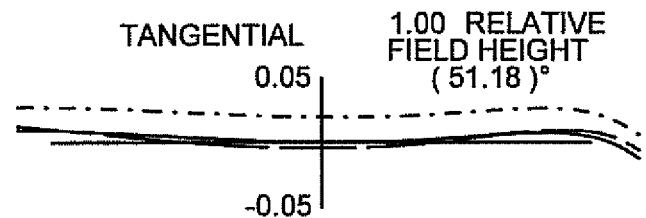
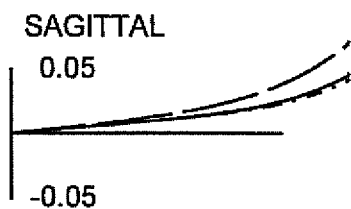
FIG.28B FIG.28G
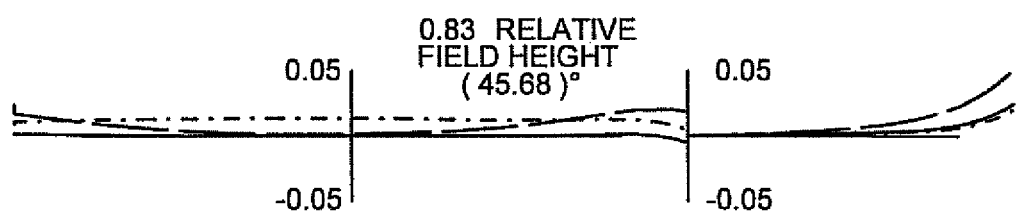
FIG.28C FIG.28H
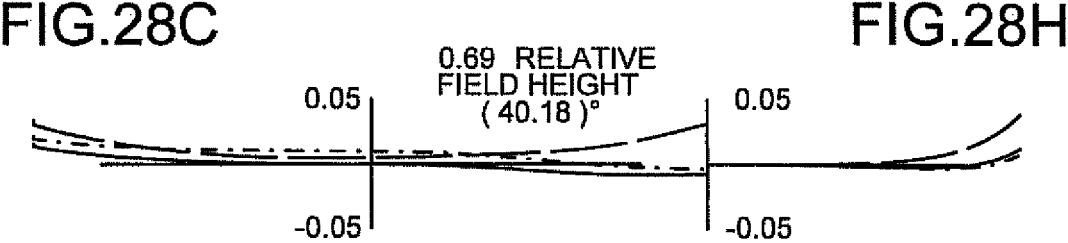
FIG.28D FIG.28I
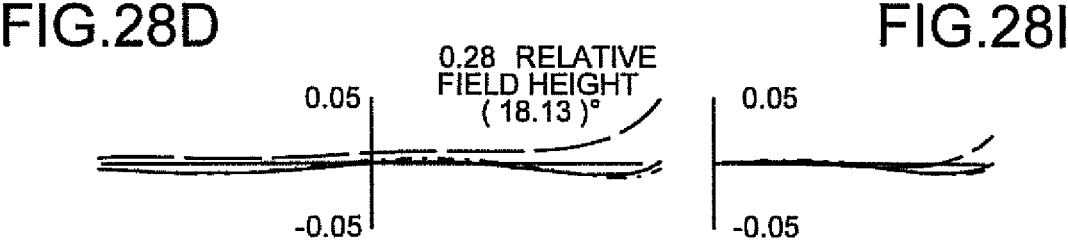
FIG.28E FIG.28J
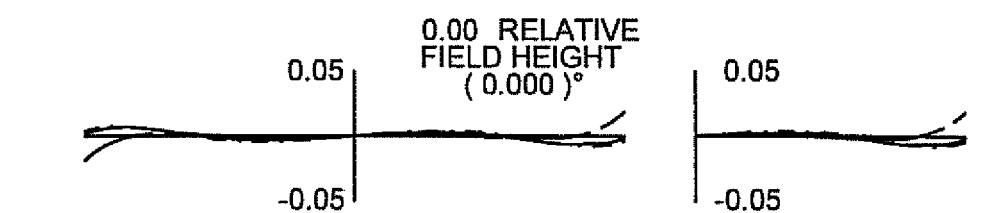

EX4-M

TANGENTIAL 1.00 RELATIVE FIELD HEIGHT (41.67)°

SAGITTAL 0.83 RELATIVE FIELD HEIGHT (36.36)°

0.69 RELATIVE FIELD HEIGHT (31.39)°

0.28 RELATIVE FIELD HEIGHT (13.51)°

0.00 RELATIVE FIELD HEIGHT (0.000)°

EX4-T
FIG.30A
TANGENTIAL 1.00 RELATIVE FIELD HEIGHT (32.87)°
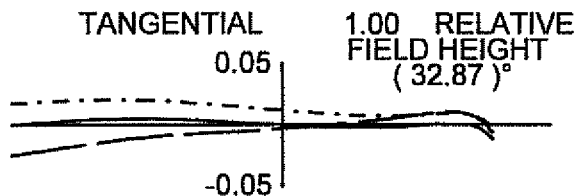
FIG.30F
SAGITTAL
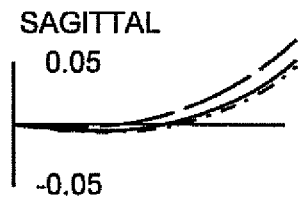
FIG.30B
0.83 RELATIVE FIELD HEIGHT (28.18)°
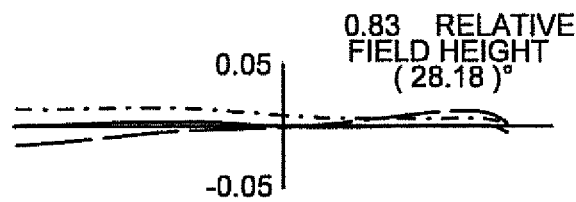
FIG.30G
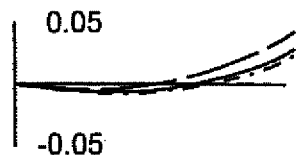
FIG.30C
0.69 RELATIVE FIELD HEIGHT (23.99)°
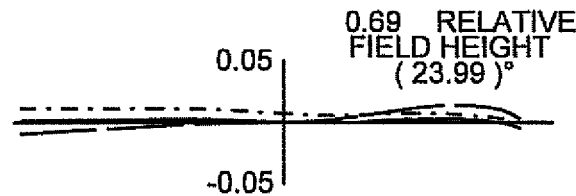
FIG.30H
FIG.30D
0.28 RELATIVE FIELD HEIGHT (10.02)°
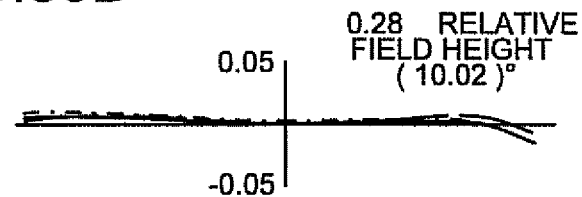
FIG.30I
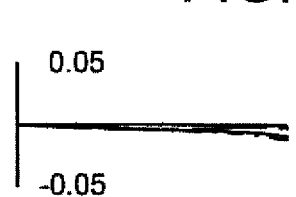
FIG.30E
0.00 RELATIVE FIELD HEIGHT (0.000)°
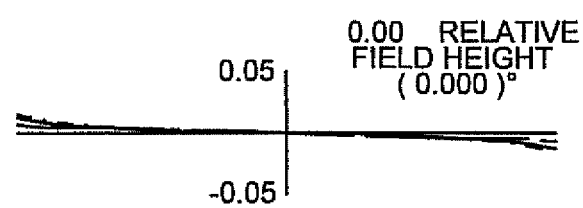
FIG.30J
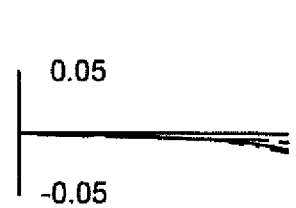

EX5-W
FIG.31A / FIG.31F — 1.00 RELATIVE FIELD HEIGHT (51.38)°
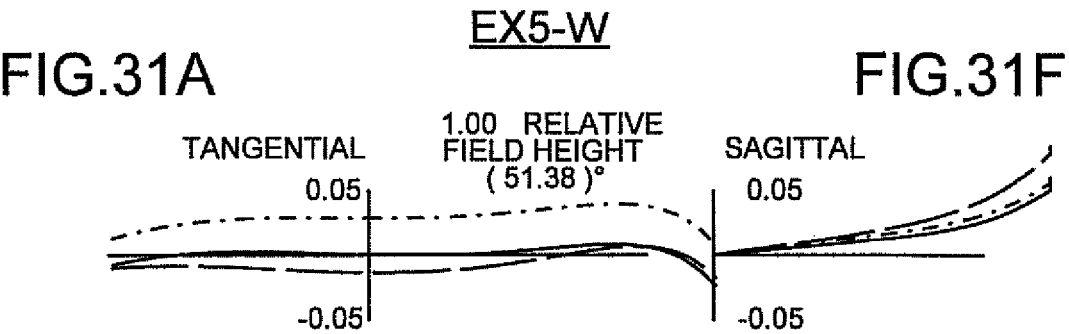
FIG.31B / FIG.31G — 0.83 RELATIVE FIELD HEIGHT (45.96)°
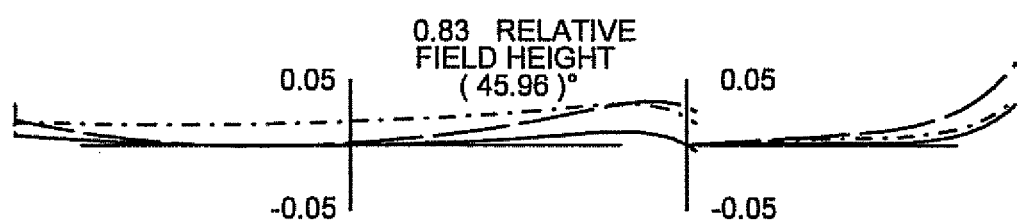
FIG.31C / FIG.31H — 0.69 RELATIVE FIELD HEIGHT (40.46)°
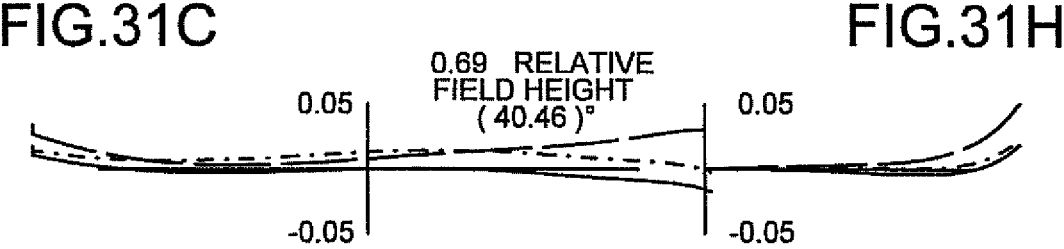
FIG.31D / FIG.31I — 0.28 RELATIVE FIELD HEIGHT (18.28)°
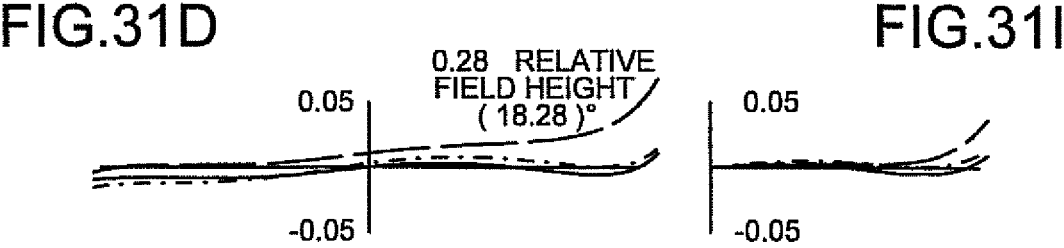
FIG.31E / FIG.31J — 0.00 RELATIVE FIELD HEIGHT (0.000)°
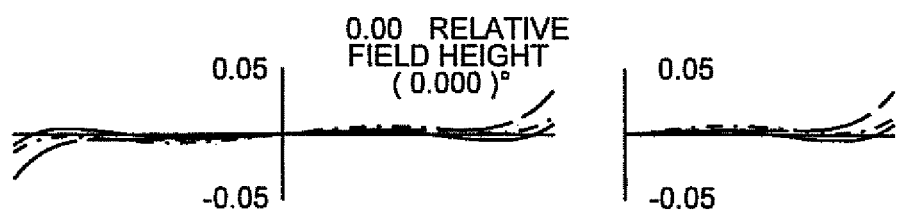

EX5-M

EX5-T

TANGENTIAL  1.00 RELATIVE FIELD HEIGHT (32.90)°

SAGITTAL 0.83 RELATIVE FIELD HEIGHT (28.21)°

0.69 RELATIVE FIELD HEIGHT (24.01)°

0.28 RELATIVE FIELD HEIGHT (10.02)°

0.00 RELATIVE FIELD HEIGHT (0.000)°

EX6-W
FIG.34A / FIG.34F
TANGENTIAL — 1.00 RELATIVE FIELD HEIGHT (51.19)° — SAGITTAL
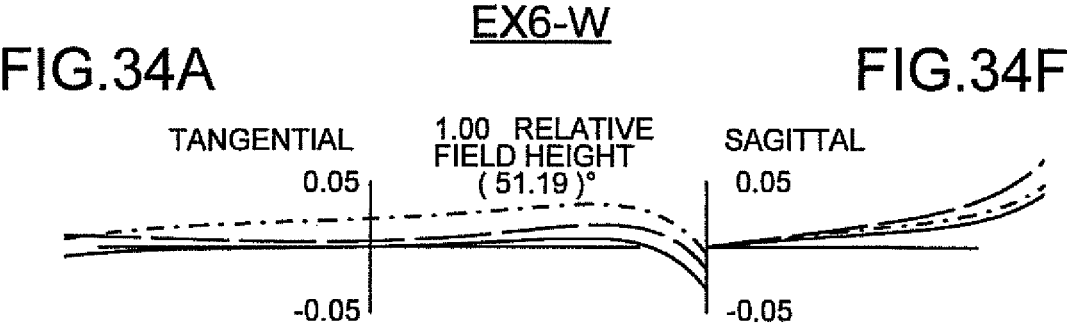
FIG.34B / FIG.34G
0.83 RELATIVE FIELD HEIGHT (45.68)°
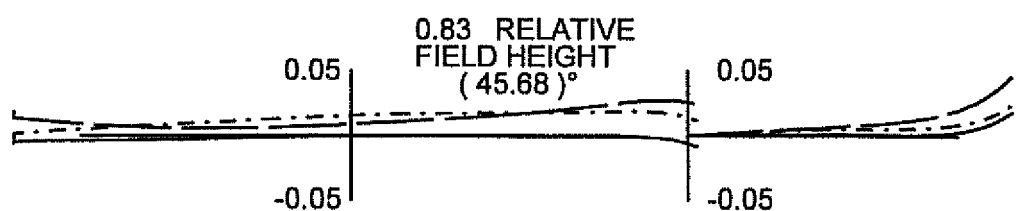
FIG.34C / FIG.34H
0.69 RELATIVE FIELD HEIGHT (40.17)°
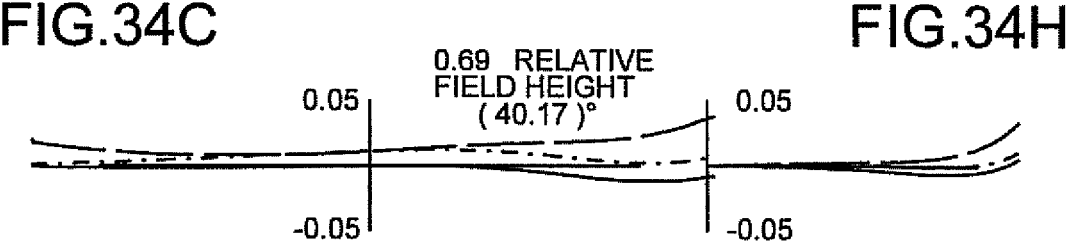
FIG.34D / FIG.34I
0.28 RELATIVE FIELD HEIGHT (18.14)°
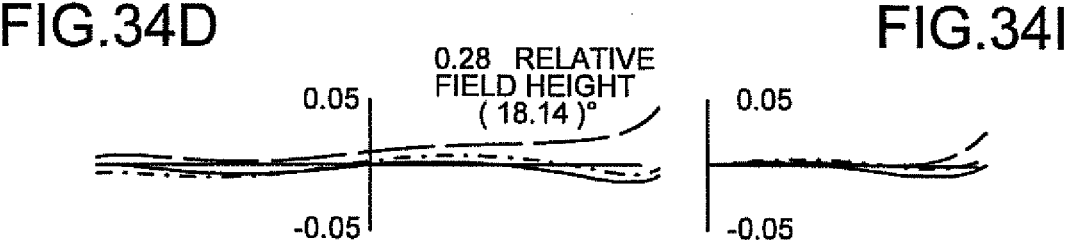
FIG.34E / FIG.34J
0.00 RELATIVE FIELD HEIGHT (0.000)°
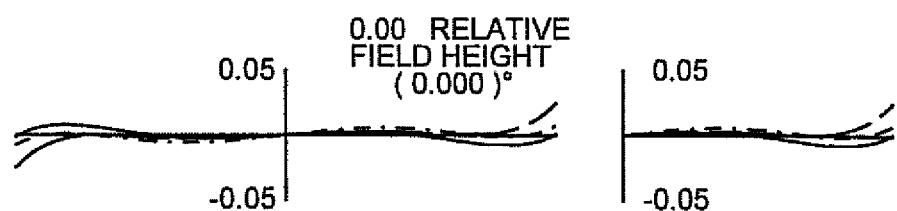

EX6-M

TANGENTIAL   1.00 RELATIVE FIELD HEIGHT (41.66)°

SAGITTAL 0.83 RELATIVE FIELD HEIGHT (36.35)°

0.69 RELATIVE FIELD HEIGHT (31.38)°

0.28 RELATIVE FIELD HEIGHT (13.51)°

0.00 RELATIVE FIELD HEIGHT (0.000)°

EX6-T
FIG.36A
TANGENTIAL  1.00 RELATIVE FIELD HEIGHT (32.85)°
FIG.36F
SAGITTAL
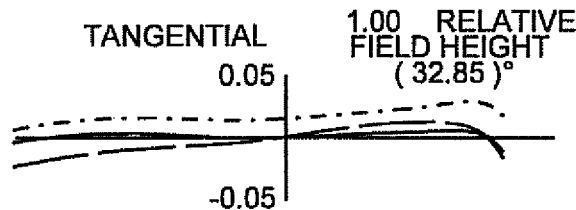
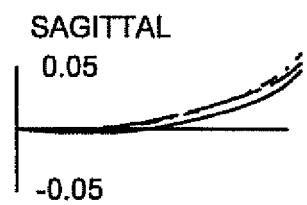
FIG.36B
0.83 RELATIVE FIELD HEIGHT (28.17)°
FIG.36G
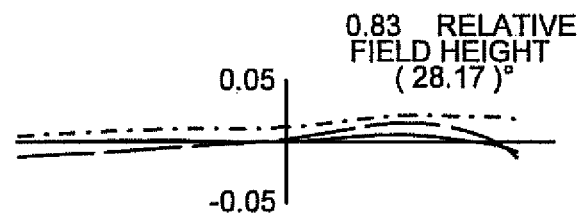
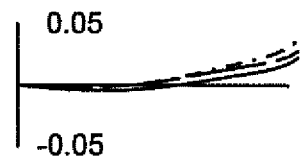
FIG.36C
0.69 RELATIVE FIELD HEIGHT (23.99)°
FIG.36H
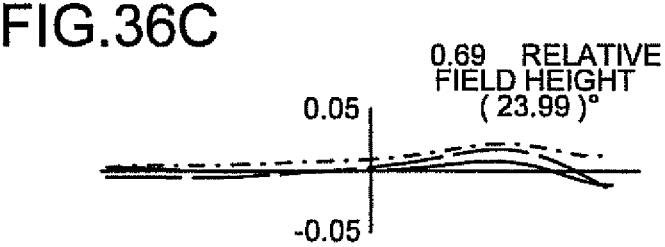
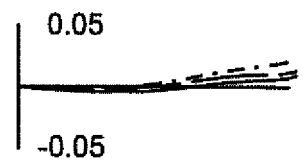
FIG.36D
0.28 RELATIVE FIELD HEIGHT (10.02)°
FIG.36I
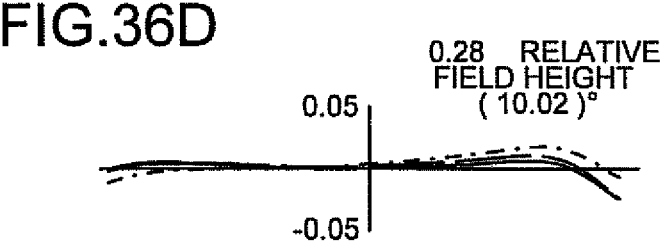
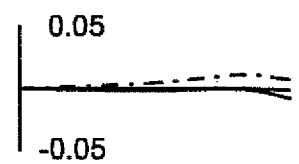
FIG.36E
0.00 RELATIVE FIELD HEIGHT (0.000)°
FIG.36J
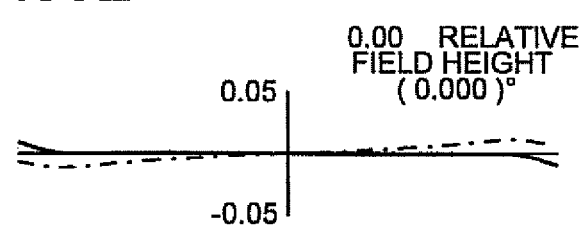
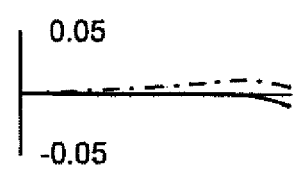

ZOOM LENS SYSTEM, IMAGING OPTICAL DEVICE, AND DIGITAL APPLIANCE

RELATED APPLICATIONS

This is a U.S. National Phase Application under 35 USC 371 of International Application PCT/JP2013/068363 filed on Jul. 4, 2013.

This application claims the priority of Japanese application no. 2012-154314 filed Jul. 10, 2012, the entire content of which is hereby incorporated by reference.

TECHNICAL FIELD

The present invention relates to a zoom lens system, an imaging optical device, and a digital appliance. More particularly, the present invention relates to a compact zoom lens system suitable for a digital camera which captures an image of a subject by means of an image sensor; an imaging optical device which outputs, in the form of an electrical signal, an image of a subject captured by such a zoom lens system and an image sensor; and a digital appliance, such as a digital camera, furnished with an image input function through incorporation of such an imaging optical device.

BACKGROUND ART

Conventionally, many zoom lens systems have been proposed that comprise two, i.e., a negative and a positive, lens groups. For example, Patent Document 1 identified below proposes a zoom lens system wherein a second lens group is composed of a front group and a rear group and the front group is used as a focusing group to achieve compactness. Inconveniently, however, the zoom lens system proposed in Patent Document 1 produces large curvature of field at the periphery of the image field, and produces large chromatic coma.

LIST OF CITATIONS

Patent Literature

Patent Document 1: JP-A-2001-330774

SUMMARY OF THE INVENTION

Problem to be Solved by the Invention

The recent digitalization has made it possible for the user to see a shot image to all its corners in its actual size on a monitor. This has brought demand for high MTF (modulation transfer function) performance, not only around the axis but up to the periphery, in combination with reduced chromatic aberration. However, coping with digitalization requires, for reasons related to the design of a CCD (charge-coupled device), a longer distance to the exit pupil position. This tends to lead to an increased total length, making it difficult to achieve high performance and compactness simultaneously, as in the case of the zoom lens system proposed in Patent Document 1.

Against the background discussed above, an object of the present invention is to provide a zoom lens system, and an imaging optical device and a digital appliance provided with it as well, that is compact but that nevertheless has satisfactorily corrected curvature of field from axis to periphery over the entire zoom range combined with reduced chromatic aberration of curvature of field and reduced chromatic coma.

Means for Solving the Problem

To achieve the above object, according to a first aspect of the present invention, a zoom lens system is provided with, from the object side, a first lens group having a negative optical power and a second lens group having a positive optical power, and achieves zooming by varying the group-to-group distance. Here, the second lens group includes at least one three-element cemented lens which is a set of three lens elements cemented together including, from the object side, a first lens element having a negative optical power, a second lens element having a positive optical power, and a third lens element having a negative optical power. Moreover, the three-element cemented lens fulfills conditional formulas (1) to (3) below:

$$0.08 < (rs2+rs1)/(rs2-rs1) < 0.5 \tag{1}$$

$$27 < v2-v1 < 40 \tag{2}$$

$$20 < v2-v3 < 38 \tag{3}$$

where rs1 represents the radius of curvature of the object-side cemented surface of the three-element cemented lens;

rs2 represents the radius of curvature of the image-side cemented surface of the three-element cemented lens;

v1 represents the Abbe number of the first lens element of the three-element cemented lens;

v2 represents the Abbe number of the second lens element of the three-element cemented lens;

v3 represents the Abbe number of the third lens element of the three-element cemented lens.

According to a second aspect of the present invention, in the above-described zoom lens system according to the first aspect, the first and second lens groups fulfill conditional formula (4) below:

$$-0.8 < f1/f2 < -0.5 \tag{4}$$

where f1 represents the focal length of the first lens group; and
f2 represents the focal length of the second lens group.

According to a third aspect of the present invention, in the above-described zoom lens system according to the first or second aspect, the second lens group includes, from the object side, a front group, an aperture stop, and a rear group; includes the three-element cemented lens in the rear group; and fulfills conditional formula (5) below:

$$-1 < fs/f2\_r < -0.3 \tag{5}$$

where f2_r represents the focal length of the rear group of the second lens group; and fs represents the focal length of the three-element cemented lens in the second lens group.

According to a fourth aspect of the present invention, in the above-described zoom lens system according to any of the first to third aspects, the first lens group includes two composite aspherical surfaces that fulfill conditional formula (6) below:

$$4.8 < \Delta X\_max/\Delta X\_min < 6.0 \tag{6}$$

where, with respect to the thickness, in the optical axis direction, of the resin forming the composite aspherical surfaces, $\Delta X\_max$ represents the maximum resin thickness; and
$\Delta X\_min$ represents the minimum resin thickness.

According to a fifth aspect of the present invention, in the above-described zoom lens system according to any of the first to fourth aspects, the second lens group includes, from the object side, a front group, an aperture stop, and a rear group, and the rear group includes three lens components comprising a positive, a negative, and a positive lens component which are each a single or cemented lens element.

According to a sixth aspect of the present invention, an imaging optical device is provided with the above-described zoom lens system according to any one of the first to fifth aspects; and an image sensor for converting an optical image formed on a light-receiving surface into an electrical signal. Here, the zoom lens system is arranged such that an optical image of a subject is formed on the light-receiving surface of the image sensor.

According to a seventh aspect of the present invention, a digital appliance is provided with the above-described imaging optical device according to the sixth aspect so as to have at least one of a function of shooting a still image of the subject or a function of shooting a moving image of the subject.

ADVANTAGEOUS EFFECTS OF THE INVENTION

According to the present invention, owing to the arrangement of a three-element cemented lens fulfilling predetermined conditions in the second lens group in a two-group zoom type, it is possible to obtain a high-performance zoom lens system, and hence a high-performance imaging optical device, that is compact but that nevertheless has satisfactorily corrected curvature of field from axis to periphery over the entire zoom range combined with reduced chromatic aberration of curvature of field and reduced chromatic coma. Using such a compact high-performance zoom lens system or imaging optical device in a digital appliance (for example, a digital camera) makes it possible to add a high-performance image input function to the digital appliance in a compact fashion.

BRIEF DESCRIPTION OF DRAWINGS

FIGS. 7A to 7I are longitudinal aberration diagrams of Example 1;

FIGS. 8A to 8I are longitudinal aberration diagrams of Example 2;

FIGS. 9A to 9I are longitudinal aberration diagrams of Example 3;

FIGS. 10A to 10I are longitudinal aberration diagrams of Example 4;

FIGS. 11A to 11I are longitudinal aberration diagrams of Example 5;

FIGS. 12A to 12I are longitudinal aberration diagrams of Example 6;

FIGS. 13A to 13C are aberration diagrams showing chromatic aberration of curvature of field in Example 1;

FIGS. 14A to 14C are aberration diagrams showing chromatic aberration of curvature of field in Example 2;

FIGS. 15A to 15C are aberration diagrams showing chromatic aberration of curvature of field in Example 3;

FIGS. 16A to 16C are aberration diagrams showing chromatic aberration of curvature of field in Example 4;

FIGS. 17A to 17C are aberration diagrams showing chromatic aberration of curvature of field in Example 5;

FIGS. 18A to 18C are aberration diagrams showing chromatic aberration of curvature of field in Example 6;

FIGS. 19A to 19J are lateral aberration diagrams showing chromatic coma at the wide-angle end in Example 1;

FIGS. 22A to 22J are lateral aberration diagrams showing chromatic coma at the wide-angle end in Example 2;

FIGS. 26A to 26J are lateral aberration diagrams showing chromatic coma at the mid-focal-length position in Example 3;

FIGS. 28A to 28J are lateral aberration diagrams showing chromatic coma at the wide-angle end in Example 4;

FIGS. 30A to 30J are lateral aberration diagrams showing chromatic coma at the telephoto end in Example 4;

FIGS. 31A to 31J are lateral aberration diagrams showing chromatic coma at the wide-angle end in Example 5;

FIGS. 34A to 34J are lateral aberration diagrams showing chromatic coma at the wide-angle end in Example 6;

FIGS. 36A to 36J are lateral aberration diagrams showing chromatic coma at the telephoto end in Example 6.

DESCRIPTION OF EMBODIMENTS

Figure 1:
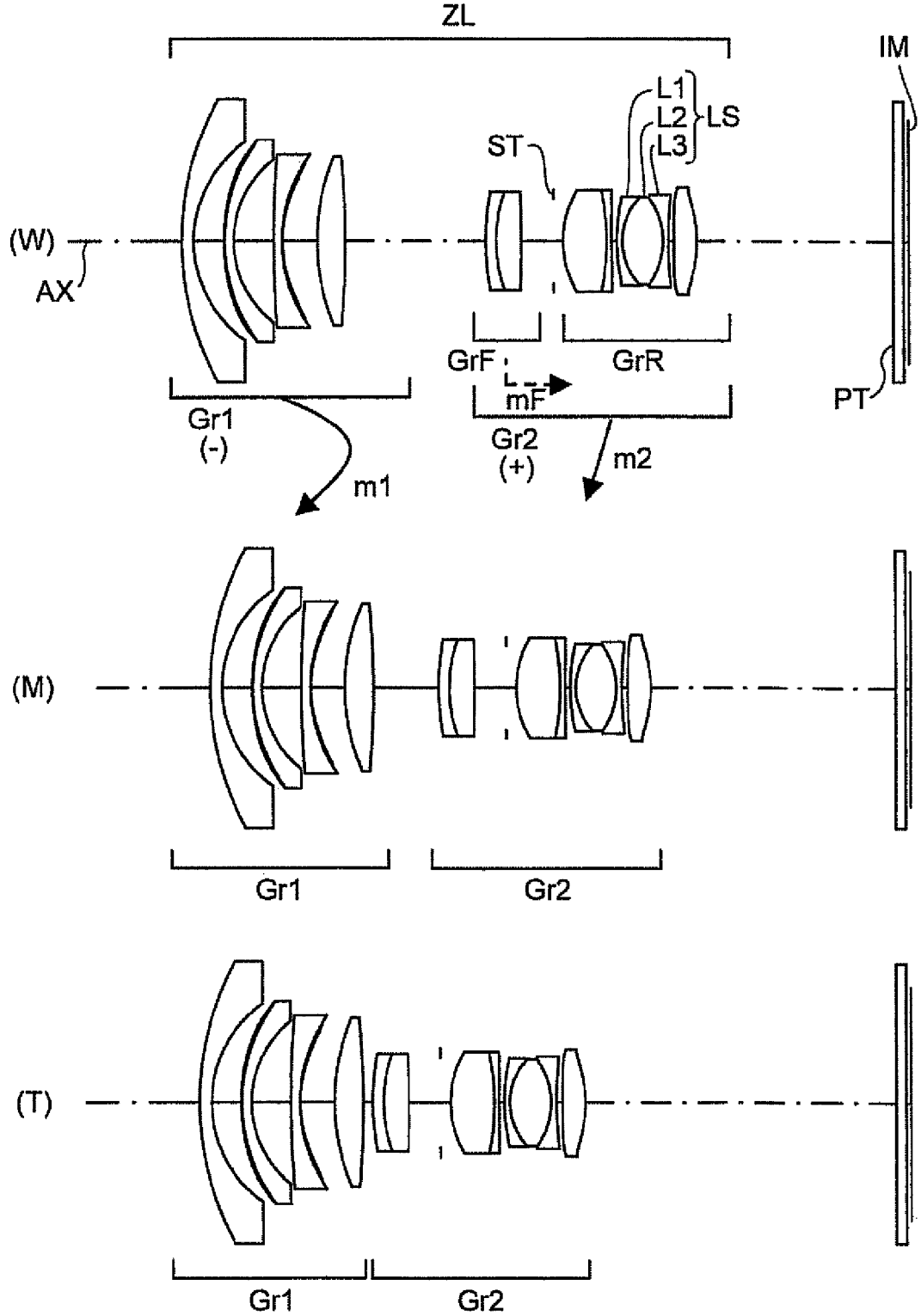
FIG. 1 is an optical construction diagram of the first embodiment (Example 1)
Figure 2:
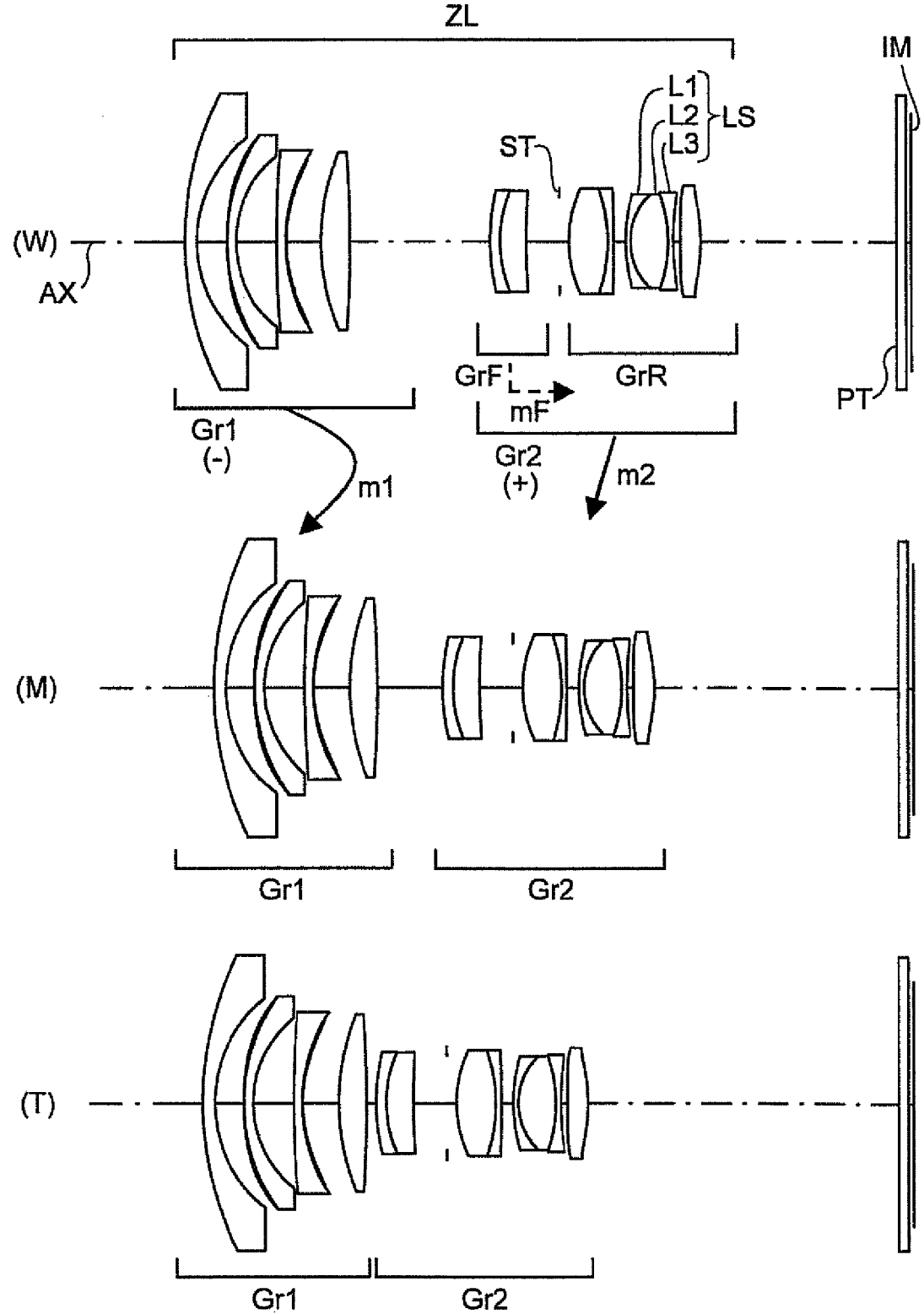
FIG. 2 is an optical construction diagram of the second embodiment (Example 2)
Figure 3:
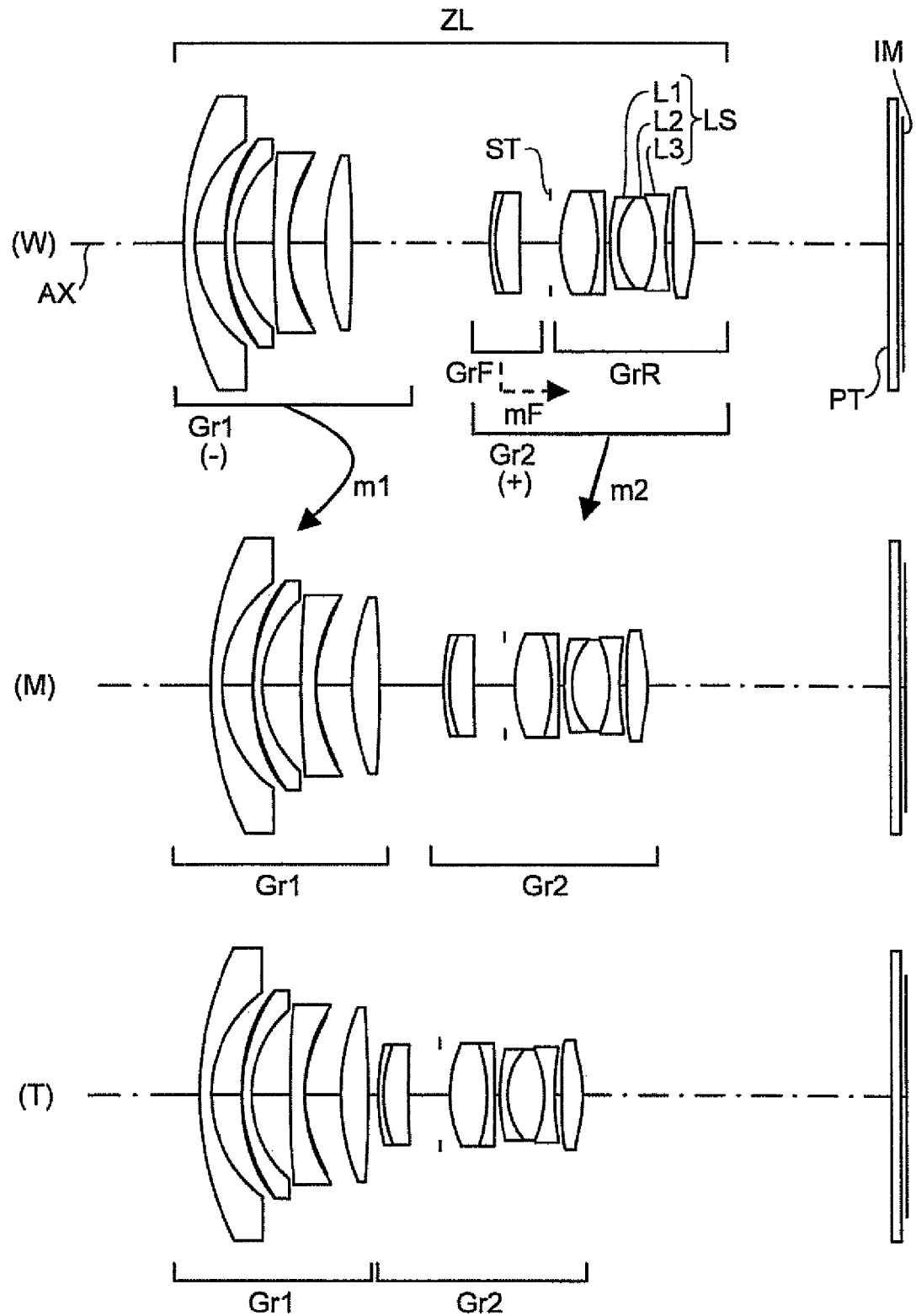
FIG. 3 is an optical construction diagram of the third embodiment (Example 3)
Figure 4:
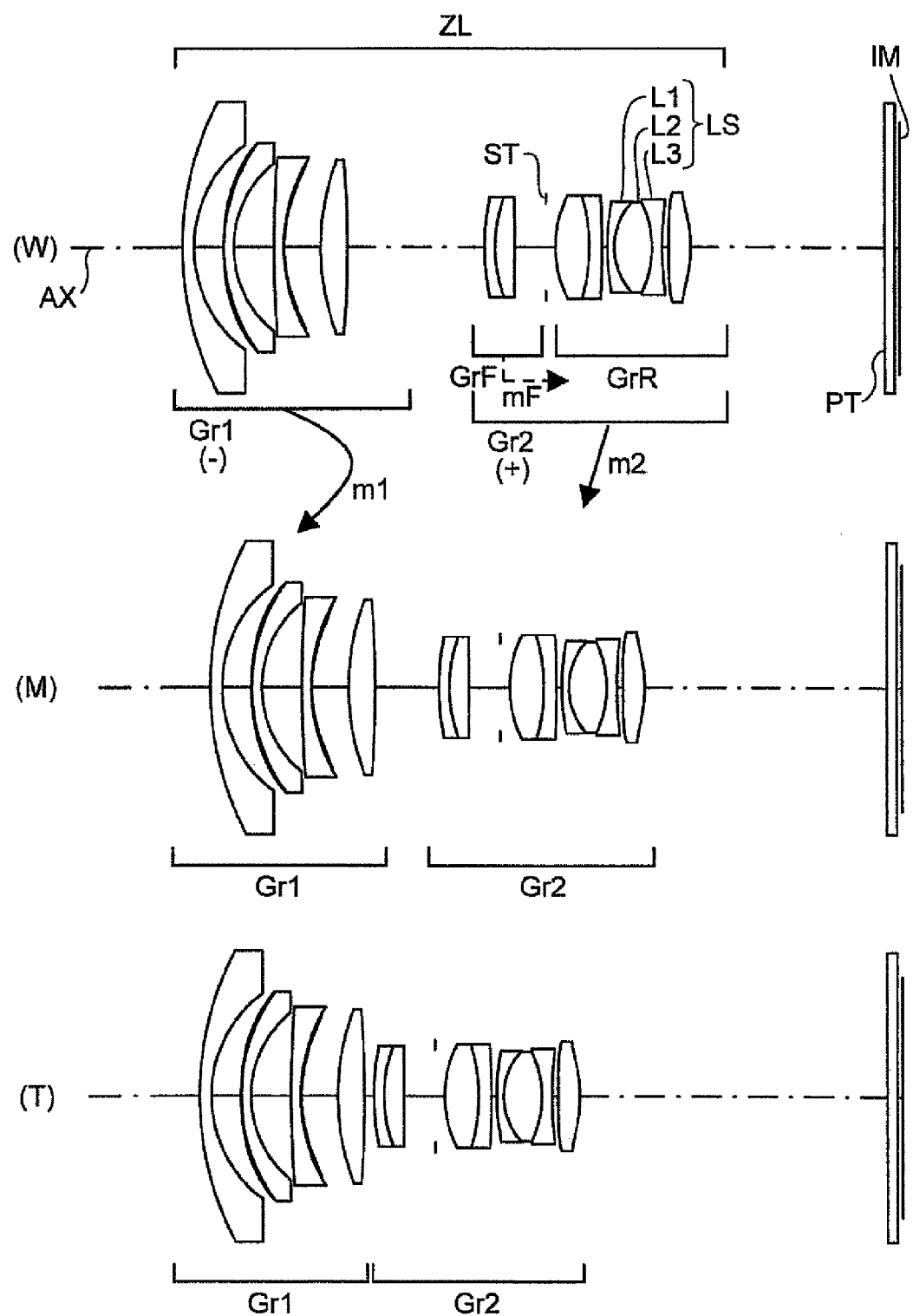
FIG. 4 is an optical construction diagram of the fourth embodiment (Example 4)
Figure 5:
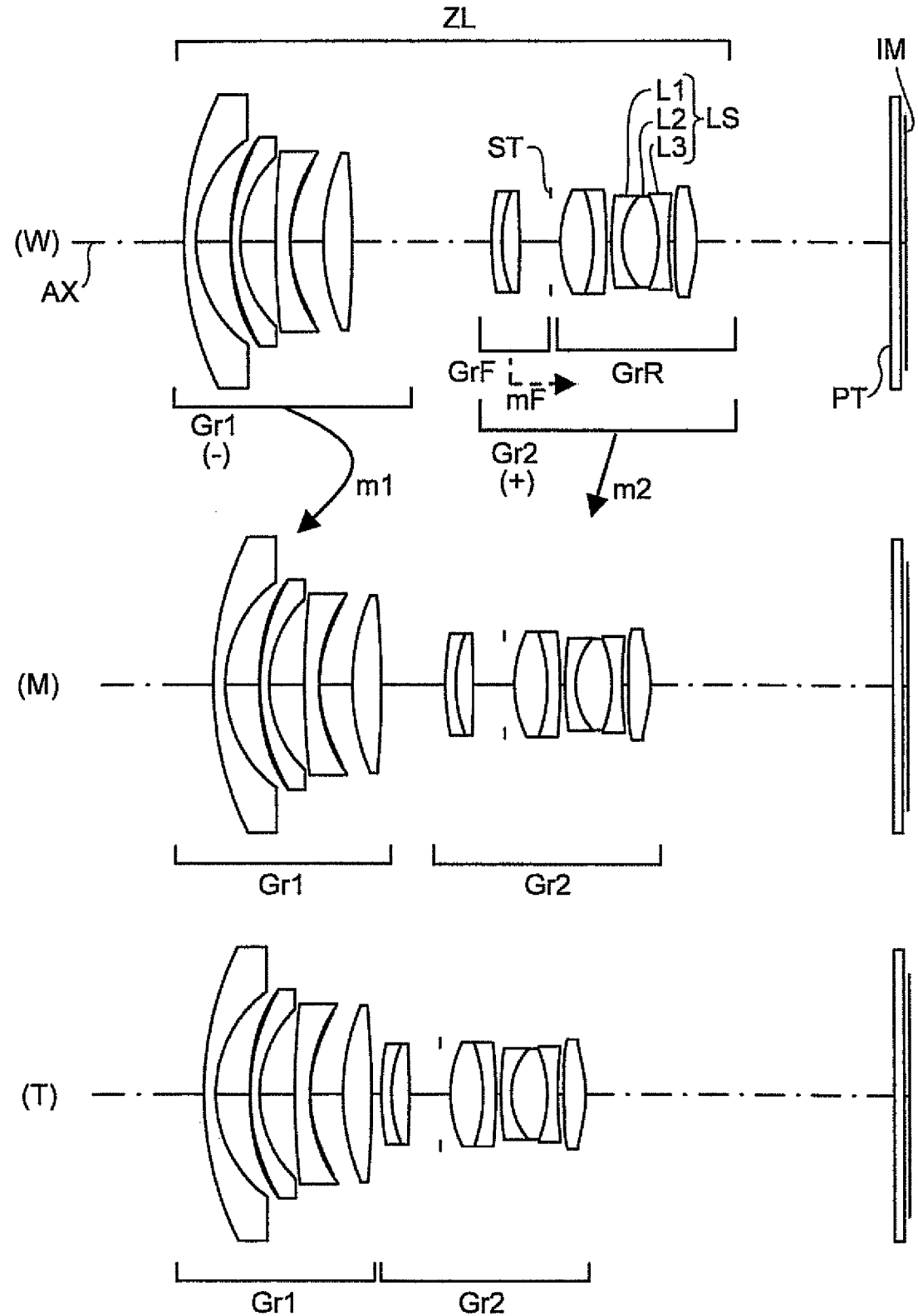
FIG. 5 is an optical construction diagram of the fifth embodiment (Example 5)
Figure 6:
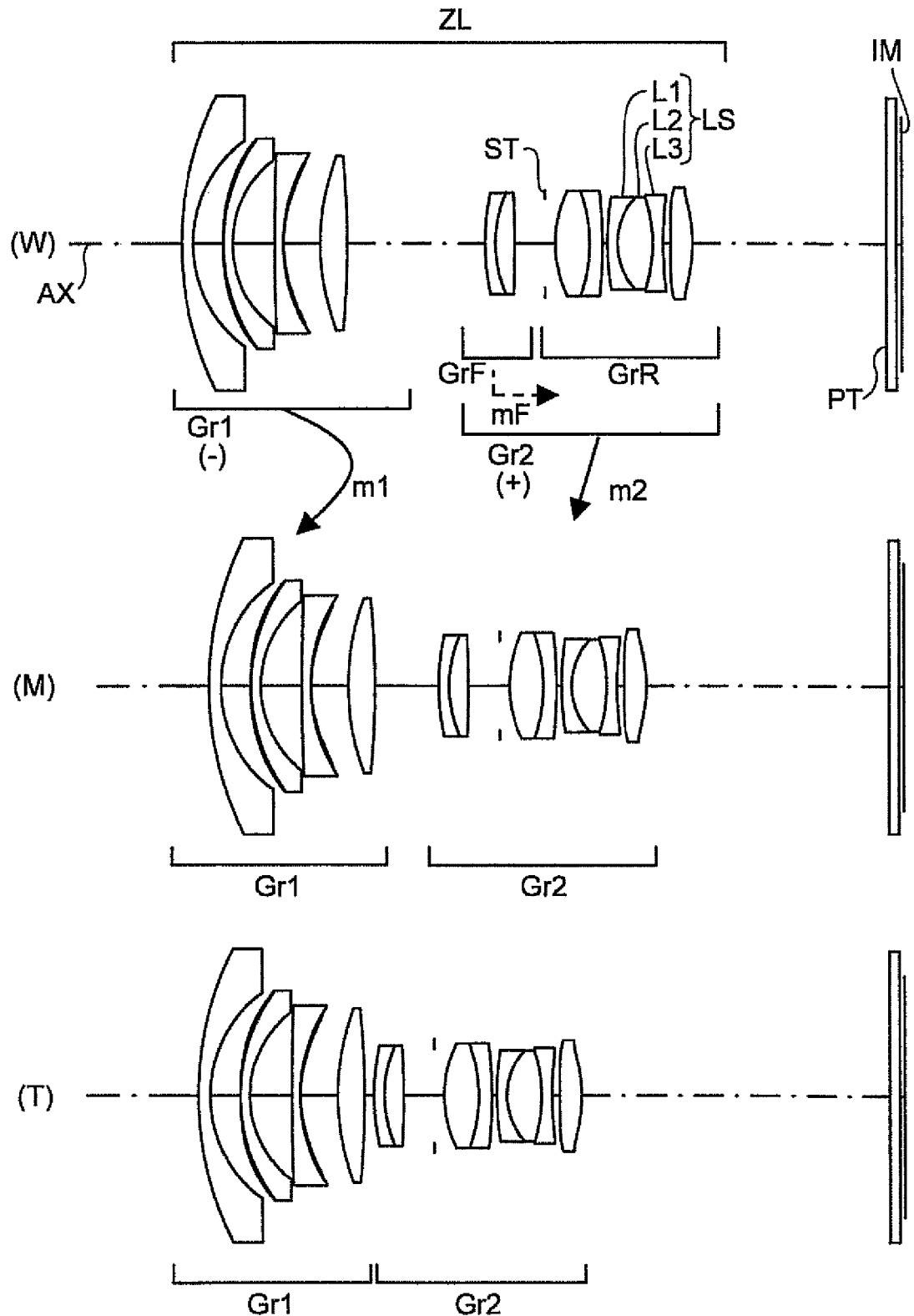
FIG. 6 is an optical construction diagram of the sixth embodiment (Example 6)
Figure 20A:
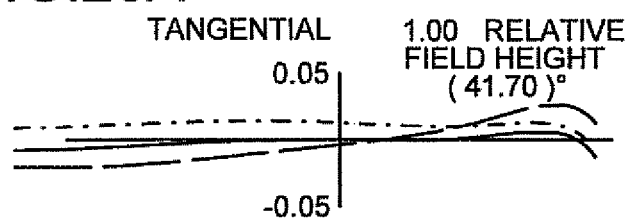
FIGS. 20A to 20J are lateral aberration diagrams showing chromatic coma at the mid-focal-length position in Example 1.
Figure 20F:
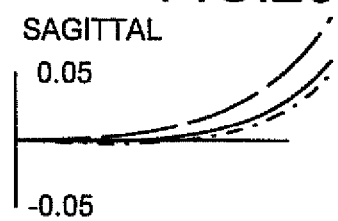
Figure 20B:
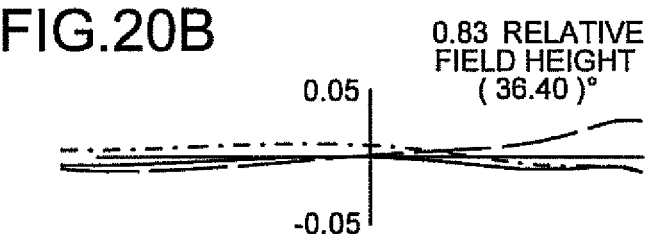
Figure 20G:
Figure 20C:
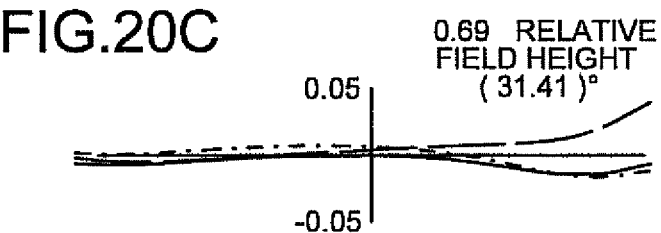
Figure 20H:
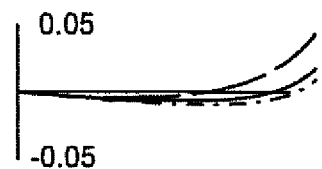
Figure 20D:
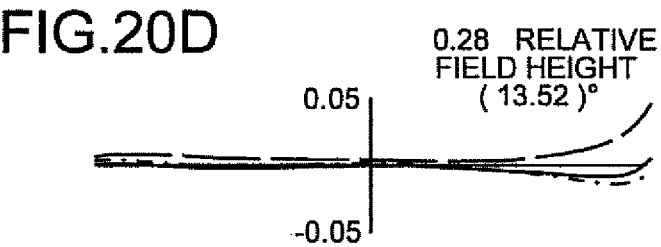
Figure 20I:
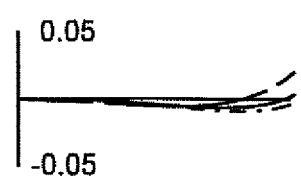
Figure 20E:
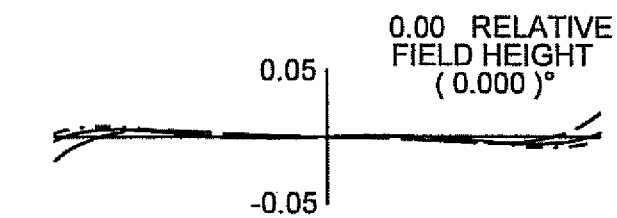
Figure 20J:
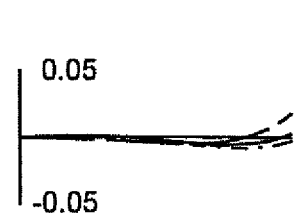
Figure 21A:
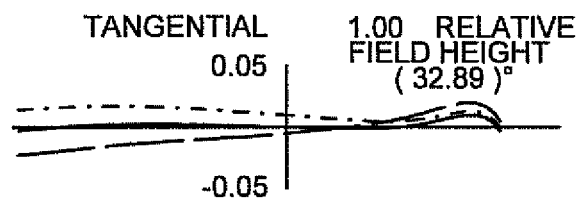
FIGS. 21A to 21J are lateral aberration diagrams showing chromatic coma at the telephoto end in Example 1.
Figure 21F:
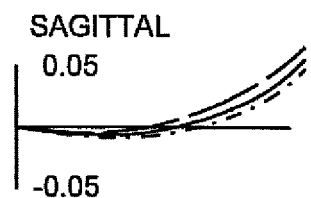
Figure 21B:
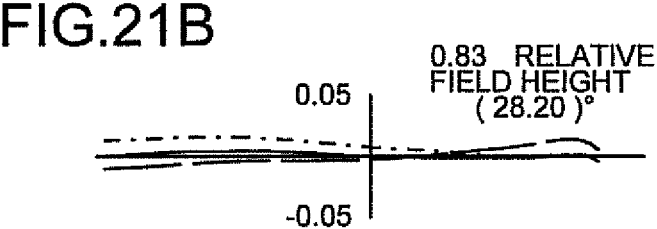
Figure 21G:
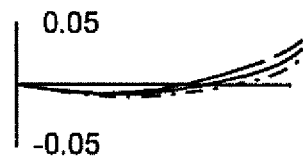
Figure 21C:
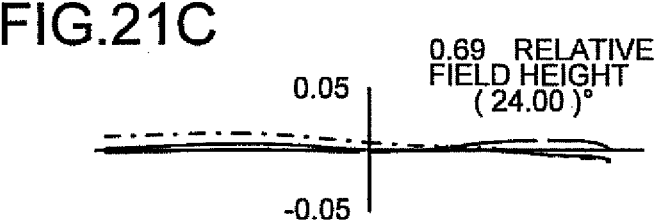
Figure 21H:
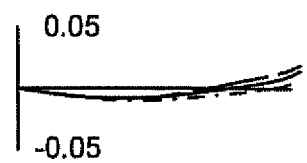
Figure 21D:
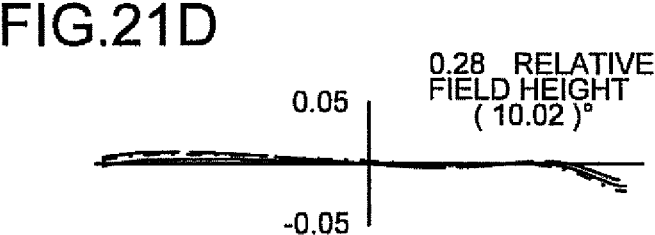
Figure 21I:
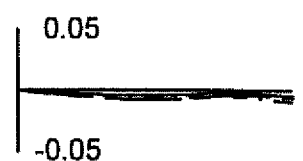
Figure 21E:
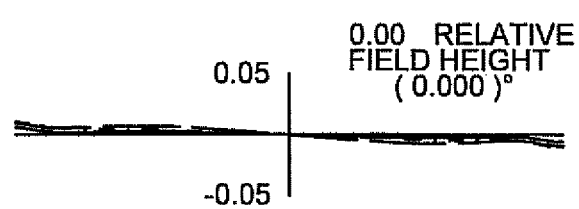
Figure 21J:
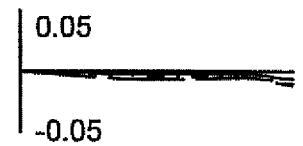
Figure 23A:
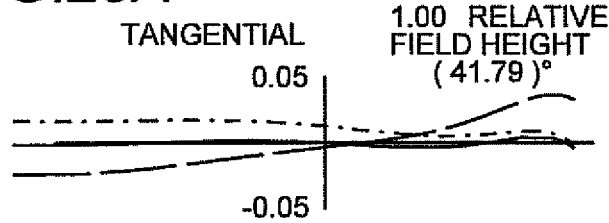
FIGS. 23A to 23J are lateral aberration diagrams showing chromatic coma at the mid-focal-length position in Example 2.
Figure 23F:
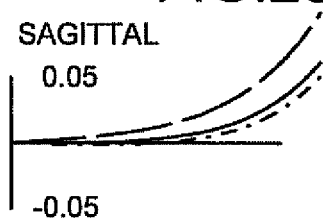
Figure 23B:
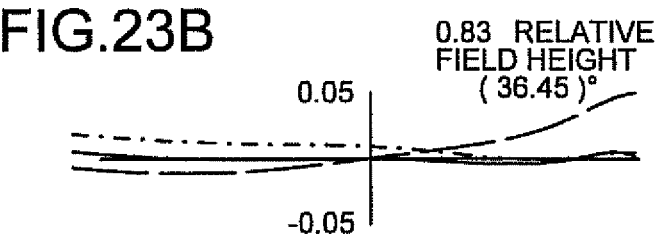
Figure 23G:
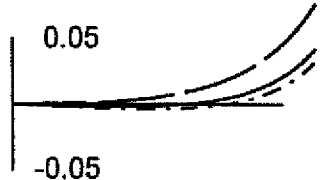
Figure 23C:
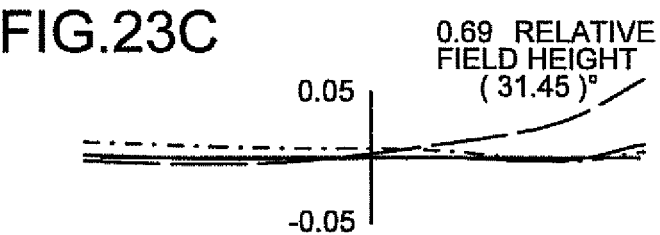
Figure 23H:
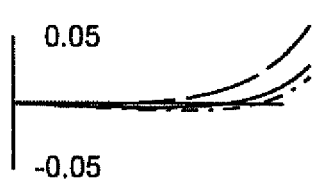
Figure 23D:
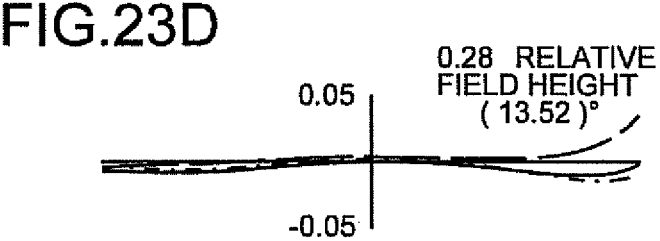
Figure 23I:
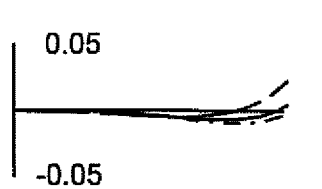
Figure 23E:
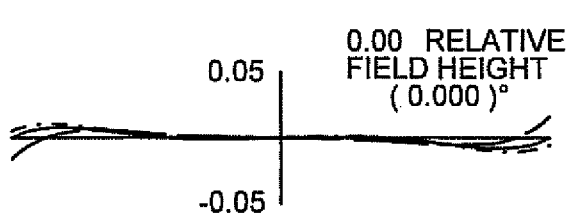
Figure 23J:
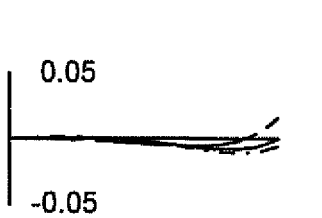
Figure 24A:
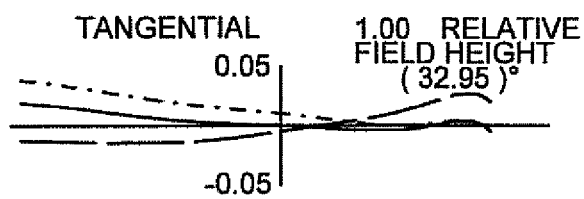
FIGS. 24A to 24J are lateral aberration diagrams showing chromatic coma at the telephoto end in Example 2.
Figure 24F:
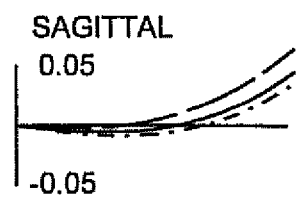
Figure 24B:
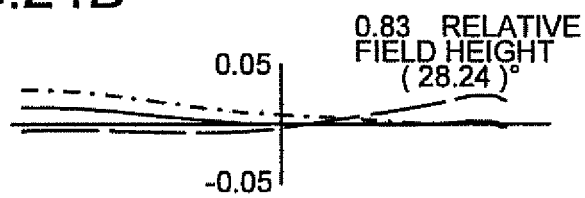
Figure 24G:
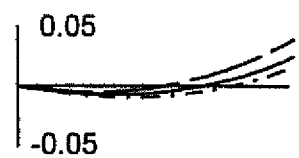
Figure 24C:
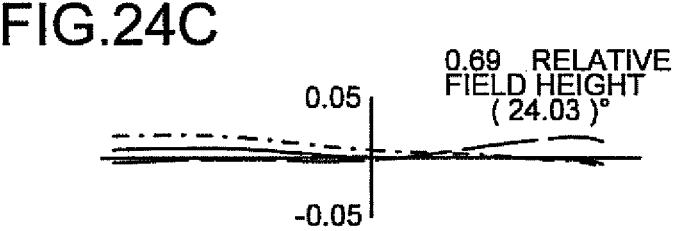
Figure 24H:
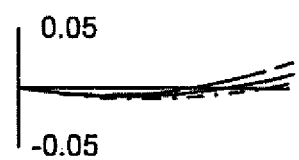
Figure 24D:
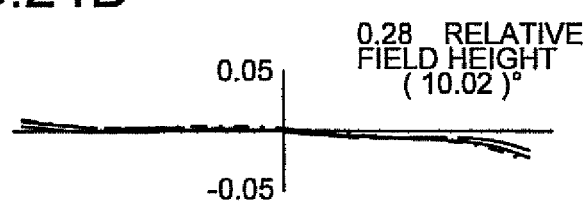
Figure 24I:
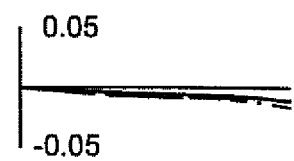
Figure 24E:
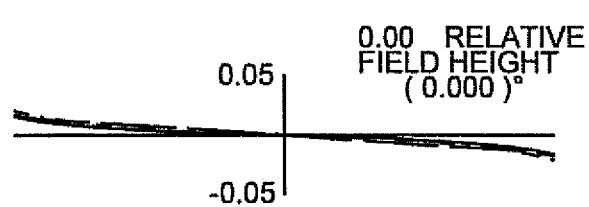
Figure 24J:
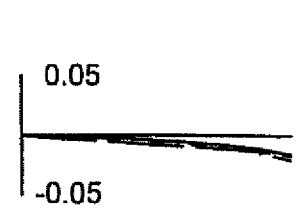
Figure 25A:
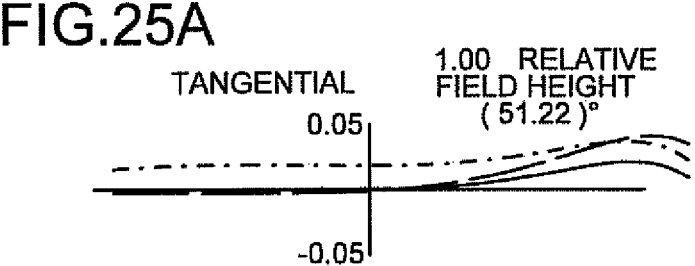
FIGS. 25A to 25J are lateral aberration diagrams showing chromatic coma at the wide-angle end in Example 3.
Figure 25F:
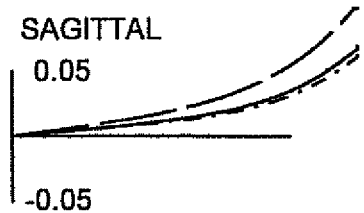
Figure 25B:
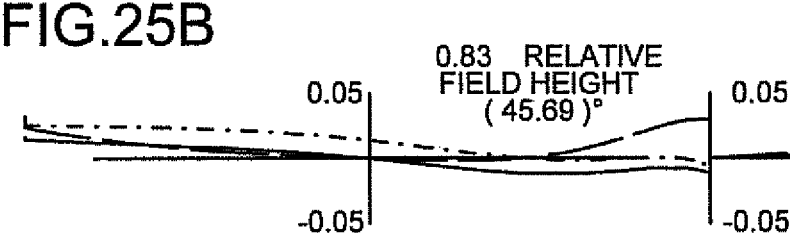
Figure 25G:
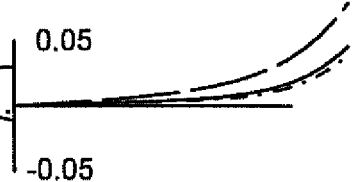
Figure 25C:
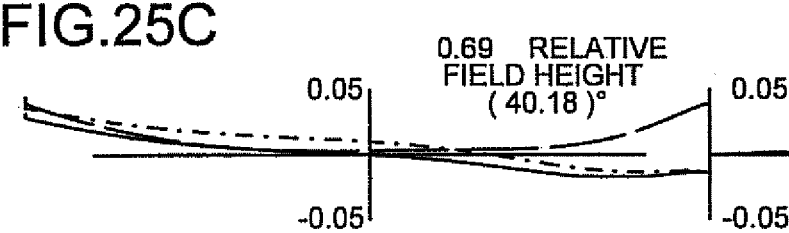
Figure 25H:
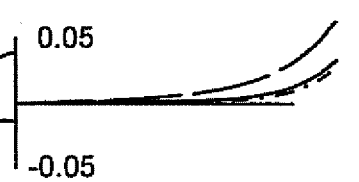
Figure 25D:
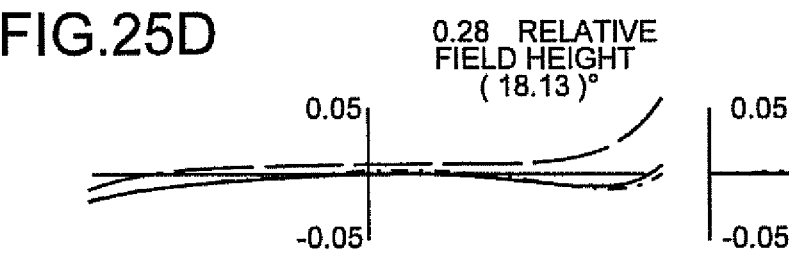
Figure 25I:
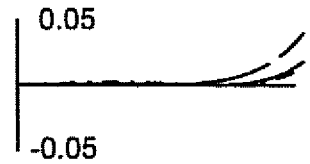
Figure 25E:
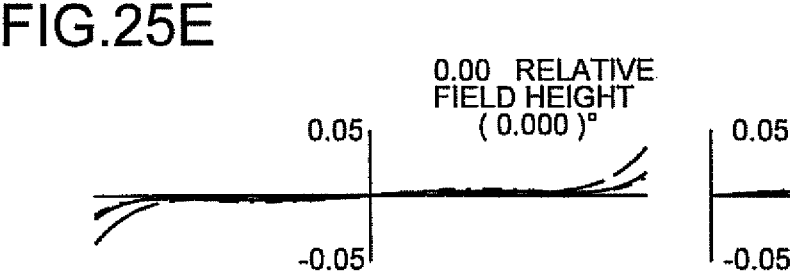
Figure 25J:
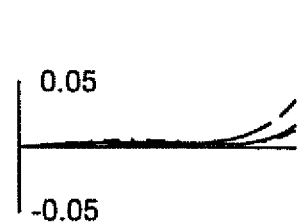
Figure 27A:
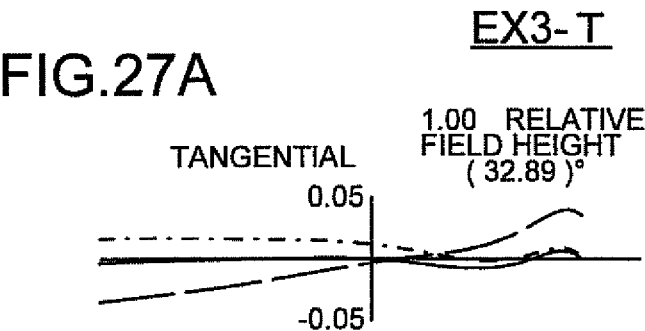
FIGS. 27A to 27J are lateral aberration diagrams showing chromatic coma at the telephoto end in Example 3.
Figure 27F:
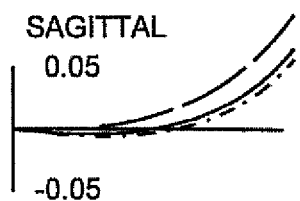
Figure 27B:
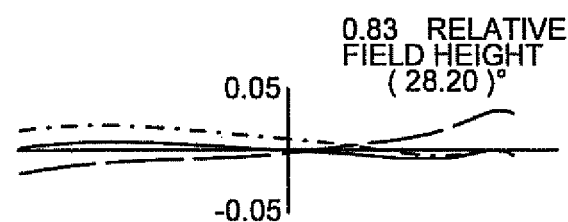
Figure 27G:
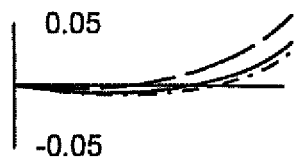
Figure 27C:
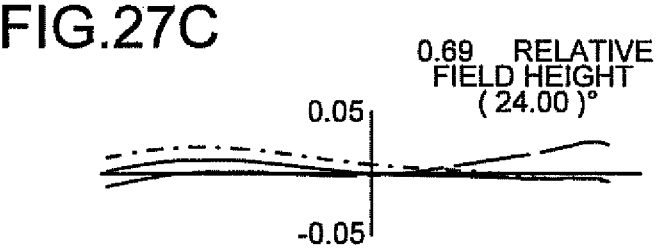
Figure 27H:
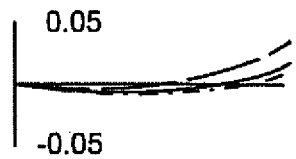
Figure 27D:
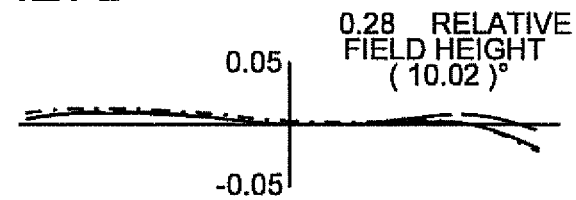
Figure 27I:
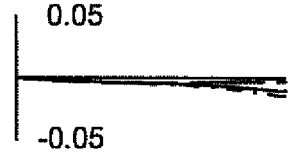
Figure 27E:
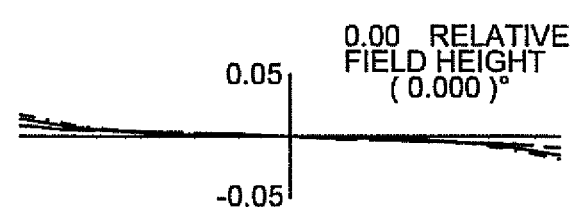
Figure 27J:
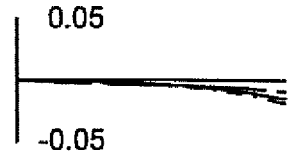
Figure 29A:
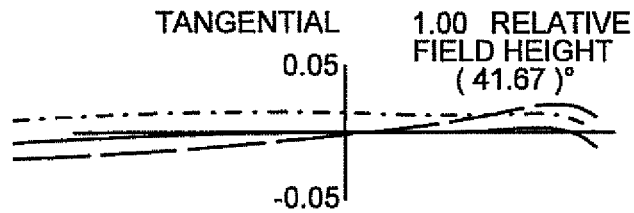
FIGS. 29A to 29J are lateral aberration diagrams showing chromatic coma at the mid-focal-length position in Example 4.
Figure 29F:
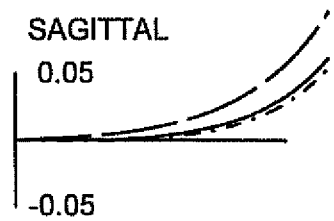
Figure 29B:
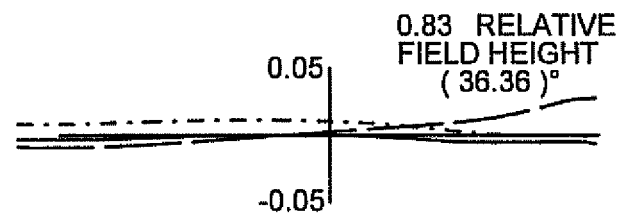
Figure 29G:
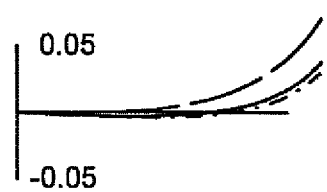
Figure 29C:
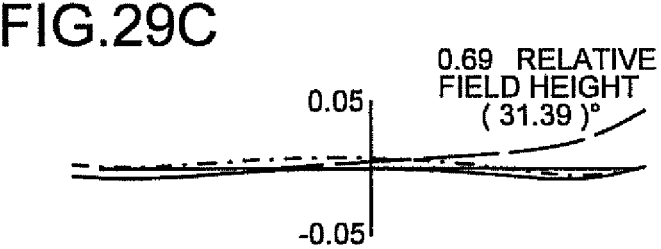
Figure 29H:
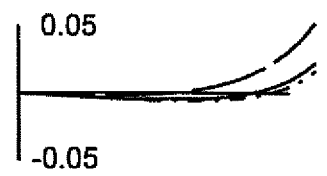
Figure 29D:
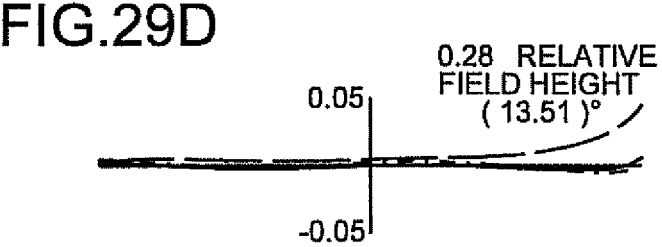
Figure 29I:
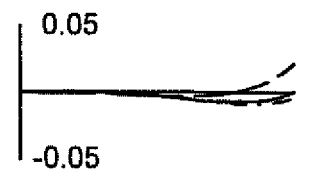
Figure 29E:
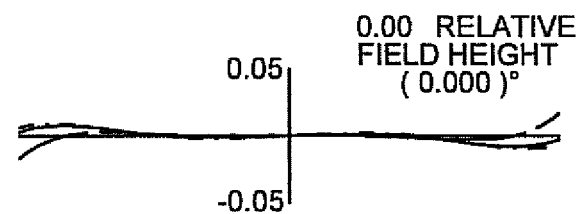
Figure 29J:
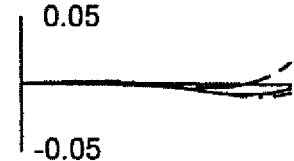
Figure 32A:
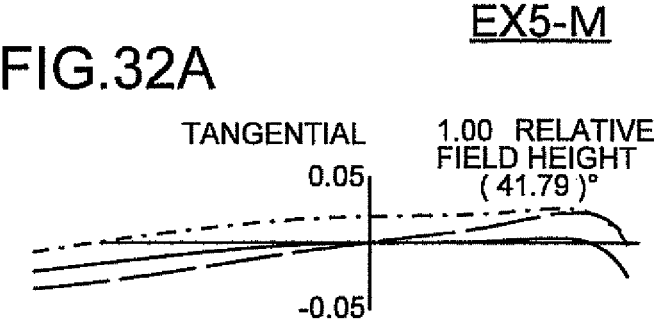
FIGS. 32A to 32J are lateral aberration diagrams showing chromatic coma at the mid-focal-length position in Example 5.
Figure 32F:
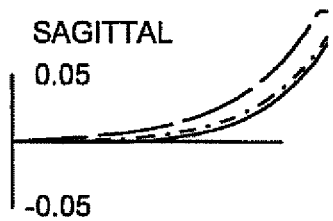
Figure 32B:
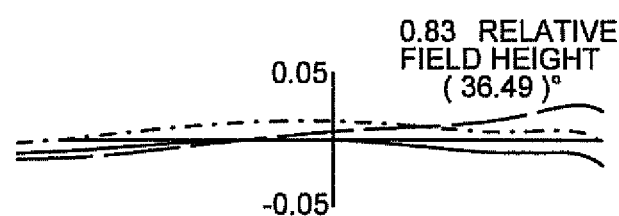
Figure 32G:
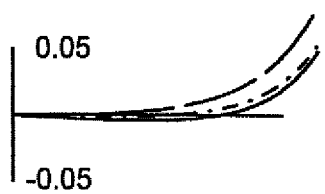
Figure 32C:
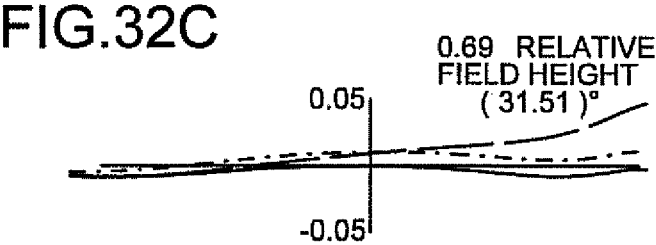
Figure 32H:
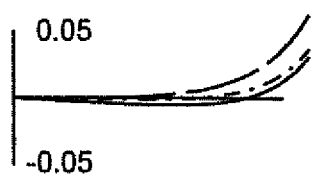
Figure 32D:
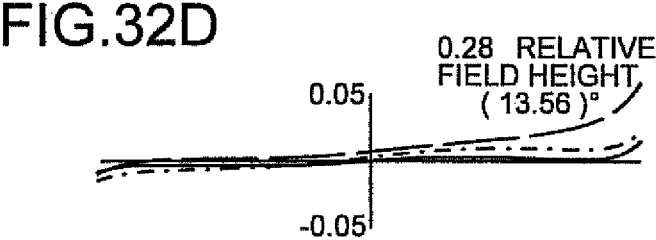
Figure 32I:
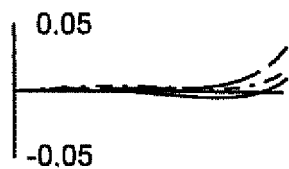
Figure 32E:
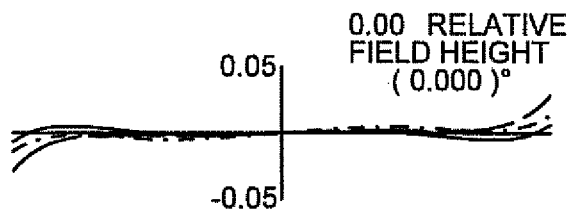
Figure 32J:
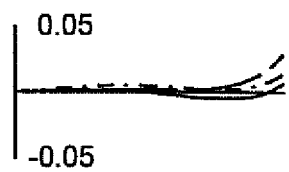
Figure 33A:
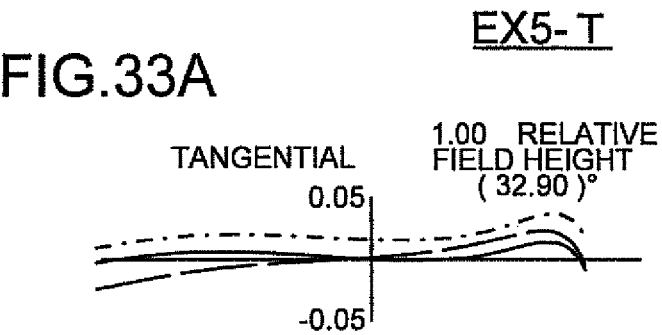
FIGS. 33A to 33J are lateral aberration diagrams showing chromatic coma at the telephoto end in Example 5.
Figure 33F:
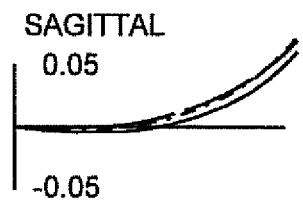
Figure 33B:
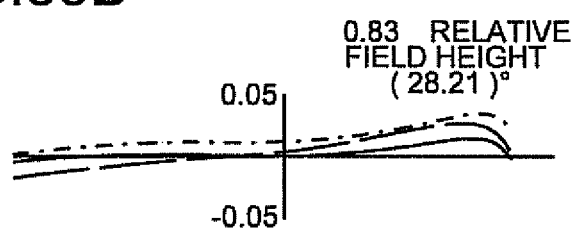
Figure 33G:
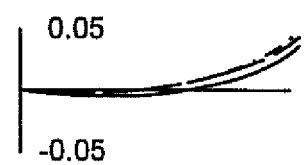
Figure 33C:
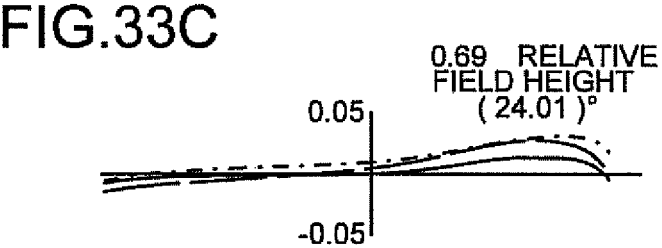
Figure 33H:
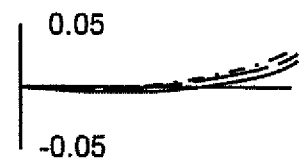
Figure 33D:
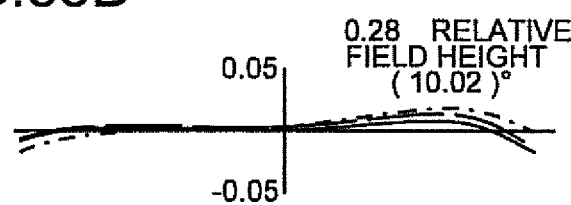
Figure 33I:
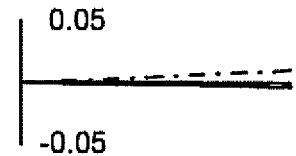
Figure 33E:
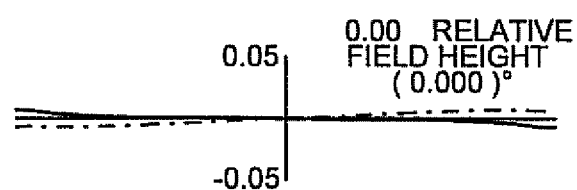
Figure 33J:
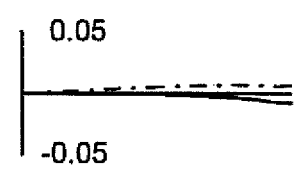
Figure 35A:
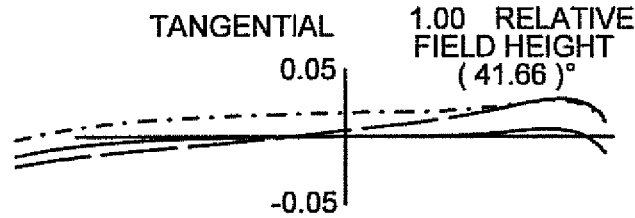
FIGS. 35A to 35J are lateral aberration diagrams showing chromatic coma at the mid-focal-length position in Example 6.
Figure 35F:
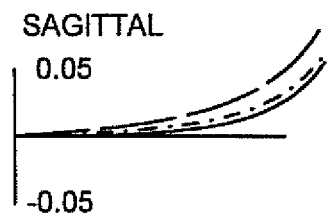
Figure 35B:
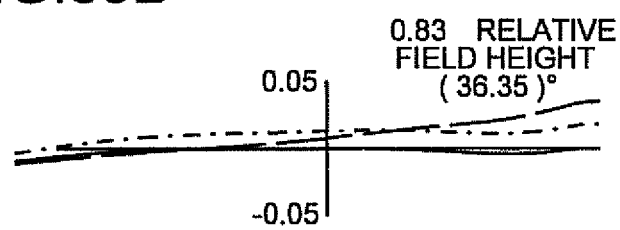
Figure 35G:
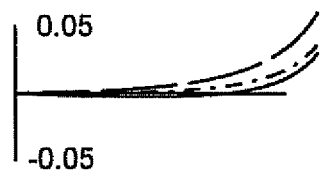
Figure 35C:
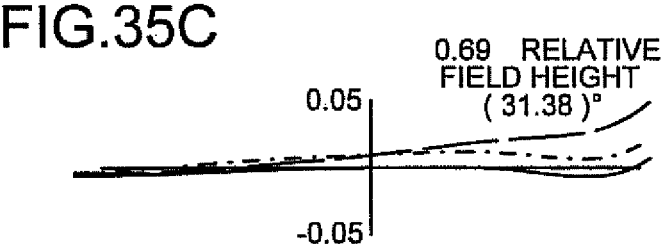
Figure 35H:
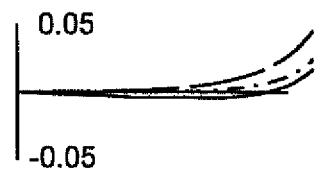
Figure 35D:
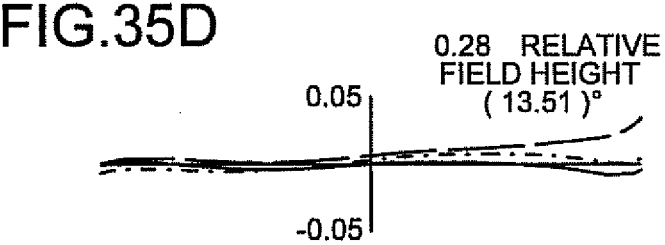
Figure 35I:
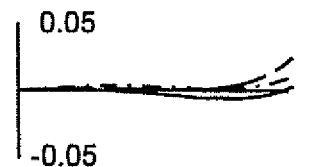
Figure 35E:
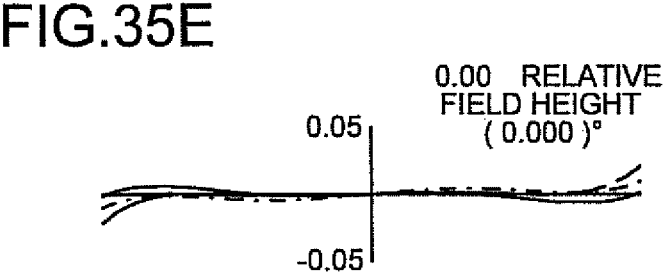
Figure 35J:
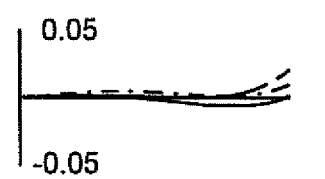

Hereinafter, a zoom lens system, an imaging optical device, and a digital appliance according to the present invention will be described. A zoom lens system according to the present invention is a zoom lens system that is composed of from the object side, a first lens group having a negative optical power and a second lens group having a positive optical power (an optical power is a quantity defined as the reciprocal of a focal length) and that achieves zooming by varying the group-to-group distance. The second lens group includes at least one three-element cemented lens, i.e., a set of three lens elements cemented together, composed of, from the object side, a first lens element having a negative optical power, a second lens element having a positive optical power, and a third lens element having a negative optical power. The three-element cemented lens fulfills conditional formulae (1) to (3) below.

$$0.08<(rs2+rs1)/(rs2-rs1)<0.5 \quad (1)$$

$$27<v2-v1<40 \quad (2)$$

$$20<v2-v3<38 \quad (3)$$

where
rs1 represents the radius of curvature of the object-side cemented surface of the three-element cemented lens;
rs2 represents the radius of curvature of the image-side cemented surface of the three-element cemented lens;
v1 represents the Abbe number of the first lens element of the three-element cemented lens;
v2 represents the Abbe number of the second lens element of the three-element cemented lens;
v3 represents the Abbe number of the third lens element of the three-element cemented lens.

As mentioned earlier, digitalization has made it possible for the user to see a shot image in its actual size on a monitor, and this has brought demand for improved MTF performance and reduced chromatic aberration. However, coping with digitalization requires that the exit pupil position be located far away from the image surface, and this leads to an increased total length, making it difficult to achieve high performance and compactness simultaneously. Adopting the above construction helps achieve high performance, from axis to periphery, and compactness simultaneously. For example, by composing the second lens group out of a front group, an aperture stop, and a rear group and arranging a negative-positive-negative three-element cemented lens in the rear group of the second lens group, it is possible to satisfactorily correct, from the wide-angle end to the telephoto end, the astigmatism and chromatic aberration that occur in the rear group of the second lens group.

Conditional formula (1) defines a preferred shape factor of the second lens element having a positive optical power in the three-element cemented lens. Fulfilling formula (1) makes it possible to obtain an optical solution with small curvature of field from the wide-angle end to the telephoto end. A shape beyond the upper limit of formula (1) results in the image-side cemented surface having a smaller absolute value for its curvature than the object-side cemented surface, and causes large curvature of field on the over side at the telephoto end, which is undesirable. A shape beneath the lower limit of formula (1) results in the object-side and image-side cemented surfaces having close absolute values for their curvature, and causes large curvature of field at the wide-angle end, which is undesirable.

Conditional formula (2) defines a preferred dispersion difference between the first and second lens elements of the three-element cemented lens, and formula (3) defines a preferred dispersion difference between the second and third lens elements of the three-element cemented lens. Fulfilling conditional formulae (2) and (3) gives an optical solution that allows correction of chromatic curvature of field and chromatic coma over the entire zoom range. Above the upper limit of formula (2) or (3), the dispersion difference among the individual lens elements of the three-element cemented lens is so large that the three-element cemented lens produces large chromatic aberration of curvature of field, which is undesirable. Below the lower limit of formula (2) or (3), the dispersion difference among the individual lens elements of the three-element cemented lens is so small that the three-element cemented lens produces large chromatic coma, in particular chromatic coma on the upper side at the wide-angle end, which is undesirable.

With the distinctive construction described above, owing to the arrangement of a three-element cemented lens fulfilling predetermined conditions in the second lens group in a two-group zoom type, it is possible to obtain a high-performance zoom lens system, and hence a high-performance imaging optical device, that is compact but that nevertheless has satisfactorily corrected curvature of field from axis to periphery over the entire zoom range from the wide-angle end to the telephoto end combined with reduced chromatic aberration of curvature of field and reduced chromatic coma. Using such a compact high-performance zoom lens system or imaging optical device in a digital appliance such as a digital camera makes it possible to add a high-performance image input function to the digital appliance in a compact fashion, contributing to making the digital appliance compact, low-cost, high-performance, versatile, etc. For example, a zoom lens system according to the present invention is suitable as an interchangeable lens for an interchangeable-lens digital camera, and thus helps obtain a compact, light-weight interchangeable lens convenient to carry. Conditions and other features for obtaining those effects with a good balance, and for achieving higher optical performance, further compactness, etc., will now be described.

It is particularly preferable that a zoom lens system according to the present invention fulfill formula (1a) below.

$$0.08<(rs2+rs1)/(rs2-rs1)<0.40 \quad (1a)$$

Conditional formula (1a) defines a conditional range, within the conditional range defined by formula (1) noted previously, that is particularly preferable from the above-mentioned and other viewpoints. Accordingly, preferably, fulfilling formula (1a) helps augment the above-mentioned effects.

It is particularly preferable that a zoom lens system according to the present invention fulfill formula (2a) below.

$$30<v2-v1<40 \quad (2a)$$

Conditional formula (2a) defines a conditional range, within the conditional range defined by formula (2) noted previously, that is particularly preferable from the above-mentioned and other viewpoints. Accordingly, preferably, fulfilling formula (2a) helps augment the above-mentioned effects.

It is particularly preferable that a zoom lens system according to the present invention fulfill formula (3a) below.

$$25<v2-v3<38 \quad (3a)$$

Conditional formula (3a) defines a conditional range, within the conditional range defined by formula (3) noted previously, that is particularly preferable from the above-mentioned and other viewpoints. Accordingly, preferably, fulfilling formula (3a) helps augment the above-mentioned effects.

It is preferable that the first and second lens groups fulfill conditional formula (4) below.

$$-0.8<f1/f2<-0.5 \quad (4)$$

where
f1 represents the focal length of the first lens group; and
f2 represents the focal length of the second lens group.

Fulfilling conditional formula (4) gives the first and second lens groups adequate optical powers, and this helps suppress an increase in the movement amount of the first lens group, contributing to achieving compactness. Above the upper limit of conditional formula (4), the optical power of the first lens group is high, and this helps achieve compactness; however, an increased optical power in the first lens group invites an increased optical power in the second lens group, and this makes it difficult to correct aberrations, in particular spherical aberration and coma at the telephoto end, making it difficult to obtain high performance. Below the lower limit of conditional formula (4), the optical power of the first lens group is low, and this increases the movement amount of the first lens group, resulting in an increased total length, making it difficult to achieve compactness.

It is particularly preferable that a zoom lens system according to the present invention fulfill formula (4a) below.

$$-0.72 < f1/f2 < -0.6 \qquad (4a)$$

Conditional formula (4a) defines a conditional range, within the conditional range defined by formula (4) noted previously, that is particularly preferable from the above-mentioned and other viewpoints. Accordingly, preferably, fulfilling formula (4a) helps augment the above-mentioned effects.

It is preferable that the second lens group be composed of, from the object side, a front group, an aperture stop, and a rear group, include the three-element cemented lens in the rear group, and fulfill conditional formula (5) below.

$$-1 < fs/f2\_r < -0.3 < \qquad (5)$$

where
f2_r represents the focal length of the rear group of the second lens group; and
fs represents the focal length of the three-element cemented lens in the second lens group.

It is preferable to divide the second lens group into a front group and a rear group by an aperture stop, to include the three-element cemented lens in the rear group, and to fulfill conditional formula (5). Fulfilling conditional formula (5) helps optimize the optical power relationship between the rear group of the second lens group and the three-element cemented lens, and this helps effectively suppress the coma and spherical aberration that occur in the rear group of the second lens group. Above the upper limit of conditional formula (5), the negative optical power of three-element cemented lens is high, making it difficult to correct aberrations (in particular, spherical aberration) at the telephoto end. Below the lower limit of conditional formula (5), the negative optical power of three-element cemented lens is low, inviting increased lens diameters on the image-side of the aperture stop.

It is preferable that the first lens group include two composite aspherical surfaces that fulfill conditional formula (6) below.

$$4.8 < \Delta X\_max/\Delta X_{min} < 6.0 \qquad (6)$$

where, with respect to the thickness, in the optical axis direction, of the resin forming the composite aspherical surfaces, ΔX_max represents the maximum resin thickness; and ΔX_min represents the minimum resin thickness.

Providing two composite aspherical surfaces as described above in the first lens group helps effectively suppress the distortion and curvature of field that occur in the first lens group. In this zoom type, correcting the negative distortion that occurs in the first lens group requires an aspherical surface, and adding another aspherical surface to effectively correct curvature of field from the wide-angle end to the telephoto end makes effective correction possible.

Fulfilling conditional formula (6) makes it possible to satisfactorily correct the curvature of field that occurs in the first lens group. Below the lower limit of the conditional formula (6), the difference in resin thickness is small, causing large curvature of field at the wide-angle end, which is undesirable. Above the upper limit of conditional formula (6), the difference in resin thickness is large, causing large curvature of field at the telephoto end, which is undesirable.

It is preferable that the second lens group be composed of, from the object side, a front group, an aperture stop, and a rear group, and that the rear group be composed of three lens components, namely a positive, a negative, and a positive lens component which are each a single or cemented lens element. Composing the rear group of the second lens group out of a positive, a negative, and a positive lens component is preferable for satisfactory correction of aberrations over the entire zoom range. In addition, using a three-element cemented lens as mentioned above as the negative lens component in the rear group makes it possible to satisfactorily correct chromatic aberration and curvature of field over the entire zoom range and to reduce spherical aberration and coma over the entire zoom range.

A zoom lens system according to the present invention is suitable for use as an imaging lens in a digital appliance (for example, a digital camera) furnished with an image input function, and can be combined with an image sensor or the like to build an imaging optical device that optically takes in an image of a subject and outputs it in the form of an electrical signal. An imaging optical device is an optical device that constitutes a main component of a camera used to shoot still and moving images of a subject, and is composed of, for example, from the object side (i.e., subject side), a zoom lens system for forming an optical image of an object and an image sensor for converting the optical image formed by the zoom lens system into an electrical signal. By arranging the zoom lens system having the distinctive construction described previously in such a way that the optical image of the subject is formed on the light-receiving surface (i.e., imaging surface) of the image sensor, it is possible to obtain an imaging optical device, and hence a digital appliance provided with it, that is compact, low-cost, and high-performance.

Examples of digital appliances furnished with an image input function include: digital cameras, video cameras, surveillance cameras, vehicle-mounted cameras, and cameras for videophones. Also included are personal computers, portable digital appliances (for example, cellular telephones, smartphones, and mobile computers), peripheral devices for those (such as canners and printers), and other digital appliances or the like furnished with a camera function by incorporation or optional attachment. As will be understood from these examples, not only an imaging optical device can be used to build a camera, but also an imaging optical device can be incorporated in various appliances to add a camera function to them. For example, it is possible to build a digital appliance furnished with an image input function, such as a camera-equipped cellular telephone.

Figure 37:
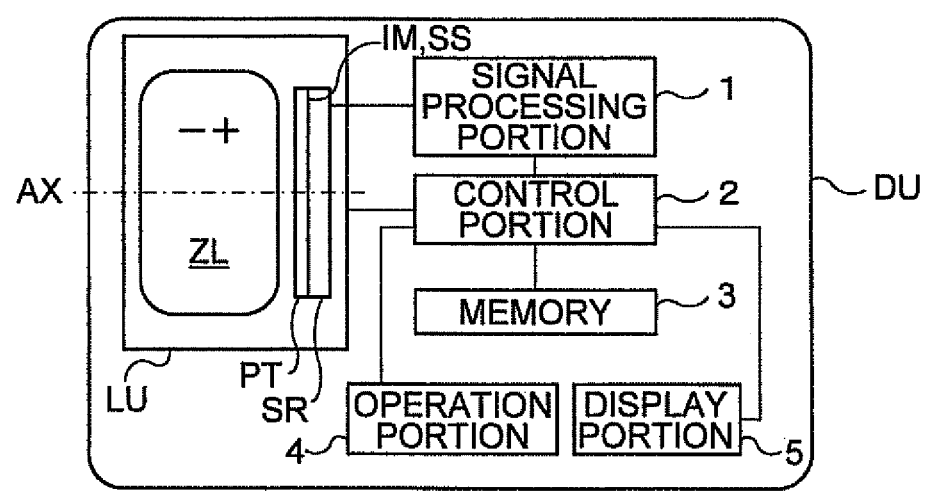
FIG. 37 is a schematic diagram showing an example of a configuration, in outline, of a digital appliance incorporating a zoom lens system.

FIG. 37 is a schematic sectional view showing an example of the configuration, in outline, of a digital appliance DU incorporating a zoom lens system ZL, as an example of a digital appliance furnished with an image input function. An imaging optical device LU incorporated in the digital appliance DU shown in FIG. 37 includes, from the object side (i.e., subject side), a zoom lens system ZL (with AX representing the optical axis) for zoomably forming an optical image (image surface) IM of an object, an plane-parallel plate PT (corresponding to the cover glass of an image sensor SR and, wherever applicable, optical filters and the like, such as an optical low-pass filter and an infrared cut filter, arranged as necessary), and an image sensor SR for converting the optical image IM formed on the light-receiving surface (imaging surface) SS by the zoom lens system ZL into an electrical signal. When this imaging optical device LU is used to build a digital appliance DU, the former is typically arranged inside the body of the latter; to realize a camera function, any configuration can be adopted that suits the needs. For example, an imaging optical device LU built as a unit can be configured freely removable from or rotatable relative to the body of the digital appliance DU.

The zoom lens system ZL has a two-group zoom construction composed of two groups, namely a negative and a positive group, and is so configured that zooming (magnification variation) is achieved as a result of the first and second lens groups moving individually along the optical axis AX so as to vary the group-to-group distance, that focusing is achieved as a result of the front group in the second lens group moving along the optical axis AX (focusing toward a close object is achieved as a result of the front group moving toward the image side), and that an optical image IM is formed on the light-receiving surface SS of the image sensor SR.

Used as the image sensor SR is, for example, a solid-state image sensor such as a CCD (charge-coupled device) image sensor or a CMOS (complementary metal-oxide semiconductor) image sensor having a plurality of pixels. The zoom lens system ZL is arranged such that an optical image IM of a subject is formed on the light-receiving surface SS, which is the photoelectric conversion portion of the image sensor SR, and thus the optical image IM formed by the zoom lens system ZL is converted into an electrical signal by the image sensor SR.

The digital appliance DU includes, in addition to the imaging optical device LU, a signal processing portion 1, a control portion 2, a memory 3, an operation portion 4, a display portion 5, etc. The signal generated by the image sensor SR is subjected to predetermined processing such as digital image processing and image compression processing in the signal processing portion 1, and is then recorded, as a digital video signal, in the memory 3 (a semiconductor memory, an optical disc, or the like) or, in some cases, transmitted to another appliance (for example, a communication function of a cellular telephone) via a cable or after being converted into an infrared signal or the like. The control portion 2 comprises a microprocessor, and performs, in a centralized fashion, control of functions such as image shooting functions (still image shooting function, moving image shooting function, etc.) and image playback functions; and control of lens movement mechanisms for zooming, focusing, camera shake correction, etc. For example, the control portion 2 controls the imaging optical device LU to perform at least either still image shooting or moving image shooting with respect to a subject. The display portion 5 comprises a display device such as a liquid crystal monitor, and displays images based on the image signal resulting from conversion by the image sensor SR or based on image data recorded in the memory 3. The operation portion 4 comprises operation members such as operation buttons (for example, a shutter release button), operation dials (for example, a shooting mode dial), etc., and conveys to the control portion 2 the data entered through operation by the user.

Now, by way of a first to a sixth embodiment, specific optical constructions of the zoom lens system ZL will be described in more detail. FIGS. 1 to 6 are optical construction diagrams corresponding to the zoom lens system ZL in the first to sixth embodiments respectively, and show, in an optical section, the lens arrangement, lens shapes, etc. at each of the wide-angle end (W), the mid-focal-length position (M), and the telephoto end (T). In each optical construction diagram, arrows m1 and m2 schematically indicate the movement of the first lens group Gr1 and the second lens group Gr2, respectively, during zooming. As arrows m1 and m2 indicate, the first lens group Gr1, during zooming from the wide-angle end (W) to the telephoto end (T), takes a U-turn course, moving first toward the image surface IM and then back toward the object side; the second lens group Gr2, during zooming from the wide-angle end (W) to the telephoto end (T), moves toward the object side.

An aperture stop ST is located in the second lens group Gr2, and moves together with the second lens group Gr2 during zooming. The second lens group Gr2 is composed of, from the object side, a front group GrF, an aperture stop ST, and a rear group GrR, and the rear group GrR is composed of three lens components, namely a positive, a negative, and a positive lens component, which are each a single or cemented lens element. Of these three lens component, the negative lens component is composed of, from the object side, a three-element cemented lens made up of a first lens element L1 having a negative optical power, a second lens element L2 having a positive optical power, and a third lens element L3 having a negative optical power. The front group GrF is a focusing group, and moves toward the image side for focusing on a close object as indicated by broken-line arrow mF.

In the first embodiment (FIG. 1), each lens group is composed, from the object side, as follows. The first lens group Gr1 is composed of a negative meniscus lens element having a convex surface on the object side, a negative meniscus lens element having a convex surface on the object side, a negative meniscus lens element having a convex surface on the object side, and a biconvex lens element. The front group GrF of the second lens group Gr2 is composed of a cemented lens element made up of a negative meniscus lens element having a convex surface on the object side and a biconvex lens element. The rear group GrR of the second lens group Gr2 is composed of a cemented lens element made up of a biconvex lens element and a biconcave lens element, a three-element cemented lens LS made up of a negative meniscus lens element (first lens element L1) having a convex surface on the object side, a biconvex lens element (second lens element L2), and a biconcave lens element (third lens element L3), and a biconvex lens element. In this zoom lens system ZL, the object-side surface of the second lens element from the object side, the image-side surface of the third lens element from the object side, and both surfaces of the biconvex lens element arranged at the most image-side position are aspherical surfaces, and the aspherical surfaces in the first lens group Gr1 are both composite aspherical surfaces.

In the second embodiment (FIG. 2), each lens group is composed, from the object side, as follows. The first lens group Gr1 is composed of a negative meniscus lens element having a convex surface on the object side, a negative meniscus lens element having a convex surface on the object side, a negative meniscus lens element having a convex surface on the object side, and a biconvex lens element. The front group GrF of the second lens group Gr2 is composed of a cemented lens element made up of a negative meniscus lens element having a convex surface on the object side and a positive meniscus lens element having a convex surface on the object side. The rear group GrR of the second lens group Gr2 is composed of a cemented lens element made up of a biconvex lens element and a negative meniscus lens element having a convex surface on the image side, a three-element cemented lens LS made up of a negative meniscus lens element (first lens element L1) having a convex surface on the object side, a biconvex lens element (second lens element L2), and a biconcave lens element (third lens element L3), and a biconvex lens element. In this zoom lens system ZL, the object-side surface of the second lens element from the object side, the image-side surface of the third lens element from the object side, and both surfaces of the biconvex lens element arranged at the most image-side position are aspherical surfaces, and the aspherical surfaces in the first lens group Gr1 are both composite aspherical surfaces.

In the third embodiment (FIG. 3), each lens group is composed, from the object side, as follows. The first lens group Gr1 is composed of a negative meniscus lens element having a convex surface on the object side, a negative meniscus lens element having a convex surface on the object side, a negative meniscus lens element having a convex surface on the object side, and a biconvex lens element. The front group GrF of the second lens group Gr2 is composed of a cemented lens element made up of a negative meniscus lens element having a convex surface on the object side and a positive meniscus lens element having a convex surface on the object side. The rear group GrR of the second lens group Gr2 is composed of a cemented lens element made up of a biconvex lens element and a negative meniscus lens element having a convex surface on the image side, a three-element cemented lens LS made up of a negative meniscus lens element (first lens element L1) having a convex surface on the object side, a biconvex lens element (second lens element L2), and a biconcave lens element (third lens element L3), and a biconvex lens element. In this zoom lens system ZL, the object-side surface of the second lens element from the object side, the image-side surface of the third lens element from the object side, and both surfaces of the biconvex lens element arranged at the most image-side position are aspherical surfaces, and the aspherical surfaces in the first lens gaup Gr1 are both composite aspherical surfaces.

In the fourth embodiment (FIG. 4), each lens group is composed, from the object side, as follows. The first lens group Gr1 is composed of a negative meniscus lens element having a convex surface on the object side, a negative meniscus lens element having a convex surface on the object side, a negative meniscus lens element having a convex surface on the object side, and a biconvex lens element. The front group GrF of the second lens group Gr2 is composed of a cemented lens element made up of a negative meniscus lens element having a convex surface on the object side and a biconvex lens element. The rear group GrR of the second lens group Gr2 is composed of a cemented lens element made up of a biconvex lens element and a negative meniscus lens element having a convex surface on the image side, a three-element cemented lens LS made up of a negative meniscus lens element (first lens element L1) having a convex surface on the object side, a biconvex lens element (second lens element L2), and a biconcave lens element (third lens element L3), and a biconvex lens element. In this zoom lens system ZL, the object-side surface of the second lens element from the object side, the image-side surface of the third lens element from the object side, and both surfaces of the biconvex lens element arranged at the most image-side position are aspherical surfaces, and the aspherical surfaces in the first lens group Gr1 are both composite aspherical surfaces.

In the fifth embodiment (FIG. 5), each lens group is composed, from the object side, as follows. The first lens group Gr1 is composed of a negative meniscus lens element having a convex surface on the object side, a negative meniscus lens element having a convex surface on the object side, a negative meniscus lens element having a convex surface on the object side, and a biconvex lens element. The front group GrF of the second lens group Gr2 is composed of a cemented lens element made up of a negative meniscus lens element having a convex surface on the object side and a biconvex lens element. The rear group GrR of the second lens group Gr2 is composed of a cemented lens element made up of a biconvex lens element and a negative meniscus lens element having a convex surface on the image side, a three-element cemented lens LS made up of a negative meniscus lens element (first lens element L1) having a convex surface on the object side, a biconvex lens element (second lens element L2), and a biconcave lens element (third lens element L3), and a biconvex lens element. In this zoom lens system ZL, the object-side surface of the second lens element from the object side, the image-side surface of the third lens element from the object side, and both surfaces of the biconvex lens element arranged at the most image-side position are aspherical surfaces, and the aspherical surfaces in the first lens group On are both composite aspherical surfaces.

In the sixth embodiment (FIG. 6), each lens group is composed, from the object side, as follows. The first lens group Gr1 is composed of a negative meniscus lens element having a convex surface on the object side, a negative meniscus lens element having a convex surface on the object side, a negative meniscus lens element having a convex surface on the object side, and a biconvex lens element. The front group GrF of the second lens group Gr2 is composed of a cemented lens element made up of a negative meniscus lens element having a convex surface on the object side and a biconvex lens element. The rear group GrR of the second lens group Gr2 is composed of a cemented lens element made up of a biconvex lens element and a negative meniscus lens element having a convex surface on the image side, a three-element cemented lens LS made up of a negative meniscus lens element (first lens element L1) having a convex surface on the object side, a biconvex lens element (second lens element L2), and a biconcave lens element (third lens element L3), and a biconvex lens element. In this zoom lens system ZL, the object-side surface of the second lens element from the object side, the image-side surface of the third lens element from the object side, and both surfaces of the biconvex lens element arranged at the most image-side position are aspherical surfaces, and the aspherical surfaces in the first lens group Gr1 are both composite aspherical surfaces.

EXAMPLES

Hereinafter, the construction and other features of zoom lens systems embodying the present invention will be described more specifically with reference to the construction data of practical examples. Examples 1 to 6 (EX1 to EX6) presented below are numerical practical examples corresponding respectively to the first to sixth embodiments described above, and the optical construction diagrams (FIGS. 1 to 6) showing the first to sixth embodiments also show the lens arrangement, lens shapes, etc. of the corresponding ones of Examples 1 to 6.

In the construction data of each practical example, listed as surface data are, from left to right, surface number, radius of curvature r (mm), axial surface-to-surface distance d (mm), refractive index nd for the d-line (with a wavelength of 587.56 nm), and Abbe number vd for the d-line. A surface whose surface number is marked with an asterisk "*" is an aspherical surface, and its surface shape is defined by formula (AS) below in a local rectangular coordinate system (x, y, z) having an origin at the vertex of the surface. Listed as aspherical surface data are aspherical surface coefficients etc. It should be noted that, in the aspherical surface data of each practical example, any term that does not appear there has a coefficient "0," and that, for all the data, "E-n" stands for "$\times 10^{-n}$."

$$z=(c \cdot h^2)/[1+\sqrt{\{1-(1+K) \cdot c^2 \cdot h^2\}}]+\Sigma(Aj \cdot h^j) \qquad (AS)$$

where h represents the height in a direction perpendicular to the z-axis (optical axis AX) ($h^2=x^2+y^2$);

z represents the amount of sag (with respect to the vertex of the surface) in the optical axis AX direction at the height h;

c represents the curvature at the vertex of the surface (the reciprocal of the radius of curvature r);

K represents a conic constant; and

Aj represents the aspherical surface coefficient of order j.

Listed as miscellaneous data are zoom ratio (magnification variation ratio) and, for each of the focal length positions W, M, and T, focal length (f, mm) of the entire system, whole angle of view (2ω, °), back focus (BF, mm), total lens length (TL, mm), f-number (Fno), image height (Y', mm), and variable surface-to-surface distances di (where i is a surface number, mm). Listed as focal lengths of lens groups etc. are the focal lengths (f1, f2, fs, f2_r, etc.; mm) of the lens groups etc. (the first lens group Gr1, the second lens group Gr2, the front group GrF, the rear group GrR, the three-element cemented lens LS, the first lens element L1, the second lens element L2, and the third lens element L3). Here, back focus BF denotes the distance from the image-side surface of the plane-parallel plate PT to the image surface IM, and lens total length TL denotes the distance from the foremost lens surface to the image surface IM. Table 1 lists the values corresponding to the conditional formulae as observed in each practical example.

FIGS. 7A-7I to 12A-12I are longitudinal aberration diagrams corresponding to Examples 1 to 6 (EX1 to EX6), respectively, with respect to a subject at infinity, each showing, at FIGS. 7A-7C to 12A-12C, aberrations at the wide-angle end (W); at 7D-7F to 12D-12F, aberrations at the mid-focal-length position (M); and at 7G-7I to 12G-12I, aberrations at the telephoto end (T). FIGS. 7A to 12A, 7D to 12D, and 7G to 12G are spherical aberration diagrams. FIGS. 7B to 12B, 7E to 12E, and 7H to 12H are astigmatism diagrams. FIGS. 7C to 12C, 7F to 12F, and 7I to 12I are distortion diagrams. In the spherical aberration diagrams, a solid line indicates the amount of spherical aberration for the d-line (with a wavelength of 587.56 nm) in terms of the amount of deviation (unit: mm) in the optical axis AX direction from the paraxial image surface, the vertical axis representing the height of incidence at the pupil as normalized with respect to the maximum height there (i.e., the relative height at the pupil). In the astigmatism diagrams, a broken line T indicates the tangential image surface for the d-line, and a solid line S indicates the sagittal image surface for the d-line, each in terms of the amount of deviation (unit: mm) in the optical axis AX direction from the paraxial image surface, the vertical axis representing the image height (IMG HT, unit: mm). In the distortion diagrams, the horizontal axis represents the distortion (unit; %) for the d-line, and the vertical axis represents the image height (IMG HT, unit: mm). The maximum value of the image height IMG HT corresponds to the maximum image height on the image surface IM (one-half of the diagonal length of the light-receiving surface SS of the image sensor SR).

FIGS. 13A-13C to 18A-18C are chromatic curvature-of-field diagrams corresponding to Examples 1 to 6 (EX1 to EX6) respectively, each showing, at FIGS. 13A to 18A, chromatic curvature-of-field at the wide-angle end (W); at FIGS. 13B to 18B, chromatic curvature-of-field at the mid-focal-length position (M); and at FIGS. 13C to 18C, chromatic curvature-of-field at the telephoto end (T). The plots in FIGS. 13A-13C to 18A-18C are similar to those at FIGS. 7B to 12B, 7E to 12E, and 7H to 12H, indicating the curvature of field for the C-line (with a wavelength of 656.28 nm), the d-line (with a wavelength of 587.56 nm), and the g-line (with a wavelength of 435.84 nm) with respect to each of the sagittal image surface S and the tangential image surface T.

FIGS. 19A-19J to 21A-21J, FIGS. 22A-22J to 24A-24J, FIGS. 25A-25J to 27A-27J, FIGS. 28A-28J to 30A-30I, FIGS. 31A-31J to 33A-33J, and FIGS. 34A-34J to 36A-36J are lateral aberration diagrams corresponding to Examples 1 to 6 (EX1 to EX6) respectively, showing chromatic coma (mm) at the wide-angle end (W), the mid-focal-length position (M), and the telephoto end (T). FIGS. 19A-19E to 36A-36E are the lateral aberrations in a tangential beam, and FIGS. 19F-19J to 36F-36J are the lateral aberrations in a sagittal beam. There are shown the lateral aberrations at different relative field heights (half-angle of view ω°), indicated at "RELATIVE FIELD HEIGHT," by a solid line for d-line (with a wavelength of 587.56 nm); by a dash-and-dot line for the C-line (with a wavelength of 656.28 nm); and by a broken line for the g-line (with a wavelength of 435.84 nm). A relative field height is a relative image height as normalized with respect to the maximum image height Y'.

Example 1

| | | Unit: mm | | |
|---|---|---|---|---|
| | | Surface Data | | |
| Surface No. | r | d | nd | vd |
| Object Surface | ∞ | d0 | | |
| 1 | 55.466 | 2.30 | 1.72916 | 54.67 |
| 2 | 22.882 | 5.75 | | |
| *3 | 42.477 | 0.08 | 1.51400 | 53.00 |
| 4 | 31.616 | 1.80 | 1.72916 | 54.67 |
| 5 | 19.407 | 7.62 | | |
| 6 | 201.373 | 1.73 | 1.80420 | 46.50 |
| 7 | 27.873 | 0.08 | 1.51400 | 53.00 |
| *8 | 23.059 | 6.63 | | |
| 9 | 39.970 | 5.45 | 1.68893 | 31.16 |
| 10 | −175.401 | 26.97 (Variable) | | |
| 11 | 49.393 | 2.00 | 1.80518 | 25.46 |
| 12 | 25.904 | 0.01 | 1.51400 | 42.80 |
| 13 | 25.904 | 4.84 | 1.64769 | 33.84 |
| 14 | −302.784 | 6.15 | | |
| 15 (Aperture) | ∞ | 1.90 | | |
| 16 | 18.791 | 8.37 | 1.49700 | 81.61 |
| 17 | −46.108 | 0.01 | 1.51400 | 42.80 |

-continued

| | | Unit: mm | | | |
|---|---|---|---|---|---|
| 18 | −46.108 | 1.00 | 1.72916 | 54.67 | |
| 19 | 1198.193 | 1.00 | | | |
| 20 | 38.088 | 1.00 | 1.80420 | 46.50 | |
| 21 | 11.617 | 0.01 | 1.51400 | 42.80 | |
| 22 | 11.617 | 7.85 | 1.49700 | 81.61 | |
| 23 | −13.915 | 0.01 | 1.51400 | 42.80 | |
| 24 | −13.915 | 1.00 | 1.72916 | 54.67 | |
| 25 | 63.311 | 1.21 | | | |
| *26 | 999.995 | 4.41 | 1.58313 | 59.39 | |
| *27 | −21.943 | 37.70 (Variable) | | | |
| 28 | ∞ | 1.90 | 1.51680 | 64.20 | |
| 29 | ∞ | 1.00 | | | |
| Image Surface | ∞ | 0.00 | | | |

Aspherical Surface Data

| Surface | K | A4 | A6 | A8 | A10 | A12 | A14 |
|---|---|---|---|---|---|---|---|
| 3 | 1.487 | 1.168E−05 | −4.148E−09 | 1.101E−12 | 1.894E−14 | −2.952E−17 | −9.759E−21 |
| 8 | −4.715 | 3.700E−05 | −1.310E−07 | 2.082E−10 | −3.243E−13 | 1.792E−17 | −9.759E−21 |
| 26 | 0.000 | 2.136E−05 | 1.939E−07 | 1.663E−09 | 1.020E−11 | | |
| 27 | −10.003 | −9.654E−05 | 1.095E−06 | −7.277E−09 | 5.471E−11 | | |

Miscellaneous Data
Zoom Ratio 1.84

| | Wide (W) | Mid (M) | Tele (T) |
|---|---|---|---|
| f | 18.50 | 25.08 | 34.00 |
| 2ω | 60.54 | 46.60 | 35.24 |
| BF | 1.00 | 1.00 | 1.00 |
| TL | 139.69 | 134.64 | 136.74 |
| Fno | 3.6 | 4.15 | 4.63 |
| Y' | 21.63 | 21.63 | 21.63 |
| d0 | ∞ | ∞ | ∞ |
| d10 | 26.973 | 12.514 | 1.850 |
| d27 | 37.70 | 47.12 | 59.88 |

Focal Lengths of Lens Groups etc.

| | |
|---|---|
| 1st Lens Group Gr1 | −26.69 |
| 2nd Lens Group Gr2 | 38.19 |
| Front Group GrF | 80.86 |
| Rear Group GrR | 57.98 |
| 3-Element Cemented Lens LS | −29.60 |
| 1st Lens Element L1 | −21.14 |
| 2nd Lens Element L2 | 14.19 |
| 3rd Lens Element L3 | −15.56 |

Example 2

| | Unit: mm | | | |
|---|---|---|---|---|
| | Surface Data | | | |
| Surface No. | r | d | nd | vd |
| Object Surface | ∞ | d0 | | |
| 1 | 56.894 | 2.30 | 1.72916 | 54.67 |
| 2 | 23.175 | 5.62 | | |
| *3 | 44.129 | 0.08 | 1.51400 | 53.00 |
| 4 | 31.909 | 1.80 | 1.72916 | 54.67 |
| 5 | 19.270 | 7.64 | | |
| 6 | 189.960 | 1.70 | 1.80420 | 46.50 |
| 7 | 28.692 | 0.08 | 1.51400 | 53.00 |
| *8 | 23.892 | 6.86 | | |
| 9 | 40.196 | 5.43 | 1.68893 | 31.16 |
| 10 | −202.837 | 26.95 (Variable) | | |
| 11 | 36.049 | 2.00 | 1.80518 | 25.46 |
| 12 | 21.790 | 0.01 | 1.51400 | 42.80 |
| 13 | 21.790 | 5.06 | 1.64769 | 33.84 |
| 14 | 148.319 | 6.42 | | |
| 15 (Aperture) | ∞ | 1.90 | | |
| 16 | 21.200 | 7.43 | 1.49700 | 81.61 |

-continued

| | | Unit: mm | | | |
|---|---|---|---|---|---|
| 17 | −27.461 | 0.01 | 1.51400 | 42.80 | |
| 18 | −27.461 | 1.12 | 1.72916 | 54.67 | |
| 19 | −246.857 | 2.33 | | | |
| 20 | 27.538 | 1.00 | 1.80420 | 46.50 | |
| 21 | 11.317 | 0.01 | 1.51400 | 42.80 | |
| 22 | 11.317 | 7.15 | 1.49700 | 81.61 | |
| 23 | −23.878 | 0.01 | 1.51400 | 42.80 | |
| 24 | −23.878 | 1.00 | 1.72916 | 54.67 | |
| 25 | 51.442 | 1.34 | | | |
| *26 | 1000.213 | 3.95 | 1.58313 | 59.39 | |
| *27 | −28.052 | 37.70 (Variable) | | | |
| 28 | ∞ | 1.90 | 1.51680 | 64.20 | |
| 29 | ∞ | 1.00 | | | |
| Image Surface | ∞ | 0.00 | | | |

Aspherical Surface Data

| Surface | K | A4 | A6 | A8 | A10 | A12 | A14 |
|---|---|---|---|---|---|---|---|
| 3 | 0.732 | 1.552E−05 | −7.975E−09 | 1.063E−11 | 7.872E−15 | −2.952E−17 | −9.759E−21 |
| 8 | −3.902 | 2.960E−05 | −1.061E−07 | 1.524E−10 | −2.983E−13 | 1.792E−17 | −9.759E−21 |
| 26 | 0.000 | 2.037E−05 | 3.707E−07 | −1.487E−09 | 2.256E−11 | | |
| 27 | −14.275 | −5.950E−05 | 8.978E−07 | −5.962E−09 | 3.899E−11 | | |

Miscellaneous Data
Zoom Ratio 1.84

| | Wide (W) | Mid (M) | Tele (T) |
|---|---|---|---|
| f | 18.50 | 25.08 | 34.00 |
| 2ω | 60.55 | 46.59 | 35.24 |
| BF | 1.00 | 1.00 | 1.00 |
| TL | 139.69 | 134.66 | 136.76 |
| Fno | 3.6 | 4.15 | 4.67 |
| Y' | 21.63 | 21.63 | 21.63 |
| d0 | ∞ | ∞ | ∞ |
| d10 | 26.949 | 12.504 | 1.850 |
| d27 | 37.70 | 47.12 | 59.88 |

Focal Lengths of Lens Groups etc.

| | |
|---|---|
| 1st Lens Group Gr1 | −26.68 |
| 2nd Lens Group Gr2 | 38.17 |
| Front Group GrF | 89.02 |
| Rear Group GrR | 53.45 |
| 3-Element Cemented Lens LS | −48.11 |
| 1st Lens Element L1 | −24.56 |
| 2nd Lens Element L2 | 16.57 |
| 3rd Lens Element L3 | −22.24 |

Example 3

| | Unit: mm | | | |
|---|---|---|---|---|
| | Surface Data | | | |
| Surface No. | r | d | nd | vd |
| Object Surface | ∞ | d0 | | |
| 1 | 56.700 | 2.29 | 1.72916 | 54.67 |
| 2 | 22.554 | 5.87 | | |
| *3 | 41.654 | 0.08 | 1.51400 | 53.00 |
| 4 | 31.079 | 1.80 | 1.72916 | 54.67 |
| 5 | 20.060 | 7.48 | | |
| 6 | 185.198 | 2.80 | 1.80420 | 46.50 |
| 7 | 27.947 | 0.08 | 1.51400 | 53.00 |
| *8 | 23.102 | 7.04 | | |
| 9 | 40.530 | 5.29 | 1.68893 | 31.16 |
| 10 | −214.872 | 26.65 (Variable) | | |
| 11 | 36.851 | 1.03 | 1.80518 | 25.46 |
| 12 | 24.227 | 0.01 | 1.51400 | 42.80 |
| 13 | 24.227 | 4.83 | 1.64769 | 33.84 |

| | | Unit: mm | | |
|---|---|---|---|---|
| 14 | 252.802 | 6.02 | | |
| 15 (Aperture) | ∞ | 1.90 | | |
| 16 | 21.433 | 7.21 | 1.49700 | 81.61 |
| 17 | −28.120 | 0.01 | 1.51400 | 42.80 |
| 18 | −28.120 | 1.40 | 1.72916 | 54.67 |
| 19 | −363.927 | 1.00 | | |
| 20 | 30.960 | 1.55 | 1.83481 | 42.71 |
| 21 | 12.048 | 0.01 | 1.51400 | 42.80 |
| 22 | 12.048 | 7.17 | 1.49700 | 81.61 |
| 23 | −19.165 | 0.01 | 1.51400 | 42.80 |
| 24 | −19.165 | 2.00 | 1.67293 | 55.04 |
| 25 | 46.395 | 1.41 | | |
| *26 | 1001.959 | 4.06 | 1.58313 | 59.39 |
| *27 | −26.005 | 37.70 (Variable) | | |
| 28 | ∞ | 1.90 | 1.51680 | 64.20 |
| 29 | ∞ | 1.00 | | |
| Image Surface | ∞ | 0.00 | | |

| | | | Aspherical Surface Data | | | | |
|---|---|---|---|---|---|---|---|
| Surface | K | A4 | A6 | A8 | A10 | A12 | A14 |
| 3 | 2.575 | 9.770E−06 | −7.840E−09 | 9.280E−12 | −4.014E−14 | −2.952E−17 | −9.759E−21 |
| 8 | −5.577 | 4.396E−05 | −1.562E−07 | 2.102E−10 | −2.057E−13 | 1.792E−17 | −9.759E−21 |
| 26 | 0.000 | 1.808E−05 | 3.577E−07 | −8.150E−10 | 2.178E−11 | | |
| 27 | −13.787 | −7.676E−05 | 1.055E−06 | −7.110E−09 | 5.003E−11 | | |

| Miscellaneous Data Zoom Ratio 1.84 | | | |
|---|---|---|---|
| | Wide (W) | Mid (M) | Tele (T) |
| f | 18.50 | 25.08 | 34.00 |
| 2ω | 60.55 | 46.59 | 35.24 |
| BF | 1.00 | 1.00 | 1.00 |
| TL | 139.49 | 134.63 | 136.87 |
| Fno | 3.6 | 4.15 | 4.68 |
| Y' | 21.63 | 21.63 | 21.63 |
| d0 | ∞ | ∞ | ∞ |
| d10 | 26.653 | 12.379 | 1.851 |
| d27 | 37.70 | 47.11 | 59.88 |

| Focal Lengths of Lens Groups etc. | |
|---|---|
| 1st Lens Group Gr1 | −26.52 |
| 2nd Lens Group Gr2 | 37.94 |
| Front Group GrF | 76.83 |
| Rear Group GrR | 58.87 |
| 3-Element Cemented Lens LS | −42.03 |
| 1st Lens Element L1 | −24.54 |
| 2nd Lens Element L2 | 16.11 |
| 3rd Lens Element L3 | −19.91 |

Example 4

| | | Unit: mm | | |
|---|---|---|---|---|
| | | Surface Data | | |
| Surface No. | r | d | nd | vd |
| Object Surface | ∞ | d0 | | |
| 1 | 54.832 | 2.30 | 1.72916 | 54.67 |
| 2 | 22.758 | 5.71 | | |
| *3 | 41.464 | 0.08 | 1.51400 | 53.00 |
| 4 | 31.000 | 1.90 | 1.72916 | 54.67 |
| 5 | 19.022 | 7.80 | | |
| 6 | 217.416 | 1.89 | 1.80420 | 46.50 |
| 7 | 29.740 | 0.08 | 1.51400 | 53.00 |
| *8 | 24.392 | 7.15 | | |
| 9 | 42.198 | 5.19 | 1.68893 | 31.16 |
| 10 | −191.291 | 26.89 (Variable) | | |

-continued

| | | Unit: mm | | |
|---|---|---|---|---|
| 11 | 43.386 | 2.00 | 1.80518 | 25.46 |
| 12 | 25.144 | 0.01 | 1.51400 | 42.80 |
| 13 | 25.144 | 3.83 | 1.64769 | 33.84 |
| 14 | −1413.103 | 6.06 | | |
| 15 (Aperture) | ∞ | 1.90 | | |
| 16 | 20.205 | 6.61 | 1.49700 | 81.61 |
| 17 | −31.130 | 0.01 | 1.51400 | 42.80 |
| 18 | −31.130 | 2.50 | 1.72916 | 54.67 |
| 19 | −147.824 | 1.00 | | |
| 20 | 41.294 | 1.37 | 1.77250 | 49.62 |
| 21 | 11.607 | 0.01 | 1.51400 | 42.80 |
| 22 | 11.607 | 7.37 | 1.49700 | 81.61 |
| 23 | −18.185 | 0.01 | 1.51400 | 42.80 |
| 24 | −18.185 | 2.00 | 1.77250 | 49.62 |
| 25 | 60.429 | 1.24 | | |
| *26 | 999.957 | 4.24 | 1.58313 | 59.39 |
| *27 | −23.539 | 37.70 (Variable) | | |
| 28 | ∞ | 1.90 | 1.51680 | 64.20 |
| 29 | ∞ | 1.00 | | |
| Image Surface | ∞ | 0.00 | | |

| | | | Aspherical Surface Data | | | |
|---|---|---|---|---|---|---|
| Surface | K | A4 | A6 | A8 | A10 | A12 | A14 |
| 3 | 2.501 | 9.645E−06 | −4.182E−09 | −8.855E−12 | −1.018E−14 | −2.952E−17 | −9.759E−21 |
| 8 | −5.646 | 3.812E−05 | −1.391E−07 | 1.895E−10 | −2.501E−13 | 1.792E−17 | −9.759E−21 |
| 26 | 0.000 | 2.251E−05 | 1.967E−07 | 1.352E−09 | 1.091E−11 | | |
| 27 | −12.375 | −9.225E−05 | 1.138E−06 | −7.236E−09 | 5.015E−11 | | |

| Miscellaneous Data Zoom Ratio 1.84 | | | |
|---|---|---|---|
| | Wide (W) | Mid (M) | Tele (T) |
| f | 18.50 | 25.08 | 34.00 |
| 2ω | 60.55 | 46.59 | 35.24 |
| BF | 1.00 | 1.00 | 1.00 |
| TL | 139.65 | 134.65 | 136.78 |
| Fno | 3.6 | 4.15 | 4.66 |
| Y' | 21.63 | 21.63 | 21.63 |
| d0 | ∞ | ∞ | ∞ |
| d10 | 26.891 | 12.479 | 1.850 |
| d27 | 37.70 | 47.12 | 59.88 |

| Focal Lengths of Lens Groups etc. | |
|---|---|
| 1st Lens Group Gr1 | −26.65 |
| 2nd Lens Group Gr2 | 38.13 |
| Front Group GrF | 77.77 |
| Rear Group GrR | 59.48 |
| 3-Element Cemented Lens LS | −30.17 |
| 1st Lens Element L1 | −21.33 |
| 2nd Lens Element L2 | 15.53 |
| 3rd Lens Element L3 | −17.90 |

Example 5

| | | Unit: mm | | |
|---|---|---|---|---|
| | | Surface Data | | |
| Surface No. | r | d | nd | vd |
| Object Surface | ∞ | d0 | | |
| 1 | 57.160 | 2.30 | 1.72916 | 54.67 |
| 2 | 22.528 | 6.58 | | |
| *3 | 49.006 | 0.08 | 1.51400 | 53.00 |
| 4 | 34.972 | 1.80 | 1.72916 | 54.67 |
| 5 | 20.582 | 6.82 | | |
| 6 | 140.113 | 2.83 | 1.80420 | 46.50 |
| 7 | 26.861 | 0.08 | 1.51400 | 53.00 |
| *8 | 22.282 | 6.38 | | |

-continued

| Unit: mm | | | | |
|---|---|---|---|---|
| 9 | 38.568 | 5.53 | 1.68893 | 31.16 |
| 10 | −174.256 | 27.19 (Variable) | | |
| 11 | 45.249 | 2.00 | 1.83512 | 41.83 |
| 12 | 23.574 | 0.01 | 1.51400 | 42.80 |
| 13 | 23.574 | 3.39 | 1.62745 | 50.43 |
| 14 | −229.978 | 6.13 | | |
| 15 (Aperture) | ∞ | 1.90 | | |
| 16 | 20.400 | 6.36 | 1.55344 | 50.79 |
| 17 | −26.810 | 0.01 | 1.51400 | 42.80 |
| 18 | −26.810 | 2.50 | 1.83481 | 42.72 |
| 19 | −85.945 | 1.00 | | |
| 20 | 55.650 | 2.00 | 1.83492 | 42.42 |
| 21 | 12.055 | 0.01 | 1.51400 | 42.80 |
| 22 | 12.055 | 6.97 | 1.50026 | 80.83 |
| 23 | −20.892 | 0.01 | 1.51400 | 42.80 |
| 24 | −20.892 | 2.00 | 1.75500 | 47.38 |
| 25 | 62.339 | 1.23 | | |
| *26 | 1000.024 | 4.18 | 1.58313 | 59.39 |
| *27 | −23.764 | 37.73 (Variable) | | |
| 28 | ∞ | 1.90 | 1.51680 | 64.20 |
| 29 | ∞ | 1.00 | | |
| Image Surface | ∞ | 0.00 | | |

Aspherical Surface Data

| Surface | K | A4 | A6 | A8 | A10 | A12 | A14 |
|---|---|---|---|---|---|---|---|
| 3 | −1.652 | 1.460E−05 | 1.409E−08 | −7.462E−11 | 1.315E−13 | −2.952E−17 | −9.759E−21 |
| 8 | −4.451 | 3.729E−05 | −1.113E−07 | 3.954E−11 | 1.091E−13 | 1.792E−17 | −9.759E−21 |
| 26 | 0.000 | 2.144E−05 | 2.084E−07 | 1.101E−09 | 1.498E−11 | | |
| 27 | −12.499 | −9.038E−05 | 1.124E−06 | −7.338E−09 | 5.385E−11 | | |

Miscellaneous Data
Zoom Ratio 1.85

| | Wide (W) | Mid (M) | Tele (T) |
|---|---|---|---|
| f | 18.36 | 25.00 | 34.01 |
| 2ω | 60.92 | 46.72 | 35.24 |
| BF | 1.00 | 1.00 | 1.00 |
| TL | 139.78 | 134.59 | 136.65 |
| Fno | 3.6 | 4.15 | 4.67 |
| Y' | 21.63 | 21.63 | 21.63 |
| d0 | ∞ | ∞ | ∞ |
| d10 | 27.192 | 12.560 | 1.850 |
| d27 | 37.73 | 47.15 | 59.91 |

Focal Lengths of Lens Groups etc.

| | |
|---|---|
| 1st Lens Group Gr1 | −26.71 |
| 2nd Lens Group Gr2 | 37.88 |
| Front Group GrF | 80.38 |
| Rear Group GrR | 58.19 |
| 3-Element Cemented Lens LS | −26.35 |
| 1st Lens Element L1 | −18.82 |
| 2nd Lens Element L2 | 16.44 |
| 3rd Lens Element L3 | −20.51 |

Example 6

| Unit: mm | | | | |
|---|---|---|---|---|
| Surface Data | | | | |
| Surface No. | r | d | nd | vd |
| Object Surface | ∞ | d0 | | |
| 1 | 56.585 | 2.30 | 1.68447 | 53.68 |
| 2 | 22.605 | 5.75 | | |
| *3 | 41.517 | 0.08 | 1.51400 | 53.00 |
| 4 | 31.000 | 1.80 | 1.61797 | 63.40 |
| 5 | 18.696 | 8.04 | | |

-continued

| Unit: mm | | | | |
|---|---|---|---|---|
| 6 | 427.972 | 1.70 | 1.80420 | 46.50 |
| 7 | 28.437 | 0.08 | 1.51400 | 53.00 |
| *8 | 23.478 | 7.12 | | |
| 9 | 42.076 | 5.19 | 1.68893 | 31.16 |
| 10 | −156.518 | 26.86 (Variable) | | |
| 11 | 40.556 | 2.00 | 1.83481 | 42.72 |
| 12 | 21.529 | 0.01 | 1.51400 | 42.80 |
| 13 | 21.529 | 3.68 | 1.59770 | 51.25 |
| 14 | −199.895 | 6.07 | | |
| 15 (Aperture) | ∞ | 1.90 | | |
| 16 | 20.614 | 6.63 | 1.55421 | 50.56 |
| 17 | −26.708 | 0.01 | 1.51400 | 42.80 |
| 18 | −26.708 | 2.50 | 1.83481 | 42.72 |
| 19 | −82.290 | 1.00 | | |
| 20 | 51.558 | 1.94 | 1.83481 | 42.72 |
| 21 | 11.479 | 0.01 | 1.51400 | 42.80 |
| 22 | 11.479 | 6.78 | 1.49700 | 81.60 |
| 23 | −26.044 | 0.01 | 1.51400 | 42.80 |
| 24 | −26.044 | 2.00 | 1.78347 | 45.49 |
| 25 | 60.275 | 1.45 | | |
| *26 | 1000.070 | 4.25 | 1.58313 | 59.39 |
| *27 | −24.363 | 37.70 (Variable) | | |
| 28 | ∞ | 1.90 | 1.51680 | 64.20 |
| 29 | ∞ | 1.00 | | |
| Image Surface | ∞ | 0.00 | | |

Aspherical Surface Data

| Surface | K | A4 | A6 | A8 | A10 | A12 | A14 |
|---|---|---|---|---|---|---|---|
| 3 | −0.626 | 1.579E−05 | −2.108E−09 | −1.058E−12 | 3.548E−14 | −2.952E−17 | −9.759E−21 |
| 8 | −4.250 | 3.205E−05 | −1.220E−07 | 2.152E−10 | −3.609E−13 | 1.792E−17 | −9.759E−21 |
| 26 | 0.000 | 2.400E−05 | 1.127E−07 | 2.441E−09 | 7.976E−12 | | |
| 27 | −13.833 | −9.435E−05 | 1.151E−06 | −7.973E−09 | 5.512E−11 | | |

Miscellaneous Data
Zoom Ratio 1.84

| | Wide (W) | Mid (M) | Tele (T) |
|---|---|---|---|
| f | 18.50 | 25.08 | 33.99 |
| 2ω | 60.56 | 46.60 | 35.25 |
| BF | 1.00 | 1.00 | 1.00 |
| TL | 139.66 | 134.67 | 136.80 |
| Fno | 3.6 | 4.15 | 4.68 |
| Y' | 21.63 | 21.63 | 21.63 |
| d0 | ∞ | ∞ | ∞ |
| d10 | 26.863 | 12.467 | 1.850 |
| d27 | 37.70 | 47.11 | 59.86 |

Focal Lengths of Lens Groups etc.

| | |
|---|---|
| 1st Lens Group Gr1 | −26.64 |
| 2nd Lens Group Gr2 | 38.10 |
| Front Group GrF | 78.91 |
| Rear Group GrR | 59.51 |
| 3-Element Cemented Lens LS | −26.27 |
| 1st Lens Element L1 | −18.09 |
| 2nd Lens Element L2 | 17.05 |
| 3rd Lens Element L3 | −22.98 |

TABLE 1

| | (1) (rs2 + rs1)/(rs2 − rs1) | (2) v2 − v1 | (3) v2 − v3 | (4) f1/f2 | (5) fs/f2_r | (6): ΔX_max/ΔX_min 1st Surface | (6): ΔX_max/ΔX_min 2nd Surface |
|---|---|---|---|---|---|---|---|
| EX 1 | 0.09 | 35.11 | 26.93 | −0.70 | −0.51 | 5.5053 | 4.9241 |
| EX 2 | 0.36 | 35.11 | 26.93 | −0.70 | −0.90 | 5.5145 | 4.9443 |
| EX 3 | 0.23 | 38.90 | 26.57 | −0.70 | −0.71 | 5.5392 | 4.9207 |
| EX 4 | 0.22 | 31.99 | 31.99 | −0.70 | −0.51 | 5.5074 | 4.9264 |
| EX 5 | 0.27 | 38.41 | 33.45 | −0.71 | −0.45 | 5.5076 | 4.9126 |
| EX 6 | 0.39 | 38.88 | 36.11 | −0.70 | −0.44 | 5.5052 | 4.9217 |

DU digital appliance
LU imaging optical device
ZL zoom lens system
Gr1 first lens group
Gr2 second lens group
GrF front group
GrR rear group
LS three-element cemented lens
L1 first lens element
L2 second lens element
L3 third lens element
ST aperture stop
SR image sensor
SS light-receiving surface
IM image surface
AX optical axis
1 signal processing portion
2 control portion
3 memory
4 operation portion
5 display portion

The invention claimed is:

1. A zoom lens system comprising, from an object side,
a first lens group having a negative optical power; and
a second lens group having a positive optical power,
the zoom lens system achieving zooming by varying a group-to-group distance,
wherein
the second lens group includes at least one three-element cemented lens which is a set of three lens elements cemented together including, from the object side, a first lens element having a negative optical power, a second lens element having a positive optical power, and a third lens element having a negative optical power, and
the three-element cemented lens fulfills conditional formulas (1) to (3) below:

$$0.08 < (rs2+rs1)/(rs2-rs1) < 0.5 \quad (1)$$

$$27 < v2-v1 < 40 \quad (2)$$

$$20 < v2-v3 < 38 \quad (3)$$

where
rs1 represents a radius of curvature of an object-side cemented surface of the three-element cemented lens;
rs2 represents a radius of curvature of an image-side cemented surface of the three-element cemented lens;
v1 represents an Abbe number of the first lens element of the three-element cemented lens;
v2 represents an Abbe number of the second lens element of the three-element cemented lens;
v3 represents an Abbe number of the third lens element of the three-element cemented lens.

2. The zoom lens system according to claim 1, wherein the first and second lens groups fulfill conditional formula (4) below:

$$0.8 < f1/f2 < -0.5 \quad (4)$$

where
f1 represents a focal length of the first lens group; and
f2 represents a focal length of the second lens group.

3. The zoom lens system according to claim 1, wherein the second lens group
includes, from the object side, a front group, an aperture stop, and a rear group,
includes the three-element cemented lens in the rear group, and
fulfills conditional formula (5) below:

$$1 < fs/f2\_r < -0.3 \quad (5)$$

where
f2_r represents a focal length of the rear group of the second lens group; and
fs represents a focal length of the three-element cemented lens in the second lens group.

4. The zoom lens system according to claim 1,
wherein the first lens group includes two composite aspherical surfaces that fulfill conditional formula (6) below:

$$4.8 < \Delta X\_max/\Delta X\_min < 6.0 \quad (6)$$

where, with respect to thickness, in an optical axis direction, of resin forming the composite aspherical surfaces,
ΔX_max represents a maximum resin thickness; and
ΔX_min represents a minimum resin thickness.

5. The zoom lens system according to claim 1 4, wherein the second lens group includes, from the object side, a front group, an aperture stop, and a rear group, and
the rear group includes three lens components comprising a positive, a negative, and a positive lens component which are each a single or cemented lens element.

6. An imaging optical device comprising:
the zoom lens system according to claim 1 and
an image sensor for converting an optical image formed on a light-receiving surface into an electrical signal, the zoom lens system being arranged such that an optical image of a subject is formed on the light-receiving surface of the image sensor.

7. A digital appliance comprising the imaging optical device according to claim 6 so as to have at least one of a function of shooting a still image of the subject or a function of shooting a moving image of the subject.

* * * * *